(12) United States Patent
Rochelle et al.

(10) Patent No.: US 7,656,291 B2
(45) Date of Patent: Feb. 2, 2010

(54) SYSTEM AND METHOD FOR DETERMINING PROXIMITY TO A WIRELESS BOUNDARY OF PROGRAMMABLE SHAPE USED IN ANIMAL CONTAINMENT

(75) Inventors: James M. Rochelle, Knoxville, TN (US); Robert G. Jackson, Knoxville, TN (US); Rungwit Sangsingkeow, Knoxville, TN (US); Randal D. Boyd, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 401 days.

(21) Appl. No.: 11/670,278

(22) Filed: Feb. 1, 2007

(65) Prior Publication Data

US 2008/0186197 A1 Aug. 7, 2008

(51) Int. Cl.
*G08B 1/08* (2006.01)

(52) U.S. Cl. .............................. 340/539.13; 340/539.11

(58) Field of Classification Search ............ 340/539.13, 340/539.11

See application file for complete search history.

(56) References Cited

U.S. PATENT DOCUMENTS

| | | | |
|---|---|---|---|
| 4,812,812 A | 3/1989 | Flowerdew et al. | |
| 5,425,367 A | 6/1995 | Shapiro et al. | |
| 5,661,459 A | 8/1997 | Belcher | |
| 5,852,403 A | 12/1998 | Boardman | |
| 5,913,820 A | 6/1999 | Bladen et al. | |
| 6,188,355 B1 | 2/2001 | Gilboa | |
| 6,392,547 B1 | 5/2002 | Stewart et al. | |
| 6,427,079 B1 | 7/2002 | Schneider et al. | |
| 6,581,546 B1* | 6/2003 | Dalland et al. | 119/712 |
| 6,879,300 B2 | 4/2005 | Rochelle et al. | |
| 7,142,167 B2 | 11/2006 | Rochelle et al. | |
| 7,423,530 B2* | 9/2008 | Babich et al. | 340/545.1 |
| 2001/0042522 A1* | 11/2001 | Barry et al. | 119/721 |
| 2005/0077085 A1* | 4/2005 | Zeller et al. | 175/45 |
| 2006/0190899 A1* | 8/2006 | Migatz et al. | 716/13 |
| 2007/0171047 A1* | 7/2007 | Goodman et al. | 340/539.13 |

* cited by examiner

*Primary Examiner*—Toan N Pham
*Assistant Examiner*—Kerri McNally
(74) *Attorney, Agent, or Firm*—Pitts & Brittian, P.C.

(57) ABSTRACT

Described is a boundary proximity determining system for wirelessly defining a boundary having a programmable shape and for indicating the occurrence of a rover unit traversing the boundary. The boundary proximity determining system includes a base station unit that generates a plurality of magnetic fields. The boundary proximity determining system also includes a rover unit that is responsive to the generated magnetic fields such that the rover unit defines the boundary in terms of the intensities and polarities of the magnetic fields. The rover unit determines whether the rover unit is within or outside the boundary by determining the current location of the rover unit in terms of the intensities and polarities of the magnetic fields and comparing the current location to the boundary.

164 Claims, 22 Drawing Sheets

SYSTEM AND METHOD FOR DETERMINING PROXIMITY TO A WIRELESS BOUNDARY OF PROGRAMMABLE SHAPE USED IN ANIMAL CONTAINMENT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention pertains to a system for defining a boundary and for indicating the location of a rover unit with respect to the boundary. More particularly, this invention pertains to a system for wirelessly defining a boundary having a programmable shape and for indicating the location of, for example, an animal carrying the rover unit.

BRIEF SUMMARY OF THE INVENTION

In accordance with the various features of the present invention there is provided a boundary proximity determining system for wirelessly defining a boundary having a programmable shape and for indicating the occurrence of a rover unit traversing the boundary. The boundary proximity determining system includes a base station unit and a rover unit. The base station unit generates at least one pair of magnetic fields, each magnetic field being separately identifiable. The principal axis of each magnetic field lies substantially within a common two-dimensional plane of operation that is substantially parallel with the surface on which the base station unit is situated. The plane of operation provides a spatial frame of reference and is charted in terms of circular coordinates ($\theta$, r), where the base station unit defines the center of the circular coordinate plane.

The rover unit measures the magnetic fields generated by the base station unit at points within the plane of operation. More specifically, the rover unit measures magnetic field properties of each separately identifiable magnetic field at a given location within the plane of operation such that the given location is defined in terms of the magnetic field properties, the given location being the location of the rover unit at the time of the measurements. From the magnetic field properties measured at the given location, the rover unit defines the given location in terms of a sector variable, angle-dependent variables, and a range-dependent variable.

The rover unit operates in at least two modes of operation. One mode of operation is the boundary capture mode. When operating in the boundary capture mode, the rover unit defines the boundary. More specifically, the rover unit is positioned at a first sample location along the proposed boundary. From the first sample location, the rover unit is carried along the contour of the proposed boundary. As the rover unit traces the contour of the proposed boundary, the rover unit sequentially measures the magnetic fields generated by the base station unit at various sample locations along the proposed boundary, including the first sample location, defines each sample location in terms of a sector variable, angle-dependent variables, and a range-dependent variable, and stores the sample locations such that the rover unit stores the boundary in terms of the defined sample locations.

Another mode of operation that the rover unit operates in is the boundary proximity detection mode. When operating in the boundary proximity detection mode, the rover unit determines whether the rover unit is within the containment area defined by the boundary or whether the rover unit has traversed the boundary. More specifically, the rover unit is secured to a host, such as an animal, such that the animal carries the rover unit. The animal is released within the containment area defined by the boundary, such as the yard of the owner of the animal. The rover unit periodically measures the magnetic fields at the current location of the rover unit, the current location of the rover unit being determined by the current location of the animal. The rover unit defines its current location in terms of a sector variable, angle-dependent variables, and a range-dependent variable. When the rover unit has determined the current location of the animal, it compares the current location with the stored boundary. When the rover unit determines that the current location of the animal is within the boundary, the rover unit takes no action. When rover unit determines that the current location of the animal is outside the boundary, the rover unit notifies the user of the boundary proximity determining system that the animal has carried the rover unit across the boundary.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

From the outset, it should be noted that the present invention may be embodied in many different forms and should not be construed as limited to the specific embodiments described herein. Rather, the embodiments described herein are provided to ensure that this detailed description is thorough and complete, and to ensure that the scope and spirit of the present invention are communicated effectively to those skilled in the art. Accordingly, one embodiment of a boundary proximity determining system for wirelessly and arbitrarily defining a boundary and for indicating the occurrence of a rover unit traversing the boundary and constructed in accordance with the various features of the present invention is illustrated generally at 10 in FIG. 1.

Figure 1A:
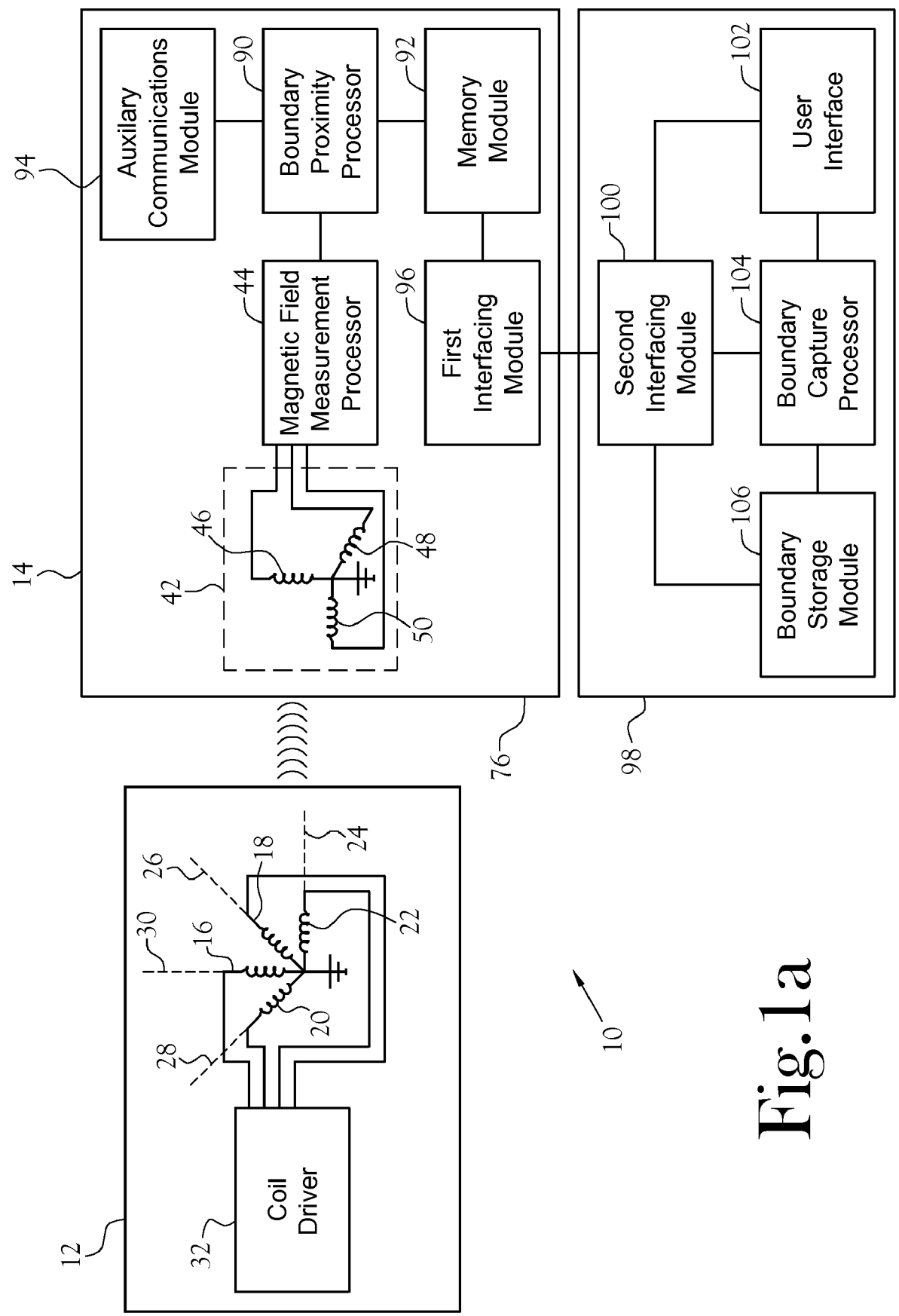
FIG. 1a is a block diagram representing the boundary proximity determining system in accordance with the various features of the present invention.

FIG. 1 is a block diagram of one embodiment of the boundary proximity determining system 10 in accordance with the various features of the present invention. The boundary proximity determining system 10 includes a base station unit 12 and a rover unit 14. The base station unit 12 includes at least one pair of solenoidal coils and a coil driver 32. In the illustrated embodiment, the base station unit 12 includes a first coil 16, a second coil 18, a third coil 20, and a fourth coil 22, the first coil 16 and the fourth coil 22 being a first pair of coils and the second coil 18 and the third coil 20 being a second pair of coils. Each solenoidal coil includes a principal axis that runs coaxially through the respective coil. More specifically, the first coil 16, the second coil 18, the third coil 20, and the fourth coil 22 include a first principal axis 24, a second principal axis 26, a third principal axis 28, and a fourth principal axis 30, respectively. Within each pair of solenoidal coils, the coils are oriented such that the respective principal axes are mutually orthogonal. Additionally, each coil is oriented such that each respective principal axis lies substantially within a common two-dimensional plane of operation. More specifically, in the illustrated embodiment, the first principal axis 24, the second principal axis 26, the third principal axis 28, and the fourth principal axis 30 lie substantially within the plane of operation. The plane of operation is substantially parallel to the surface that is considered the containment area, such as a yard. For example, the plane of operation is substantially parallel with the surface on which the base station unit 12 is positioned.

Figure 2:
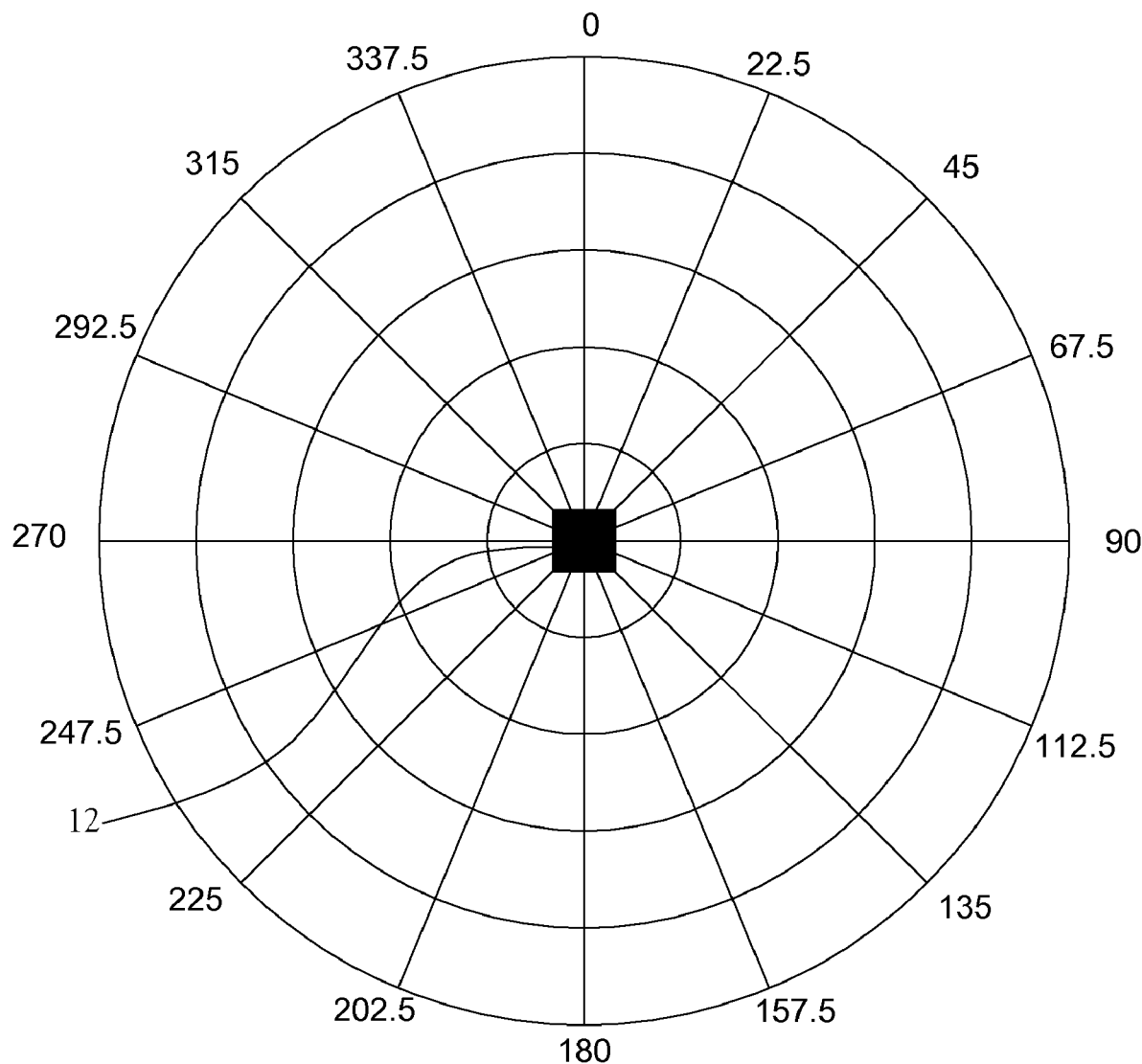
FIG. 2 illustrates the base station unit of the boundary proximity determining system and the plane of operation charted in terms of circular coordinates.

FIG. 2 illustrates one embodiment of the plane of operation in accordance with the various features of the present invention. In the illustrated embodiment, the plane of operation is a frame of reference charted in terms of circular coordinates (θ, r) with the center of the coordinate plane being the base station unit 12.

Figure 3:
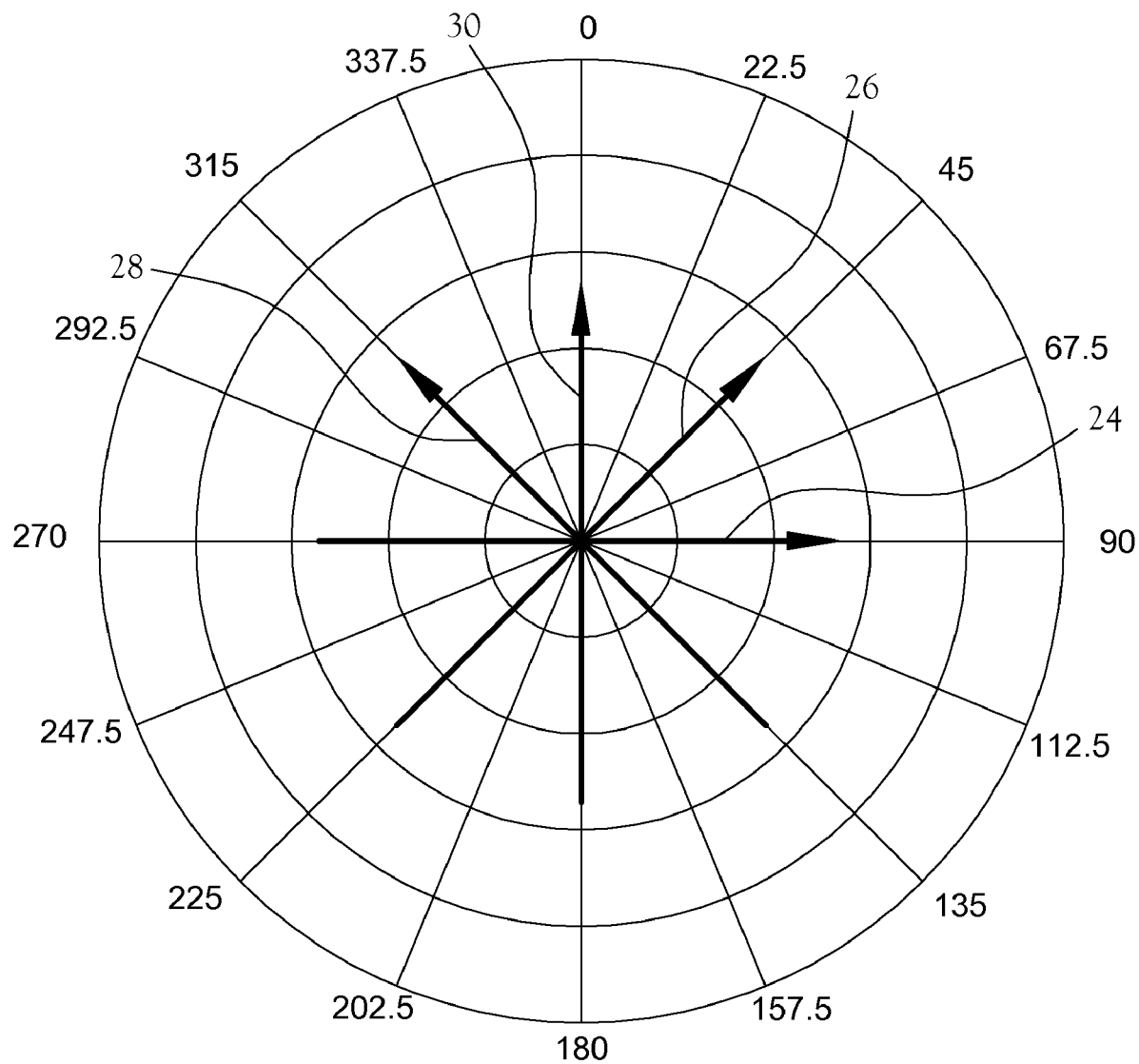
FIG. 3 depicts the principal axes of the magnetic fields generated by the base station unit.

FIG. 3 illustrates the first principal axis 24, the second principal axis 26, the third principal axis 28, and the fourth principal axis 30 as vectors on the plane of operation and in accordance with the various features of the present invention. The direction of each principal axis is governed by the direction of the current flowing through the respective coil. In the illustrated embodiment, the first pair of coils, namely the first coil 16 and the fourth coil 22, is oriented such that the first principal axis 24 runs along the 270°/90° line and the fourth principal axis 30 runs along the 180°/0° line. Additionally, the second pair of coils, namely the second coil 18 and the third coil 20, is oriented 45° counter-clockwise with respect to the first pair of coils such that the second principal axis 26 runs along the 225°/45° line and the third principal axis 28 runs along the 135°/315° line. The 45° shift between the first pair of coils and the second pair of coils facilitates subsequently discussed calculations.

It should be noted that the first coil 16 and the fourth coil 22 need not be orthogonal to remain within the scope or spirit of the present invention. Additionally, it should be noted that the second coil 18 and the third coil 20 need not be orthogonal to remain within the scope or spirit of the present invention. It should also be noted that the spatial relationship between the first pair of coils and the second pair of coils can be an angle difference other than 45° without departing from the scope or spirit of the present invention.

The base station unit 12 generates at least one pair of magnetic fields. In the illustrated embodiment of FIG. 1, the first coil 16, the second coil 18, the third coil 20, and the fourth coil 22 are in electrical communication with the coil driver 32. The coil driver 32 drives current through each coil such that each coil generates a separately identifiable quasi-static magnetic field. More specifically, the coil driver 32 drives current through the first coil 16, the second coil 18, the third coil 20, and the fourth coil 22 such that the first coil 16, the second coil 18, the third coil 20, and fourth coil 22 generate a first magnetic field 34, a second magnetic field 36, a third magnetic field 38, and a fourth magnetic field 40, respectively; the first magnetic field 34, the second magnetic field 36, the third magnetic field 38, and the fourth magnetic field 40 being separately identifiable. Additionally, the first magnetic field 34 and the fourth magnetic field 40 are orthogonal and referred to as a first pair of orthogonal magnetic fields. Similarly, the second magnetic field 36 and the third magnetic field 38 are orthogonal and referred to as a second pair of orthogonal magnetic fields.

It should be noted that the first magnetic field 34 and the fourth magnetic field 40 need not be orthogonal to remain within the scope and spirit of the present invention. Additionally, it should be noted that the second magnetic field 36 and the third magnetic field 38 need not be orthogonal to remain within the scope and spirit of the present invention. It should also be noted that while the base station unit 12 of the illustrated embodiment generates two pairs of magnetic fields, the base station unit 12 can generate a single pair of magnetic fields without departing from the scope or spirit of the present invention.

Figure 4:
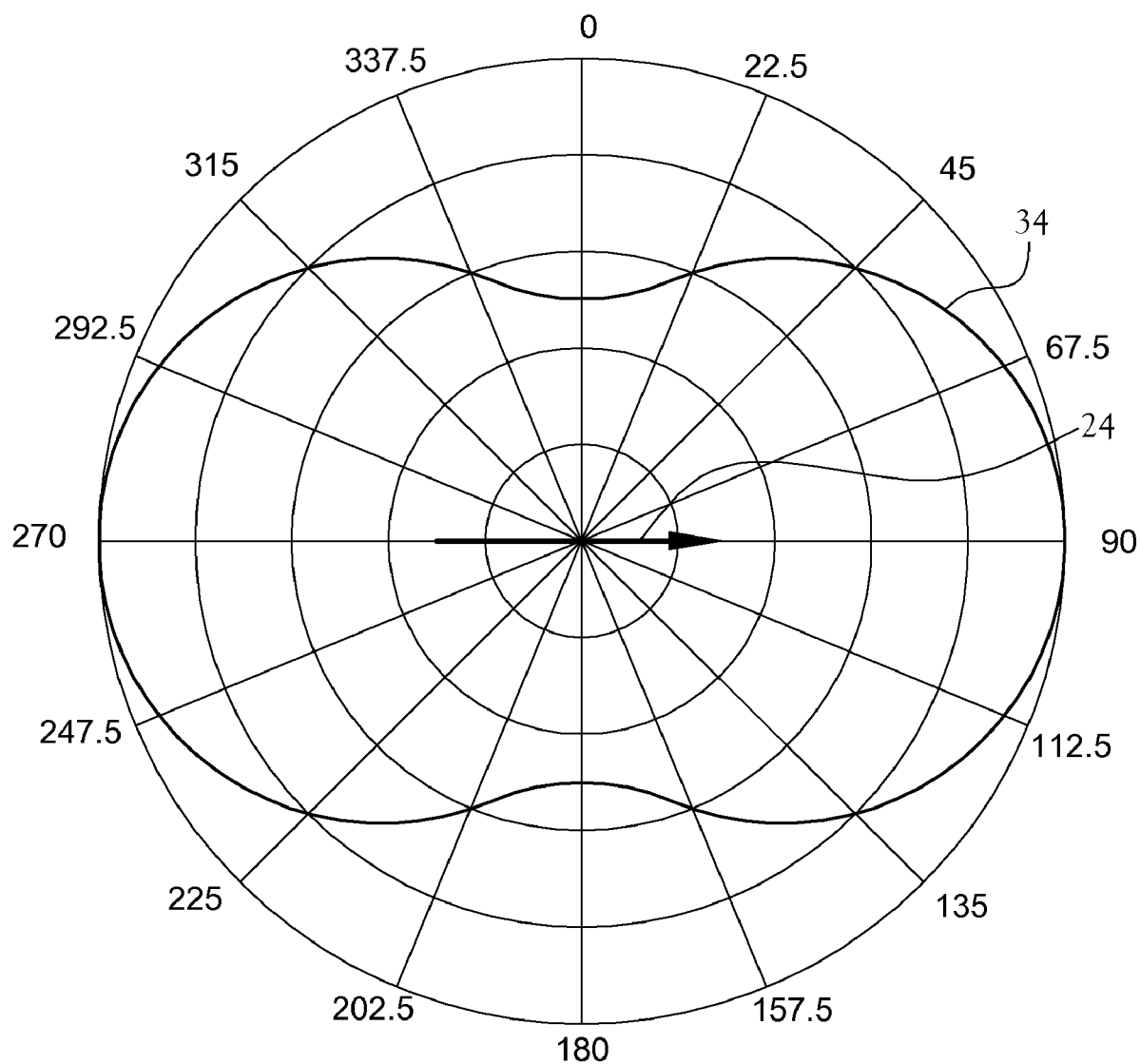
FIG. 4 illustrates the first magnetic field as manifested on the plane of operation.
Figure 5:
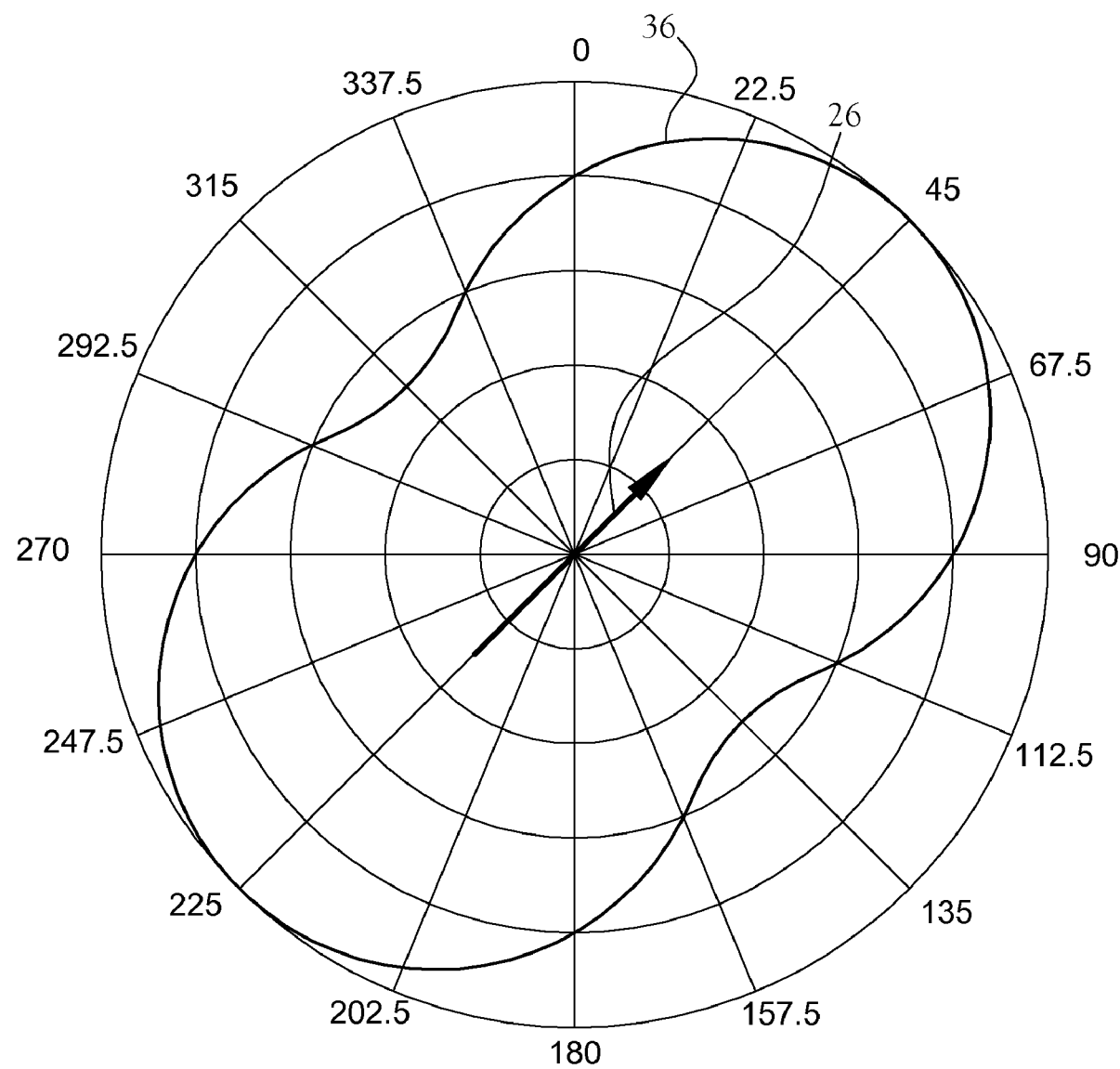
FIG. 5 illustrates the second magnetic field as manifested on the plane of operation.
Figure 6:
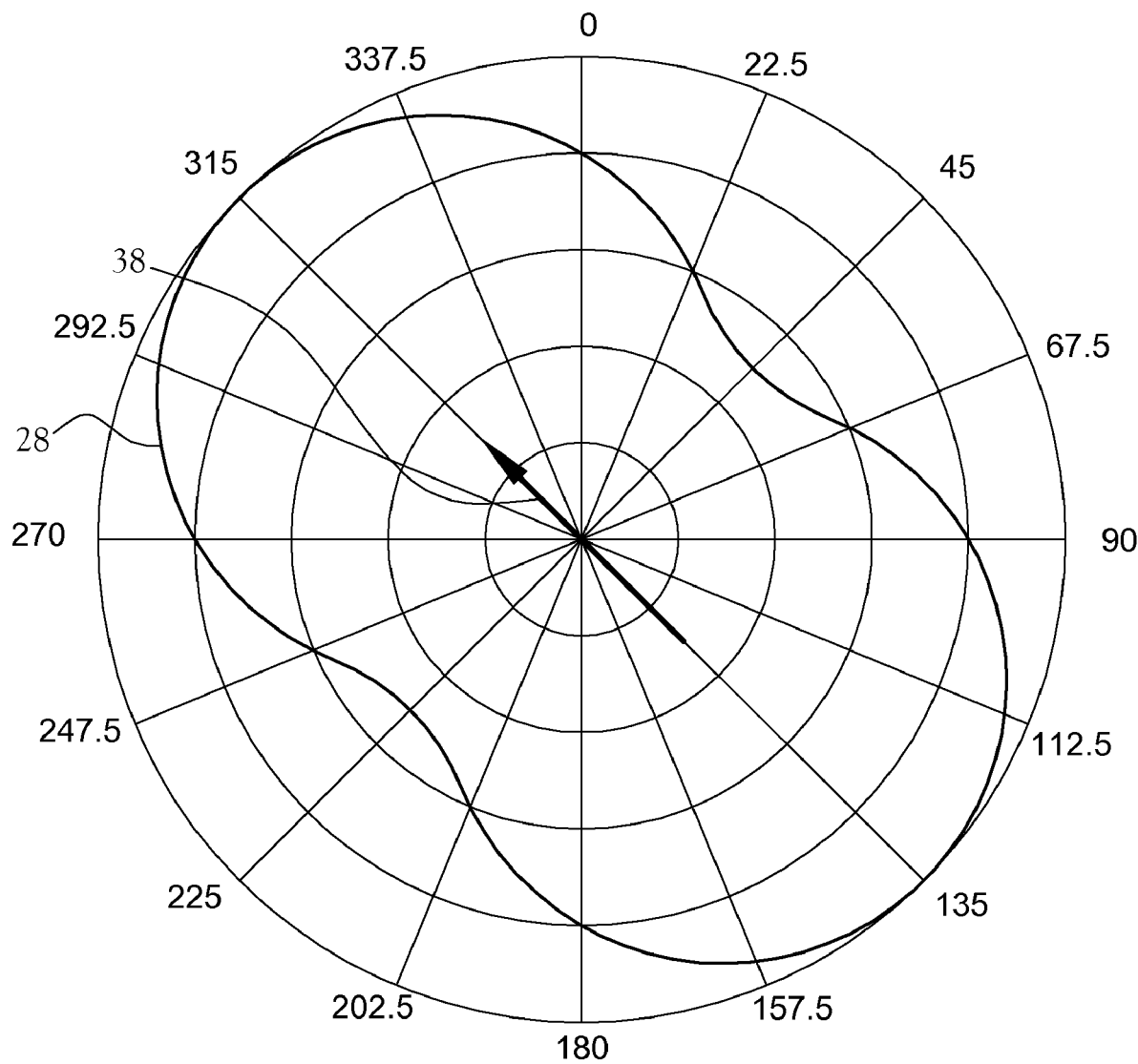
FIG. 6 illustrates the third magnetic field as manifested on the plane of operation.
Figure 7:
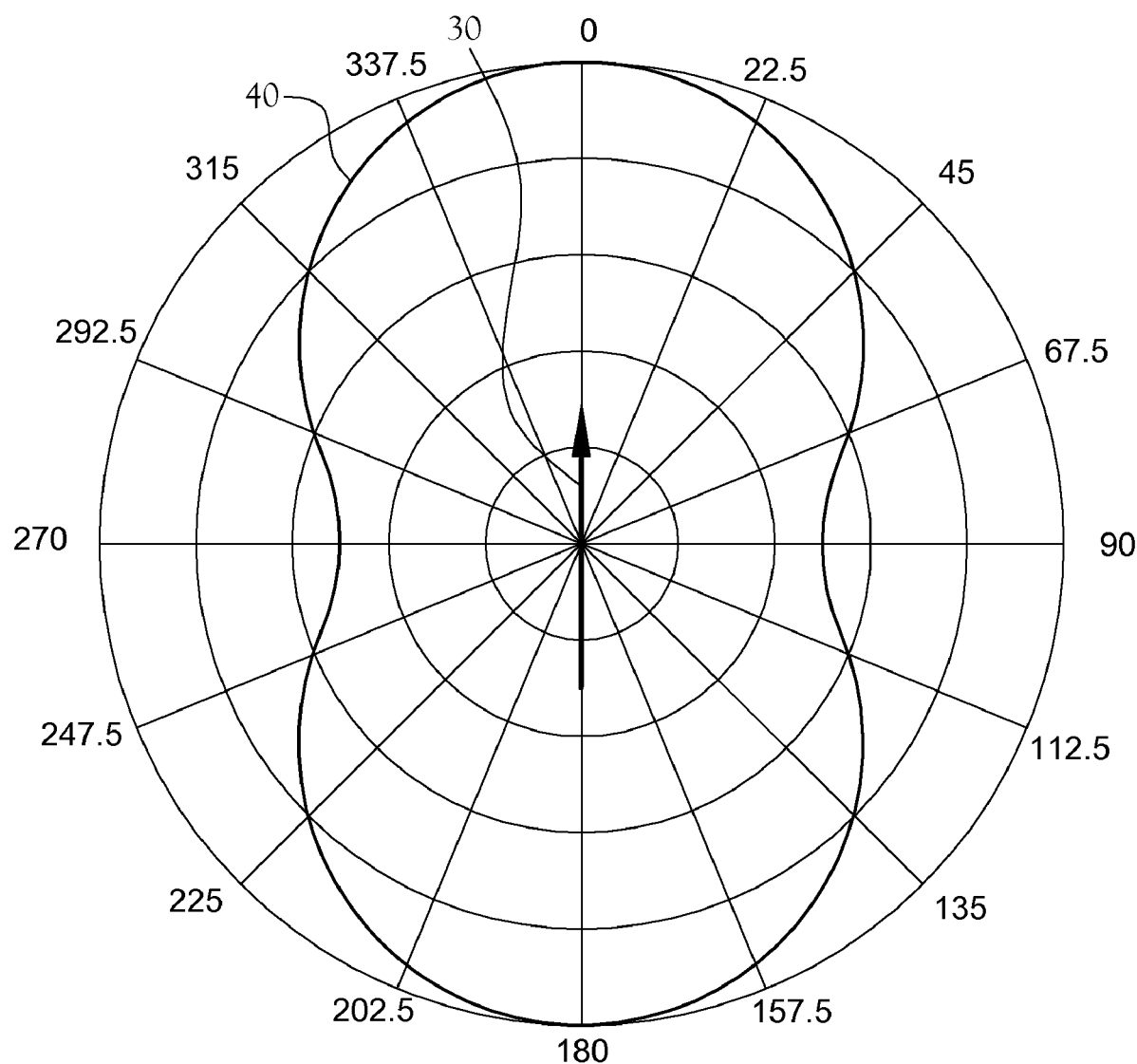
FIG. 7 illustrates the fourth magnetic field as manifested on the plane of operation.
Figure 8:
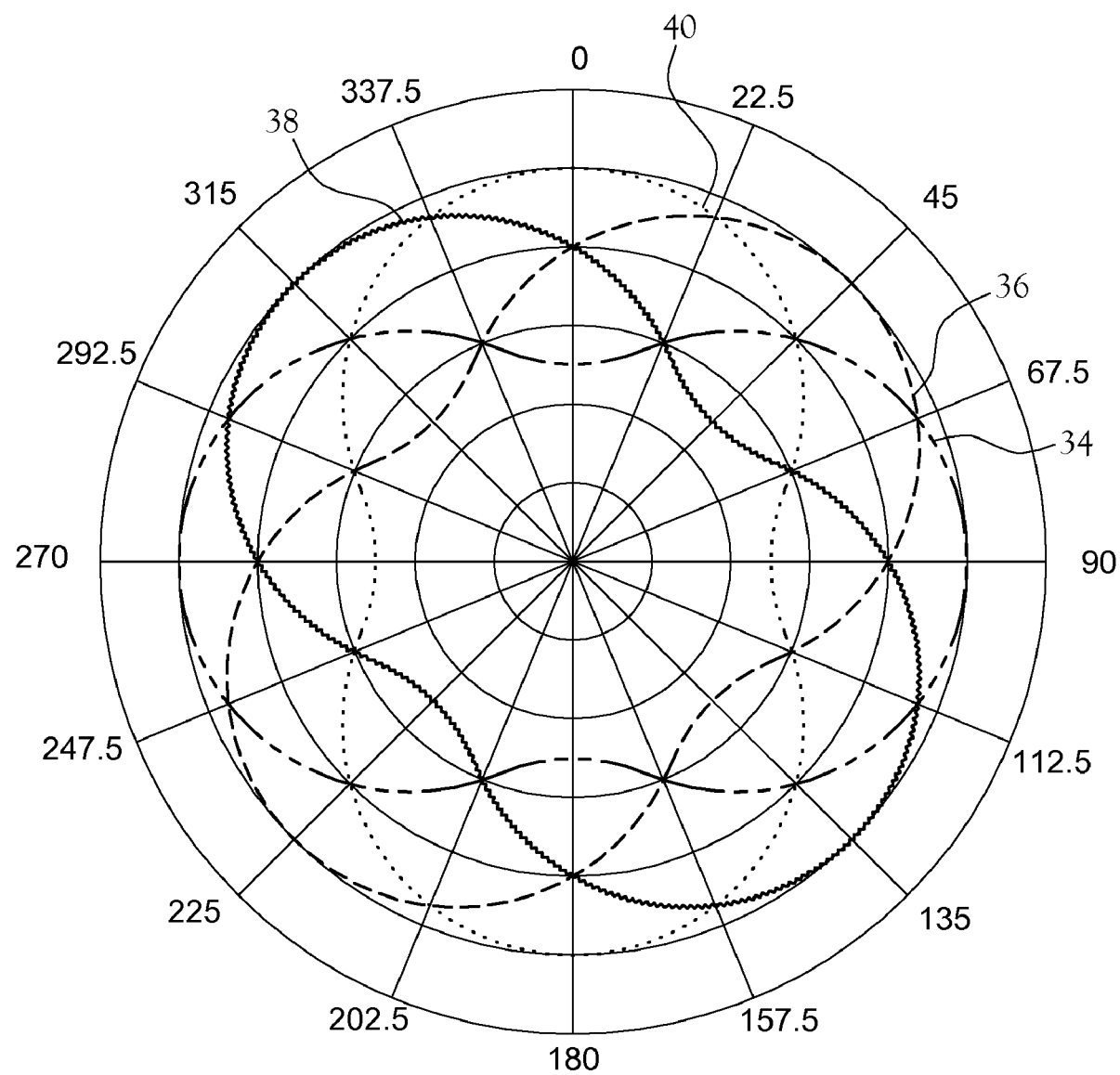
FIG. 8 illustrates the magnetic fields generated by the base station unit.

FIG. 4 illustrates the intensity of the three-dimensional first magnetic field 34 as manifested on the two-dimensional plane of operation. The first principal axis 24 of the first coil 16 is the principal axis of the first magnetic field 34. FIG. 5 illustrates the intensity of the three-dimensional second magnetic field 36 as manifested on the plane of operation. The second principal axis 26 of the second coil 18 is the principal axis of the second magnetic field 36. FIG. 6 illustrates the intensity of the three-dimensional third magnetic field 38 as manifested on the plane of operation. The third principal axis 28 of the third coil 20 is the principal axis of the third magnetic field 38. And FIG. 7 illustrates the intensity of the three-dimensional fourth magnetic field 40 as manifested on the plane of operation. The fourth principal axis 30 of the fourth coil 22 is the principal axis of the fourth magnetic field 40. FIG. 8 illustrates the first magnetic field 34, the second magnetic field 36, the third magnetic field 38, and the fourth magnetic field 40 as manifested on the plane of operation. In the illustrated embodiment, the second pair of magnetic fields is 45° counter-clockwise from the first pair of magnetic fields. The 45° shift between the first pair of magnetic fields and the second pair of magnetic fields facilitates subsequently discussed calculations.

In an alternate embodiment of the boundary proximity determining system 10, the base station unit 12 includes solely the second coil 18 and the third coil 20. In this alternate embodiment, the second coil 18 and the third coil 20 generate the first magnetic field 34, the second magnetic field 36, the third magnetic field 38, and the fourth magnetic field 40. More specifically, the first magnetic field 34 is generated by driving the second coil 18 and invertedly driving the third coil 20. The second magnetic field 36 is generated by driving solely the second coil 18. The third magnetic field 38 is generated by driving solely the third coil 20. And the fourth magnetic field 40 is generated by driving the second coil 18 and the third coil 20.

Figure 1B:
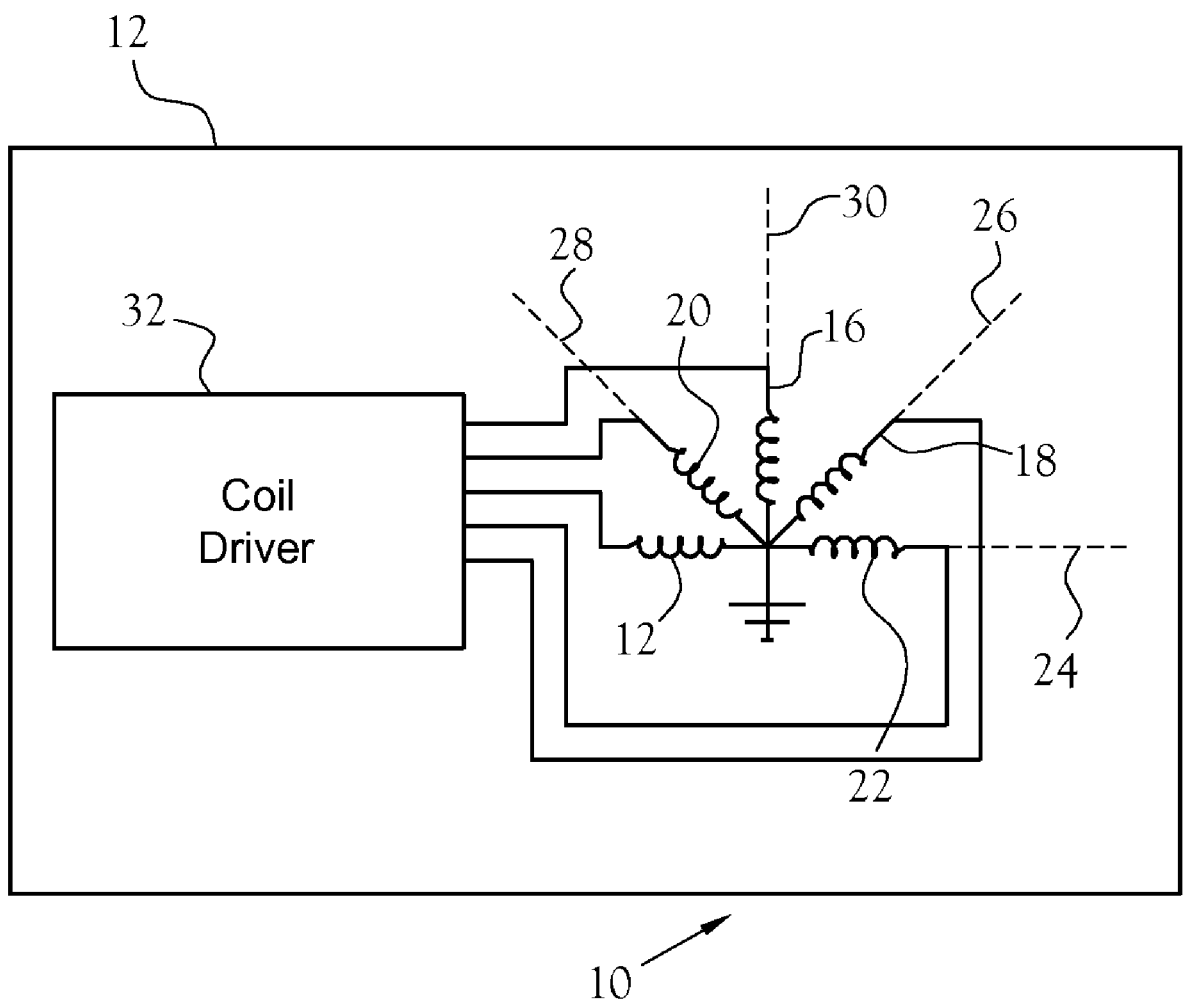
FIG. 1b illustrates the base station unit of the boundary proximity determining system of FIG. 1 including a fifth coil.

In another alternate embodiment of the boundary proximity determining system 10, the base station unit 12 includes a fifth coil 23 in electrical communication with the coil driver 32, as illustrated in FIG. 1b. The fifth coil is oriented such that it is orthogonal to the first coil 16, the second coil 18, the third coil 20, and the fourth coil 22. Accordingly, the fifth coil generates a fifth magnetic field that has a fifth principal axis that is orthogonal to the plane of operation. The fifth magnetic field facilitates particular subsequently discussed calculations that improve the performance of the boundary proximity determining system 10 at locations having localized magnetic field distortion. Additionally, the fifth magnetic field provides a phase reference for subsequently discussed calculations used in resolving mirror image ambiguity.

Returning to FIG. 1, the rover unit 14 includes a magnetic field sensor 42 and a magnetic field measurement processor 44. The magnetic field sensor 42 measures the respective intensities of the first magnetic field 34, the second magnetic field 36, the third magnetic field 38, and the fourth magnetic field 40 at the location of the rover unit 14. More specifically, the magnetic field sensor 42 includes three mutually orthogonal sensor coils, namely an A sensor 46, a B sensor 48, and a C sensor 50. Similar to the coils of the base station unit 12, the A sensor 46, the B sensor 48, and the C sensor 50 have respective principal axes that run coaxially through each respective coil. The B sensor 48 and the C sensor 50 are oriented such that their respective principal axes lie substantially within the plane of operation. The A sensor 46 is oriented such that its principal axis lies perpendicular to the plane of operation. The A sensor 46, the B sensor 48, and the C sensor 50 independently measure the respective intensities of the first magnetic field 34, the second magnetic field 36, the third magnetic field 38, and the fourth magnetic field 40. Consequently, the measurement of each magnetic field, as measured by the magnetic field sensor 42, includes three components, namely an A component, the measurement taken by the A sensor 46, a B component, the measurement taken by the B sensor 48, and a C component, the measurement taken by the C sensor 50. One notation for the intensity of each magnetic field as measured by the magnetic field sensor 42 is as follows.

first magnetic field 34 (M1): $(A_1, B_1, C_1)$
second magnetic field 36 (M2): $(A_2, B_2, C_2)$
third magnetic field 38 (M3): $(A_3, B_3, C_3)$
fourth magnetic field 40 (M4): $(A_4, B_4, C_4)$ In the alternate embodiment of the boundary proximity determining system 10 that utilizes the fifth magnetic field, the intensity of the fifth magnetic field as measured by the magnetic field sensor 42 is noted as follows.

fifth magnetic field (M5): $(A_5, B_5, C_5)$

Additionally, in this alternate embodiment, subsequently discussed calculations that improve the performance of the boundary proximity determining system 10 at locations having localized magnetic field distortion utilize the intensity of the vector sum of the second magnetic field 36 and the fifth magnetic field (M25). The calculations also utilize the intensity of the vector sum of the third magnetic field 38 and the fifth magnetic field (M35). One notation for these magnetic field intensity sums is as follows.

(M25): $(A_{25}, B_{25}, C_{25})$, whereby:

$$A_{25}=(A_2+A_5)$$

$$B_{25}=(B_2+B_5)$$

$$C_{25}=(C_2+C_5)$$

(M35): $(A_{35}, B_{35}, C_{35})$, whereby:

$$A_{35}=(A_3+A_5)$$

$$B_{35}=(B_3+B_5)$$

$$C_{35}=(C_3+C_5)$$

In another alternate embodiment of the boundary proximity determining system 10, the base station unit 12 generates the second pair of orthogonal magnetic fields, namely the second magnetic field 36 and the third magnetic field 38, as discussed above, and the rover unit 14 calculates the first pair of magnetic fields, namely the first magnetic field 34 and the fourth magnetic field 40. More specifically, the base station unit 12 generates the second magnetic field 36 and the third magnetic field 38 such that the magnetic field sensor 42 measures the magnetic fields as discussed above. Conversely, the base station unit 12 does not generate the first magnetic field 34 or the fourth magnetic field 40 such that the magnetic field sensor 42 can measure the magnetic fields. Instead, the rover unit 14 calculates the measurements of the first magnetic field 34 and the fourth magnetic field 40 as they would be measured by the magnetic field sensor 42 if the base station unit 12 had generated the magnetic fields. The rover unit 14 calculates these measurements based on the measurements of the second magnetic field 36 and the third magnetic field 38 taken by the magnetic field sensor 42. More specifically, the equations for calculating the measurements of the first magnetic field 34 and the fourth magnetic field 36 as they would be measured by the magnetic field sensor 42 are as follows.

$$A_1=0.707*A_2-0.707*A_3$$

$$B_1=0.707*B_2-0.707*B_3$$

$$C_1=0.707*C_2-0.707*C_3$$

$$A_4=0.707*A_2+0.707*A_3$$

$$B_4=0.707*B_2+0.707*B_3$$

$$C_4=0.707*C_2+0.707*C_3$$

Magnetic fields having measurements calculated by the rover unit 14, namely the first magnetic field 34 and the fourth magnetic field 36 of the discussed embodiment, are referred to as calculated magnetic fields. Because the base station unit 12 does not actually generate the calculated magnetic fields, the complexity and power consumption of the base station unit 12 are reduced. It should be noted that the particular discussed calculations for the measurements of the first pair of magnetic fields are only applicable when the calculated pair of magnetic fields are shifted 45° from the magnetic fields that are actually generated by the base station unit 12. Other calculations are used when the shift between the generated fields and the calculated fields is not 45°.

Returning to the embodiment of FIG. 1, the magnetic field sensor 42 is in electrical communication with the magnetic field measurement processor 44 such that the measurements by the magnetic field sensor 42 are received by the magnetic field measurement processor 44. The magnetic field measurement processor 44 processes the measurements by the magnetic field sensor 42 to generate a total intensity squared variable for each magnetic field. Because the A sensor 46, the B sensor 48, and the C sensor 50 of the magnetic field sensor 42 are mutually orthogonal, the total intensity squared variable is calculated by squaring the respective intensities as measured by the A sensor 46, the B sensor 48, and the C sensor 50 for each magnetic field and summing each squared intensity. One notation for the total intensity squared variable for each of the first magnetic field 34, the second magnetic field 36, the third magnetic field 38, and the fourth magnetic field 40 is as follows.

total intensity squared variable for $M1(M1S)=(A_1)^2+(B_1)^2+(C_1)^2$ total intensity squared variable for $M2(M2S)=(A_2)^2+(B_2)^2+(C_2)^2$ total intensity squared variable for $M3(M3S)=(A_3)^2+(B_3)^2+(C_3)^2$ total intensity squared variable for $M4(M4S)=(A_4)^2+(B_4)^2+(C_4)^2$ In the alternate embodiment of the boundary proximity determining system 10 that utilizes the fifth magnetic field, the total intensity squared variable for each of the fifth magnetic field, the vector sum M25, and the vector sum M35 is noted as follows.

total intensity squared variable for $M5(M5S)=(A_5)^2+(B_5)^2+(C_5)^2$ total intensity squared variable for $M25(M25S)=(A_{25})^2+(B_{25})^2+(C_{25})^2$ total intensity squared variable for $M35(M35S)=(A_{35})^2+(B_{35})^2+(C_{35})^2$ After calculating the total intensity squared variable for each measured magnetic field, the magnetic field measurement processor 44 calculates particular variables that indicate the θ coordinate of the current location of the rover unit 14. The variables indicative of the θ coordinate of the current location of the rover unit 14 are generally labeled angle-dependent variables. More specifically, two angle-dependent variables are labeled variable a and variable b and are calculated as follows.

$$\text{variable } a = \sqrt{\frac{M4S}{M1S}}$$

$$\text{variable } b = \sqrt{\frac{M3S}{M2S}}$$

Because the first magnetic field 34 and the fourth magnetic field 40 are orthogonal, M1S generally increases when M4S decreases, and M1S decreases when M4S increases. Similarly, because the second magnetic field 36 and the third magnetic field 38 are orthogonal, M2S increases when M3S decreases, and M2S decreases when M3S increases. Consequently, variable a and variable b are more sensitive to the θ coordinate of the current location of the rover unit 14 than M1S, M2S, M3S, or M4S independently. Another angle-dependent variable utilized in calculating the θ coordinate of the current location of the rover unit 14 is the (a+b) variable. The (a+b) variable is the sum of variable a and variable b ((a+b) variable=variable a+variable b).

Figure 9:
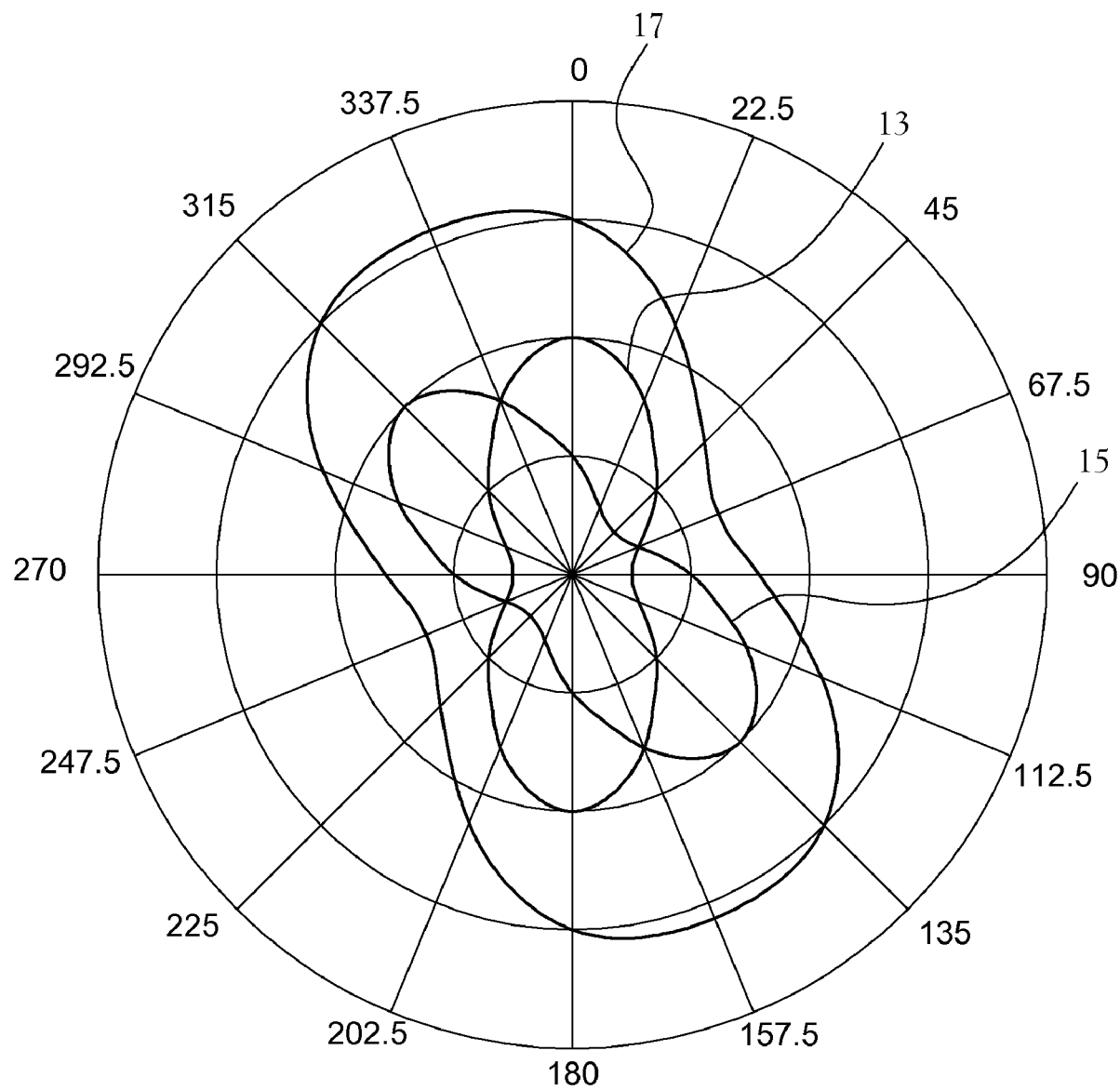
FIG. 9 is a graphical representation of the values of the angle-dependent variables used for indicating the current location of the rover unit.
Figure 10:
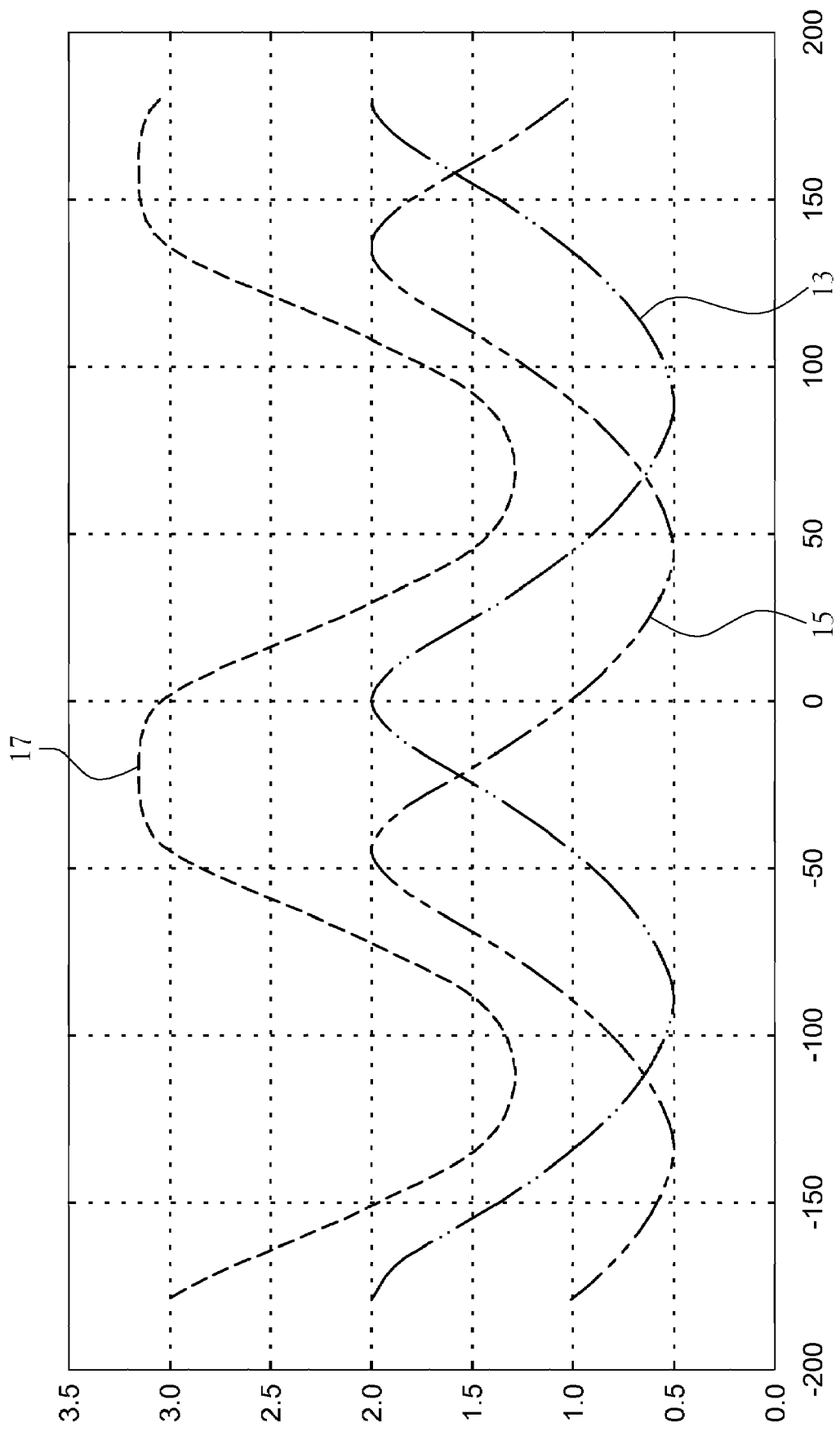
FIG. 10 is an alternate graphical representation of the angle-dependent variables used for indicating the current location of the rover unit.

FIG. 9 is a graphical representation of variable a, variable b, and the (a+b) variable on a circular coordinate plane when the radial distance from the base station 12 is constant, and FIG. 10 is a graphical representation of variable a, variable b, and the (a+b) variable on a Cartesian coordinate plane when the radial distance from the base station 12 is constant, whereby variable a is at 13, variable b is at 15, and the (a+b) variable is at 17. Variable a exhibits an increased sensitivity for the θ coordinate across 45° sectors centered at ±45° and ±135. Additionally, variable b exhibits an increased sensitivity for the θ coordinate across 45° sectors centered at 0°, +90°, and 180°. Consequently, variable b exhibits a maximum sensitivity for the θ coordinate when variable a exhibits a minimum sensitivity for the θ coordinate, and variable b exhibits a minimum sensitivity when variable a exhibits a maximum sensitivity. As a result, considering both variable a and variable b, increased sensitivity for the θ coordinate can be maintained over the complete 360° range of the plane of operation such that variable a and variable b provide consistently reliable information regarding the θ coordinate at which the rover unit 14 is located.

The magnetic field measurement processor 44 also processes the measurements by the magnetic field sensor 42 to generate a variable that indicates the radial distance of the current location of the rover unit 14 from the base station unit 12. This variable is referred to as the range-dependent variable, is inversely dependent on the intensity of the magnetic fields, and indicates the r coordinate of the rover unit 14. Because the first magnetic field 34 and fourth magnetic field 40 are orthogonal, the quadrature combination of the first magnetic field 34 and the fourth magnetic field 40, namely the sum of the respective total intensity squared variables, is constant for any θ coordinate. Similarly, because the second magnetic field 36 and third magnetic field 38 are orthogonal, the quadrature combination of the second magnetic field 36 and the third magnetic field 38 is constant for any θ coordinate. Consequently, the radial distance-dependant variable is either the sum of M1S and M4S or the sum of M2S and M3S, each sum generating an equivalent result. One notation for the range-dependent variable is as follows.

range-dependent variable($M14S$)=$M1S+M4S$, or range-dependent variable($M23S$)=$M2S+M3S$ It should be noted that angle-dependent and range-dependent variables other than variable a, variable b, and the range-dependent variable, as defined above, can be used without departing from the scope or spirit of the present invention.

Although variable a, variable b, and the range-dependent variable indicate the location of the rover unit 14 with respect to the base station unit 12, the presence of localized magnetic field distortion reduces the accuracy of the calculated variables. Localized magnetic field distortion is generated by sources such as current flowing in buried cables and electrically conductive piping. The alternate embodiment of the wireless containment device 10 that utilizes the fifth magnetic field reduces the undesired impact of localized magnetic field distortion. More specifically, the magnetic field measurement processor 44 calculates and considers variables facilitated by the fifth magnetic field, namely cos $\theta_{25}$ and cos $\theta_{35}$. $\theta_{25}$ is the angle between the vector direction of the fifth magnetic field and the vector direction of the second magnetic field 36. And $\theta_{35}$ is the angle between the vector direction of the fifth magnetic field and the vector direction of the third magnetic field 38. Because the fifth magnetic field is designed to be orthogonal to the plane of operation, $\theta_{25}$ and $\theta_{25}$ are theoretically 90° such that cos $\theta_{25}$ and cos $\theta_{35}$ have a value of zero. However, the presence of localized magnetic field distortion causes the respective values of cos $\theta_{25}$ and cos $\theta_{35}$ to vary from zero. Consequently, cos $\theta_{25}$ and cos $\theta_{35}$ are sensitive to localized magnetic field distortion to the extent that the variables are adequate indicators of the presence of localized magnetic field distortion. The magnetic field measurement processor 44 utilizes the values of cos $\theta_{25}$ and/or cos $\theta_{35}$ to account for the presence and magnitude of the localized magnetic field distortion when utilizing the angle-dependent variables and the range-dependent variables to indicate the location of the rover unit 14 with respect to the base station 12. cos $\theta_{25}$ and cos $\theta_{35}$ are calculated as follows.

$$\cos\theta_{25} = \frac{M2S + M5S - M25S}{2\sqrt{M2S * M5S}}$$

$$\cos\theta_{35} = \frac{M3S + M5S - M35S}{2\sqrt{M3S * M5S}}$$

It should be noted that the calculation of variable a, variable b, the (a+b) variable, cos $\theta_{25}$, and cos $\theta_{35}$ requires a square root math operation. To avoid this complicated computation, (variable a)$^2$, (variable b)$^2$, the (a$^2$+b$^2$) variable, the (a$^2$−b$^2$) variable, $f_{25}$, and $f_{35}$ can be used in place of variable a, variable b, the (a+b) variable, the (a−b) variable, cos $\theta_{25}$, and cos $\theta_{35}$, respectively. The calculations for $f_{25}$ and $f_{35}$ are as follows.

$$f_{25} = \frac{1}{4}\left[2 + \frac{(M2S^2 + M5S^2 - M25S^2)}{(M2S * M5S)}\right]$$

$$f_{35} = \frac{1}{4}\left[2 + \frac{(M3S^2 + M5S^2 - M35S^2)}{(M3S * M5S)}\right]$$

In another alternate embodiment, the boundary proximity determining system 10 reduces the undesired impact of localized magnetic field distortion by virtually rotating the base station unit 12 about an axis that is at the center of the base station unit 12 and that is perpendicular to the plane of operation. Generally, the boundary proximity determining system 10 virtually rotates the base station unit 12 to a position where the magnetic fields generated by the base station unit 12 are least impacted by the localized magnetic field distortion. More specifically, the boundary proximity determining system 10 virtually rotates the base station unit 12 such that coupling between the magnetic fields generated by the base station unit 12 and parasitic currents generated by, for example, buried cables or electrically conductive piping is minimized. To minimize this coupling, the rover unit 14 virtually rotates the base station unit 12 at 1° increments across a range of −90° to 90° and determines the angle of rotation that variable a, variable b, and the (a+b) variable behave the most desirably. The rover unit 14 virtually rotates the base station unit 12 by calculating the measurements of the magnetic fields as they would be if the base station unit 12 was actually rotated. These would-be magnetic field measurements are calculated from the actual measurements of the actual magnetic fields generated by the base station unit 12, which has an actual angle of rotation of 0°. In the discussed embodiment, these would-be magnetic field measurements are calculated from the actual measurements taken by the magnetic field sensor 42 of the alternate embodiment of the boundary proximity determining system 10 that actually generates the second pair of magnetic fields and indirectly generates the first pair of magnetic fields. The equations for virtually rotating the base station unit 12 are as follows, whereby $\theta_{ROT}$ is the angle of rotation.

$A_1(\theta_{ROT})=\cos(\theta_{ROT}+45)*A_2-\sin(\theta_{ROT}+45)*A_3$ $B_1(\theta_{ROT})=\cos(\theta_{ROT}+45)*B_2-\sin(\theta_{ROT}+45)*B_3$ $C_1(\theta_{ROT})=\cos(\theta_{ROT}+45)*C_2-\sin(\theta_{ROT}+45)*C_3$ $A_2(\theta_{ROT})=\cos(\theta_{ROT})*A_2-\sin(\theta_{ROT})*A_3$ $B_2(\theta_{ROT})=\cos(\theta_{ROT})*B_2-\sin(\theta_{ROT})*B_3$ $C_2(\theta_{ROT})=\cos(\theta_{ROT})*C_2-\sin(\theta_{ROT})*C_3$ $A_3(\theta_{ROT})=\sin(\theta_{ROT})*A_2+\cos(\theta_{ROT})*A_3$ $B_3(\theta_{ROT})=\sin(\theta_{ROT})*B_2+\cos(\theta_{ROT})*B_3$ $C_3(\theta_{ROT})=\sin(\theta_{ROT})*C_2+\cos(\theta_{ROT})*C_3$ $A_4(\theta_{ROT})=\sin(\theta_{ROT}+45)*A_2+\cos(\theta_{ROT}+45)*A_3$ $B_4(\theta_{ROT})=\sin(\theta_{ROT}+45)*B_2+\cos(\theta_{ROT}+45)*B_3$ $C_4(\theta_{ROT})=\sin(\theta_{ROT}+45)*C_2+\cos(\theta_{ROT}+45)*C_3$ For determining the angle of rotation that variable a, variable b, and the (a+b) variable behave most desirably, the behavior of variable a, variable b, and the (a+b) variable is only acceptable when the (a+b) variable has a particular value exactly 4 times. In the graphical representation of FIG. 10, the (a+b) variable has a value of 2.209 exactly 4 times. From the angles of rotation at which the behavior of variable a, variable b, and the (a+b) variable is acceptable, the rover unit 14 calculates a goodness measurement (GM) at each angle. The goodness measurement (GM) indicates the impact of localized magnetic field distortion on the magnetic fields generated by the base station unit 12. When there is no distortion present, variable a and variable b have a minimum value of 0.500 and a maximum value of 2.00, as illustrated in FIG. 10. Accordingly, the goodness measurement (GM) is calculated as follows.

$GM=|2.00-(\text{variable } a)_{MAX}|+|0.500-(\text{variable } a)_{MIN}|$,
or $GM=|2.00-(\text{variable } b)_{MAX}|+|0.500-(\text{variable } b)_{MIN}|$ An angle of rotation rendering a goodness measurement (GM) of zero indicates no localized magnetic field distortion at that angle. Accordingly, the angle of rotation rendering a goodness measurement (GM) having the smallest value renders the angle-dependent variables that behave most desirably. Consequently, the angle-dependent variables and the range-dependent variable are calculated from the magnetic field measurements that would be taken at the angle of rotation exhibiting the smallest goodness measurement (GM) value.

In the above discussion, the magnetic field measurement processor 44 calculates the calculated magnetic fields, the angle-dependent variables, the range-dependent variable, the goodness measurement, and various other calculations. However, it should be noted that a processing device other than the magnetic field measurement processor 44 can perform all or part of the calculations performed by the magnetic field measurement processor 44 without departing from the scope or spirit of the present invention. For example, the magnetic field sensor 42 can be in electrical communication with a measurement transmitting device (distinguishable from the auxiliary communications module) that transmits the measurements taken by the magnetic field sensor 42 to a remote processing device, such as the base station unit 12 or a computer. The remote processing device processes the measurements as the magnetic field measurement processor 44 would and transmits the processed measurements to the rover unit 12, which is adapted communicate with the remote processing device. It should also be noted that the measurement transmitting device can transmit information from the rover unit 12 to a computer network, such as the Internet, by way of a modem.

Although variable a, variable b, and the range-dependent variable indicate the location of the rover unit 14 with respect to the base station unit 12, because the boundary is defined arbitrarily and not restricted to symmetrical shapes, the issue of mirror image symmetry presented by the magnetic fields must be resolved.

Figure 11:
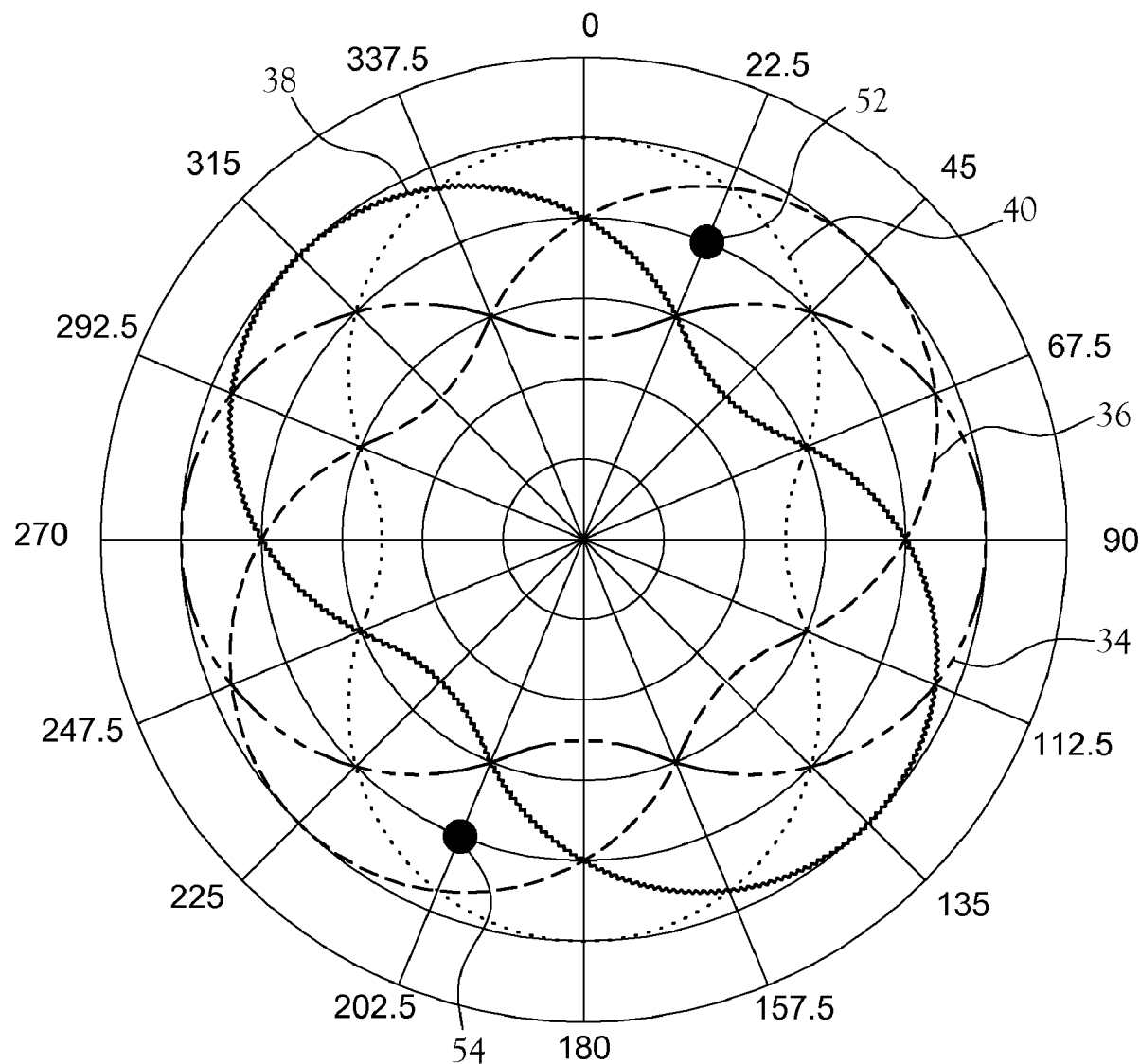
FIG. 11 illustrates the mirror image ambiguity resolved by the boundary proximity determining system.

FIG. 11 illustrates the first magnetic field 34, the second magnetic field 36, the third magnetic field 38, the fourth magnetic field 40, an actual location 52, and a mirror location 54. When the magnetic field measurement processor 44 processes the measurements of the magnetic field sensor 42 into angle- and range-dependent variables indicative of the current location of the rover unit 14 with respect to the base station unit 12, as discussed above, the angle- and range-dependent variables indicate two locations, namely the actual location 52 and the mirror location 54. The actual location 52 represents the current location of the rover unit 14. The mirror location 54 represents the mirror image of actual location 52 with respect to the base station unit 12. The magnetic field measurement processor 44 renders the mirror location 54 in addition to the actual location 52 because of the mirror image symmetry of the first magnetic field 34, the second magnetic field 36, the third magnetic field 38, and the fourth magnetic field 40, a fundamental property of magnetic fields. In general terms, at any given location within the plane of operation, the intensities of the magnetic fields as measured by the magnetic field sensor 42 are identical to the intensities of a location that is symmetrical to the given location with respect to the source of the magnetic fields. In the illustrated embodiment, as previously mentioned, the actual location 52 represents the current location of the rover unit 14 at the time the magnetic field sensor 42 measures the magnetic fields, and the mirror location 54 represents the mirror image of the actual location 52 with respect to the base station unit 12. To resolve the mirror image symmetry issue, the magnetic field measurement processor 44 calculates a sector variable to distinguish the actual location 52 and the mirror location 54.

Figure 12:
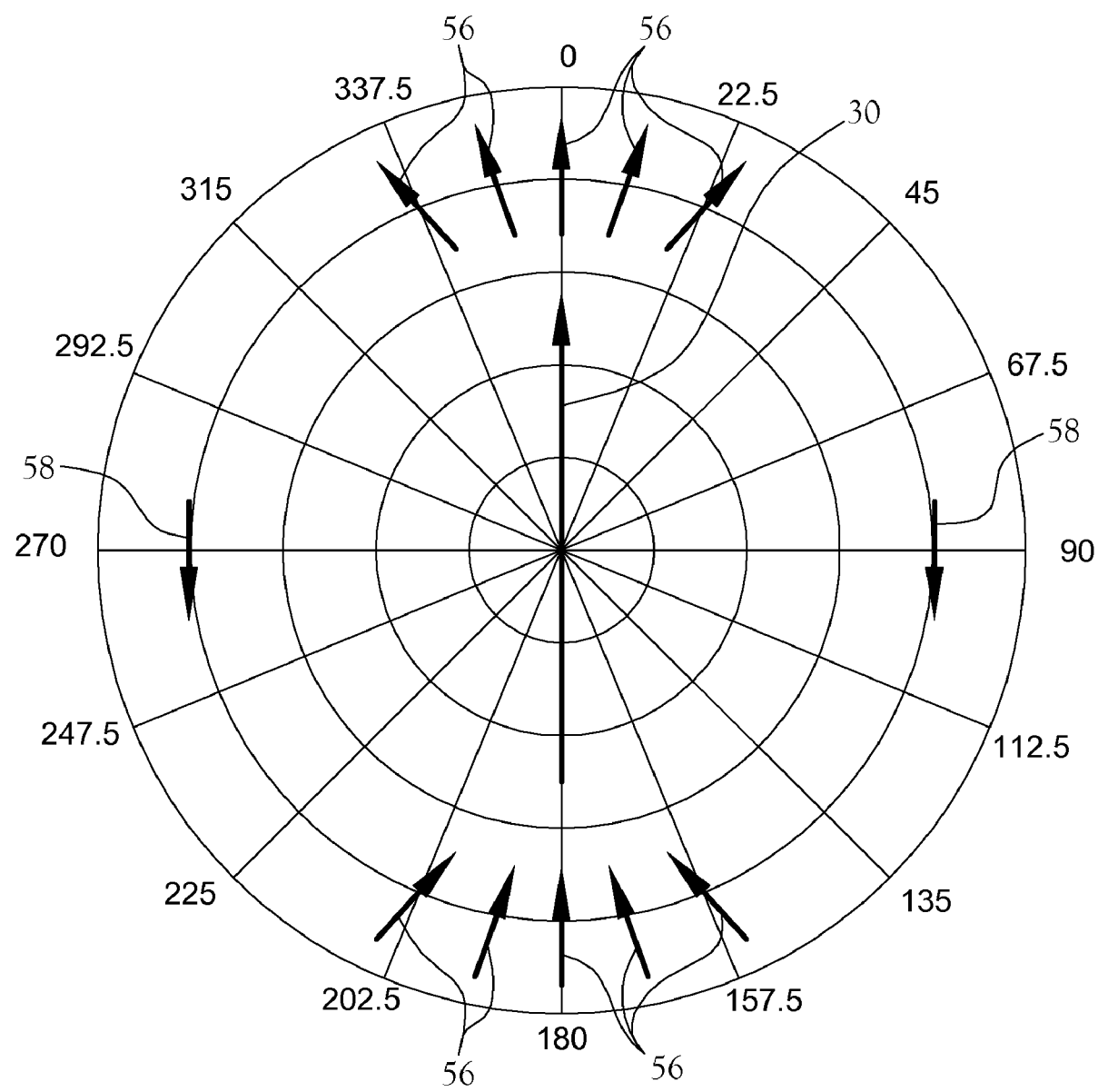
FIG. 12 illustrates the radial components of the fourth magnetic field.

A fundamental property of a dipole magnetic field, such as the first magnetic field 34, the second magnetic field 36, the third magnetic field 38, and the fourth magnetic field 40, is that, in accordance with the polarity of the magnetic field, the magnetic field includes a radial component and a tangential component at each location within the plane of operation. FIG. 12 illustrates the fourth magnetic field 40 in terms of its radial components 56 and its tangential components 58 at particular sections within the plane of operation. A magnetic field has a distinctive in/out direction with respect to the source of the magnetic field when the radial components dominate over the tangential components. And the radial components most dominate the tangential components along the principal axis of the magnetic field. A radial component that has an "in" direction has a direction toward the source of the magnetic field, and a radial component that has an "out" direction has a direction away from the source of the magnetic field. Additionally, whether a radial component has an "in" direction or an "out" direction is determined by the direction of the principal axis of the magnetic field. More specifically, the direction of a radial component is substantially that of the direction of the principal axis. Consequently, in the illustrated embodiment, the radial components 56 that are substantially proximate to the fourth principal axis 30 have a distinctive in/out direction with respect to the base station unit 12. More specifically, in the illustrated embodiment, only the radial components 56 within ±22.5° of the fourth principal axis 30, where the radial components 56 strongly dominate the tangential components 58, are considered. Additionally, the radial components 56 within the θ coordinates ranging clockwise from 157.5° to 202.5° have an "in" direction with respect to the base station unit 12, and the radial components 56 within the θ coordinates ranging clockwise from 337.5° to 22.5° have an "out" direction with respect to the base station unit 12. As a result, when the magnetic field measurement processor 44 calculates the actual location 52 to be within ±22.5° of the fourth principal axis 30, the radial components 56 of the fourth magnetic field 40 at the actual location 52 have either a distinctive "in" direction or a distinctive "out" direction. Additionally, the radial components 56 of the fourth magnetic field 40 at the mirror location 54 have a distinctive in/out direction that is opposite the direction of the radial components 56 at the actual location 52. In the illustrated embodiment, the radial components 56 at the actual location 52 have an "out" direction. Conversely, the radial components 56 at the mirror location 54 have an "in" direction. As a result, the actual location 52 is distinguishable from the mirror location 54.

Figure 13:
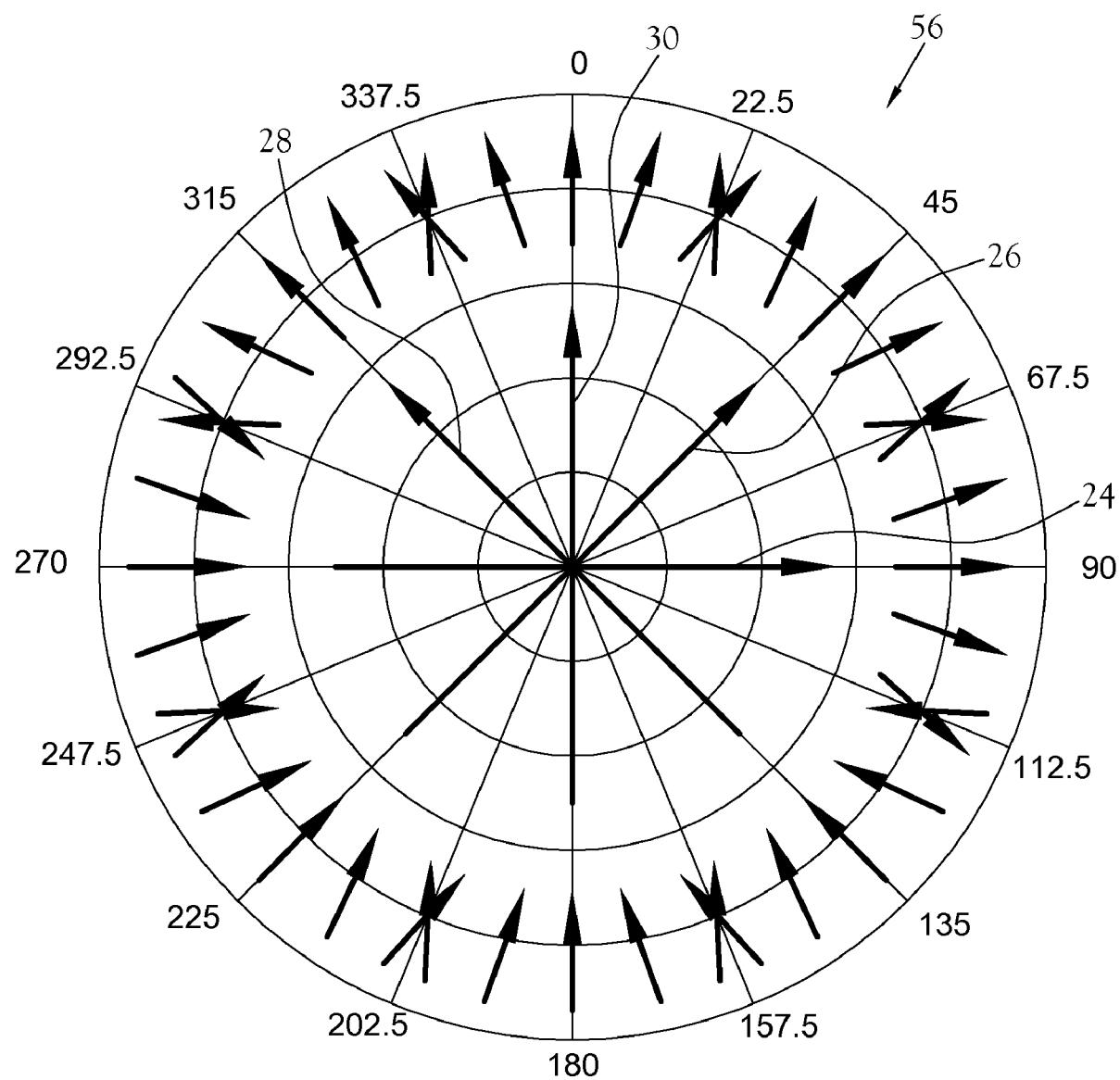
FIG. 13 illustrates the radial components of the magnetic fields generated by the base station unit.

FIG. 13 illustrates the first magnetic field 34, the second magnetic field 36, the third magnetic field 38, and the fourth magnetic field 40 in terms of each magnetic field's respective radial components. As previously discussed, the first magnetic field 34 includes the first principal axis 24, which lies along the 270°/90° line. The second magnetic field 36 includes the second principal axis 26, which lies along 225°/45° line. The third magnetic field 38 includes the third principal axis 28, which lies along the 135°/315° line. And the fourth magnetic field 40 includes the fourth principal axis 30, which lies along the 180°/0° line. Also, as previously discussed, in the illustrated embodiment, only the radial components within ±22.5° of each principal axis are considered such that each radial component has a distinctive in/out direction. Because of the relative positions of the first principal axis 24, the second principal axis 26, the third principal axis 28, and fourth principal axis 30, namely a mutual 45° separation, the entire 360° range provided by the plane of operation is occupied by radial components that have distinctive in/out directions. Consequently, the actual location 52 is distinguishable from the mirror location 54 at all θ coordinates.

Figure 14:
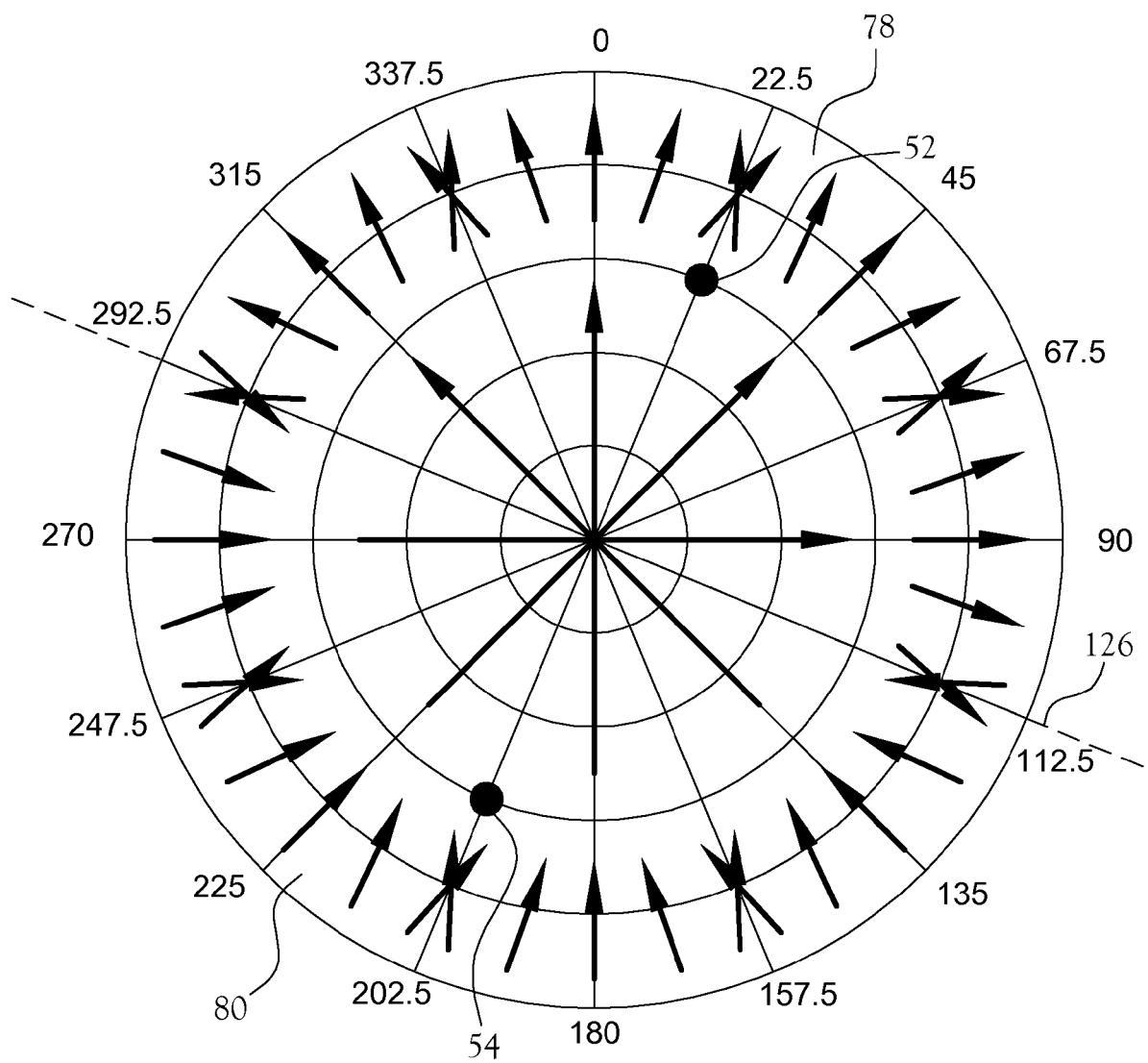
FIG. 14 illustrates the plane of operation divided into two sectors for resolving the mirror image ambiguity.

A systematic approach to resolving the mirror image symmetry issue is to divide the plane of operation into sectors. In one embodiment, as illustrated in FIG. 14, the plane of operation is divided into two sectors. More specifically, the plane of operation is divided along the 112.5°/292.5° line 126, creating an "out" sector 78 and an "in" sector 80. The "out" sector 78 includes the radial components of the first magnetic field 34, the second magnetic field 36, the third magnetic field 38, and the fourth magnetic field 40 that have an "out" direction. The "in" sector 80 includes the radial components of the first magnetic field 34, the second magnetic field 36, the third magnetic field 38, and the fourth magnetic field 40 that have an "in" direction. Considering the discussed properties of mirror image symmetry, the actual location 52 cannot be within the same sector as the mirror location 54. For example, when the actual location 52 is within the "out" sector 78, the mirror location 54 is within the "in" sector 80. This mutually exclusive relationship between the actual location 52 and the mirror location 54 is the basis for the sector variable. More specifically, the sector variable is defined as the sector within which the actual location 52 is situated. In the illustrated embodiment, the sector variable is either the "out" sector 78 or the "in" sector 80. Consequently, the sector variable distinguishes the actual location 52 from the mirror location 54. However, for the magnetic field measurement processor 44 to calculate the sector variable, it must determine the orientation of the C sensor 50 with respect to the base station unit 12 and the polarity of the magnetic field with the most dominate radial components at the actual location 52 with respect to the polarity of the C sensor 50 of the magnetic field sensor 42.

To determine the orientation of the C sensor 50 with respect to the base station unit 12, the orientation of the C sensor 50 with respect to the rover unit 14 and the orientation of the rover unit 14 with respect to the base station unit 12 must be determined. In the illustrated embodiment, the rover unit 14 includes a front side 76, as illustrated in FIG. 1. The direction of the rover unit 14, namely the orientation of the rover unit 14, is defined as the direction of the front side 76 of the rover unit 14 with respect to the remainder of the rover unit 14. Additionally, in the illustrated embodiment, the C sensor 50 is oriented within the rover unit 14 such that the direction of its principal axis is toward the front side 76 of the rover unit 14. Consequently, the direction of the principal axis of the C sensor 50 corresponds to the orientation of the rover unit 14. In one embodiment, the boundary proximity determining system 10 is designed to indicate the occurrence of a host, such as an animal, traversing the boundary. Consequently, the rover unit 14 is carried by the animal. More specifically, the rover unit 14 is carried by the animal such that the front side 76 of the rover unit 14 points toward the head of the animal. Assuming that the animal does not run or walk backwards such that the animal's direction of motion is a forward direction, the animal's direction of motion is indicative of the orientation of the rover unit 14.

The orientation of the rover unit 14 with respect to the base station unit 12 is determined by a motion-based determination process. In other words, the orientation of the rover unit 14 is calculated by determining the animal's direction of motion with respect to the base station unit 12. Accordingly, the animal's direction of motion with respect to the base station unit 12 is calculated by considering the magnetic field measurement history. More specifically, the intensity of the first magnetic field 34, the second magnetic field 36, the third magnetic field 38, and the fourth magnetic field 40, indicated by calculations such as M14S or M23S, decreases emphatically as the radial distance from the base station unit 12 increases. This change in magnetic field intensity is in substantial accordance with the physical law of free space dipole fields, which teaches that the intensity of a magnetic field varies inversely with the 3rd power of the radial distance. Consequently, when the magnetic field measurement processor 44 receives an intensity measurement or calculates an intensity indicative variable, such as M14S or M23S, it stores the magnetic field intensity or intensity indicative variable until it receives or calculates the next magnetic field intensity or intensity indicative variable such that the magnetic field measurement processor 44 compares the most recent intensity-based measurement or calculation to the previous intensity-based measurement or calculation. When the most recent measurement or calculation reveals a larger intensity than the previous measurement or calculation, the magnetic field measurement processor 44 determines that the animal's direction of motion is toward the base station unit 12. Similarly, when the most recent measurement or calculation reveals a smaller intensity than the previous measurement or calculation, the magnetic field measurement processor 44 determines that the animal's direction of motion is away from the base station unit 12. Accordingly, when the magnetic field measurement processor 44 determines that the animal's direction of motion is toward the base station unit 12, it determines that the orientation of the rover unit 14 is toward the base station unit 12 or, in other words, has an "in" direction. Similarly, when the magnetic field measurement processor 44 determines that the animal's direction of motion is away from the base station unit 12, it determines that the orientation of the rover unit 14 is away from the base station unit 12 or, in other words, has an "out" direction.

It should be noted that processes other than the motion-based determination process can be used to determine the orientation of the rover unit 14 without departing from the scope or spirit of the present invention. For example, in one embodiment of the wireless containment device 10, the orientation of the rover unit 14 is externally controlled by an operator such that the orientation of the rover unit 14 is constantly known. In another embodiment, the rover unit 14 includes an auxiliary tracking system that keeps the orientation of the rover unit 14 either toward or away from the base station unit 12.

To determine the polarity of the magnetic field with the most dominate radial components at the actual location 52 with respect to the polarity of the C sensor 50 of the magnetic field sensor 42, the magnetic field with the most dominate radial components at the actual location 52 must be determined. In accordance with the physical properties of a dipole magnetic field, such as the first magnetic field 34, the second magnetic field 36, the third magnetic field 38, and the fourth magnetic field 40, the portion of a magnetic field that is most dominated by radial components generally includes the maximum total intensity squared variable for that magnetic field (M1S, M2S, M3S, or M4S). Consequently, the magnetic field with the largest total intensity squared variable at a given location is likely the magnetic field most dominated by its radial components at the given location. As a result, the sector variable is calculated based on the radial components of the magnetic field with the largest total intensity squared variable at the actual location 52.

As previously stated, for the magnetic field measurement processor 44 to calculate the sector variable, it must determine the polarity of the magnetic field with the most dominate radial components at the actual location 52 with respect to the polarity of the C sensor 50 of the magnetic field sensor 42. When the magnetic field sensor 42 measures the respective intensities of the separately identifiable magnetic fields, the C sensor 50 detects the polarity of each magnetic field at the actual location 52 with respect to the polarity of the C sensor 50. More specifically, the C sensor 50 detects whether the radial components of each measured magnetic field are in substantially the same direction as the principal axis of the C sensor 50 or in substantially the opposite direction of the principal axis of the C sensor 50. For the C sensor 50 to detect the polarity of a magnetic field, the phase of the signal generated by the C sensor 50, the phase of the measured magnetic field, and the phase of a reference signal must be compared. The reference signal must have a phase that is constant throughout all θ coordinates of the plane of operation. One embodiment includes generating a reference signal by applying a modulation signal to the carrier signals of the measured magnetic field, receiving the modulated signal at the rover unit 14, demodulating the modulated signal, and using the demodulated signal as a reference signal. Another embodiment includes generating a reference signal by generating a reference magnetic field that is orthogonal to the first magnetic field 34, the second magnetic field 36, the third magnetic field 38, and the fourth magnetic field 40. The previously discussed fifth magnetic field utilized by an alternate embodiment of the wireless containment device 10 provides a satisfactory reference magnetic field. The fifth magnetic field has a constant direction that is perpendicular to the plane of operation, which renders a constant phase for all values of θ. Consequently, the reference magnetic field serves as a sufficient reference signal for determining the polarity of the measured magnetic field.

When the magnetic field measurement processor 44 receives the magnetic field intensity components as measured by each of the A sensor 46, the B sensor 48, and the C sensor 50 of the magnetic field sensor 42, it also receives the respective polarities of the magnetic fields as detected by the C sensor 50. And as previously discussed, the magnetic field measurement processor 44 calculates the sector variable based on the radial components of the magnetic field with the largest total intensity squared variable at the actual location 52. As a result, for purposes of calculating the sector variable, the magnetic field measurement processor 44 determines whether the principal axis of the C sensor 50 has a direction substantially the same as or substantially opposite the radial components of the magnetic field with the largest squared intensity variable at the actual location 52. With the relative polarity of the magnetic field with largest squared intensity variable determined, the magnetic field measurement processor 44 considers the orientation of the rover unit 14, which is the orientation of the C sensor 50, to determine the sector variable. More specifically, the magnetic field measurement processor 44 defines the sector variable in accordance with the following table.

| Orientation of the Rover Unit | Direction of Radial Components at the Actual Location with Respect to the C Sensor | Sector Variable Based on a Two Sector Division |
|---|---|---|
| "in" | substantially the same | "in" sector |
| "in" | substantially opposite | "out" sector |
| "out" | substantially the same | "out" sector |
| "out" | substantially opposite | "in" sector |

It should be noted that the orientation of the rover unit 14 is required to calculate the sector variable only to the extent that the orientation of the rover unit 14 indicates the orientation of the C sensor 50. Additionally, the orientation of the C sensor 50 can be determined by ways other than by determining the orientation of the rover unit 14 without departing from the scope or spirit of the present invention. For example, in one embodiment of the wireless containment device 10, the orientation of the C sensor 50 is externally controlled by an operator such that the orientation of the C sensor 50 is constantly known. In another embodiment, the C sensor 50 includes an auxiliary tracking system that keeps the orientation of the C sensor 50 either toward or away from the base station unit 12.

One apparent limitation to using the motion-based determination process to determine the orientation of the rover unit 14, and consequently the orientation of the C sensor 50, with respect to the base station unit 12 arises when the direction of motion of the host, such as an animal, is lateral with respect to the base station unit 12 such that orientation of the rover unit 14 is neither "in" nor "out". In one embodiment, whether the orientation of the rover unit 14 is lateral is determined by comparing the most recently calculated M14S or M23S to the previously calculated M14S or M23S. When the most recently calculated M14S or M23S reveals substantially the same value as the previously calculated M14S or M23S, the magnetic field measurement processor 44 determines that the direction of motion of the animal is lateral with respect to the base station unit 12 such that the orientation of the rover device 14 is lateral with respect to the base station unit 12. In another embodiment, whether the orientation of the rover unit 14 is lateral is determined by utilizing the mutually orthogonal orientation of the A sensor 46, the B sensor 48, and the C sensor 50. More specifically, when the orientation of the rover unit 14 is substantially lateral to the base station unit 12, the direction of the principal axis of the C sensor 50 is substantially lateral to the base station unit 12 and the principal axis of the B sensor 48 is substantially toward or away from the base station unit 12. Consequently, when the orientation of the rover unit 14 is substantially lateral with respect to the base station unit 12, the intensity of the magnetic fields as measured by the B sensor 48 is larger than the intensity of the magnetic fields as measured by the C sensor 50. In one embodiment, when the intensity of the magnetic fields as measured by the B sensor 48 is four (4) times the intensity of the magnetic fields as measured by the C sensor 50, the magnetic field measurement processor 44 determines whether the principal axis of the B sensor 48, instead of the C sensor 50, has a direction substantially the same as or substantially opposite the radial components of the magnetic field with the largest squared intensity variable at the actual location 52. With the relative polarity of the magnetic field with the largest squared intensity variable determined, the magnetic field measurement processor 44 considers the orientation of the rover unit 14 to determine the sector variable as discussed above.

In another embodiment of the boundary proximity determining system 10, when the intensity of the magnetic fields as measured by the B sensor 48 is four (4) times the intensity of the magnetic fields as measured by the C sensor 50, namely when the orientation of the rover unit 14 is lateral with respect the base station unit 12, the magnetic field measurement processor 44 determines that the sector variable corresponding to the current location of the rover device 14 remains the same as the previously calculated sector variable. However, when the host, such as an animal, traverses the sector boundary at the 112.5°/292.5° line, for example the animal moves from the "out" sector 78 to the "in" sector 80, with a direction of motion that is lateral with respect to the base station unit 12, the magnetic field measurement processor 44 miscalculates the sector variable. This issue is resolved by further dividing the plane of operation.

Figure 15:
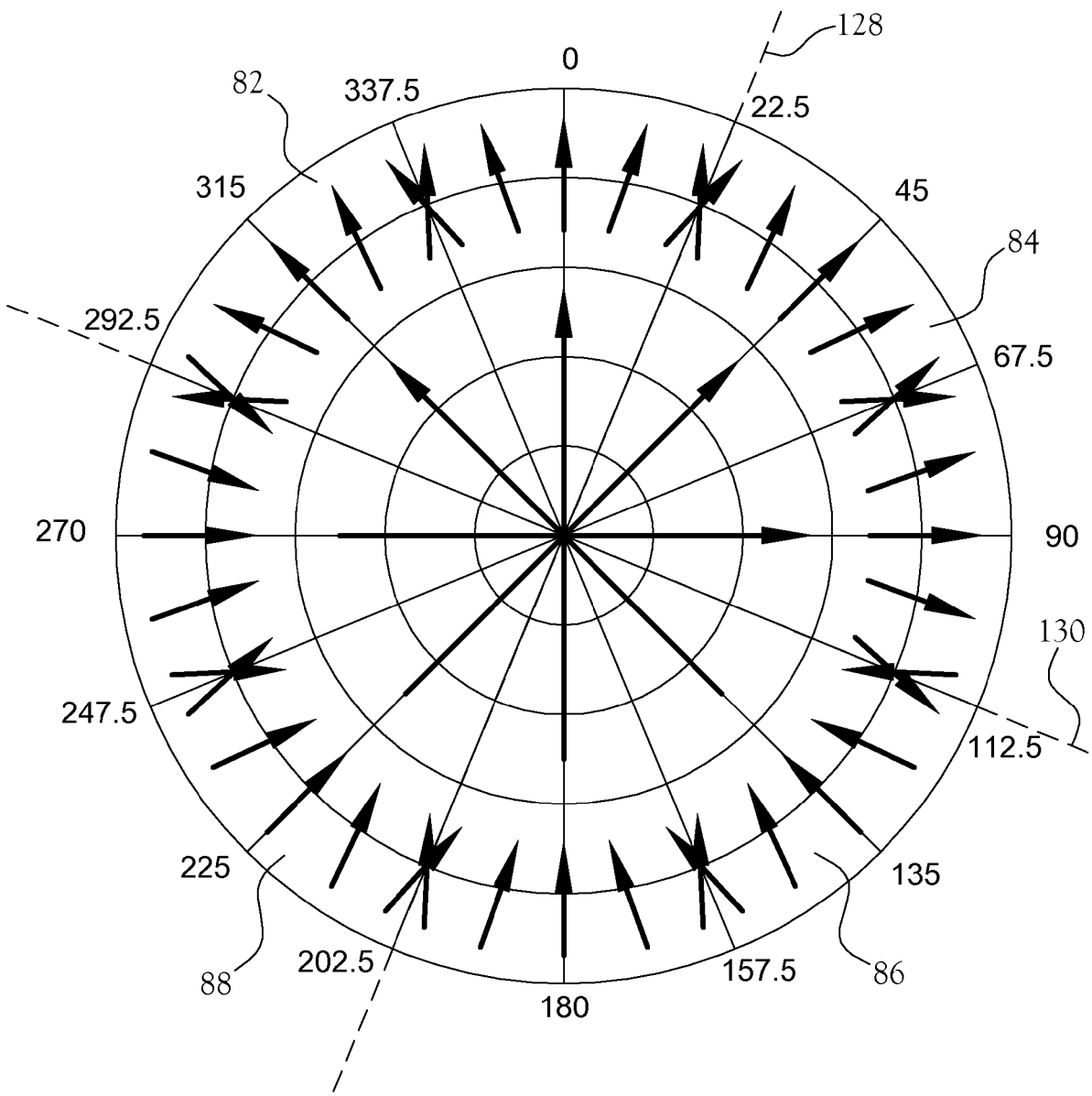
FIG. 15 illustrates the plane of operation divided into four sectors for resolving the mirror image ambiguity.
Figure 16:
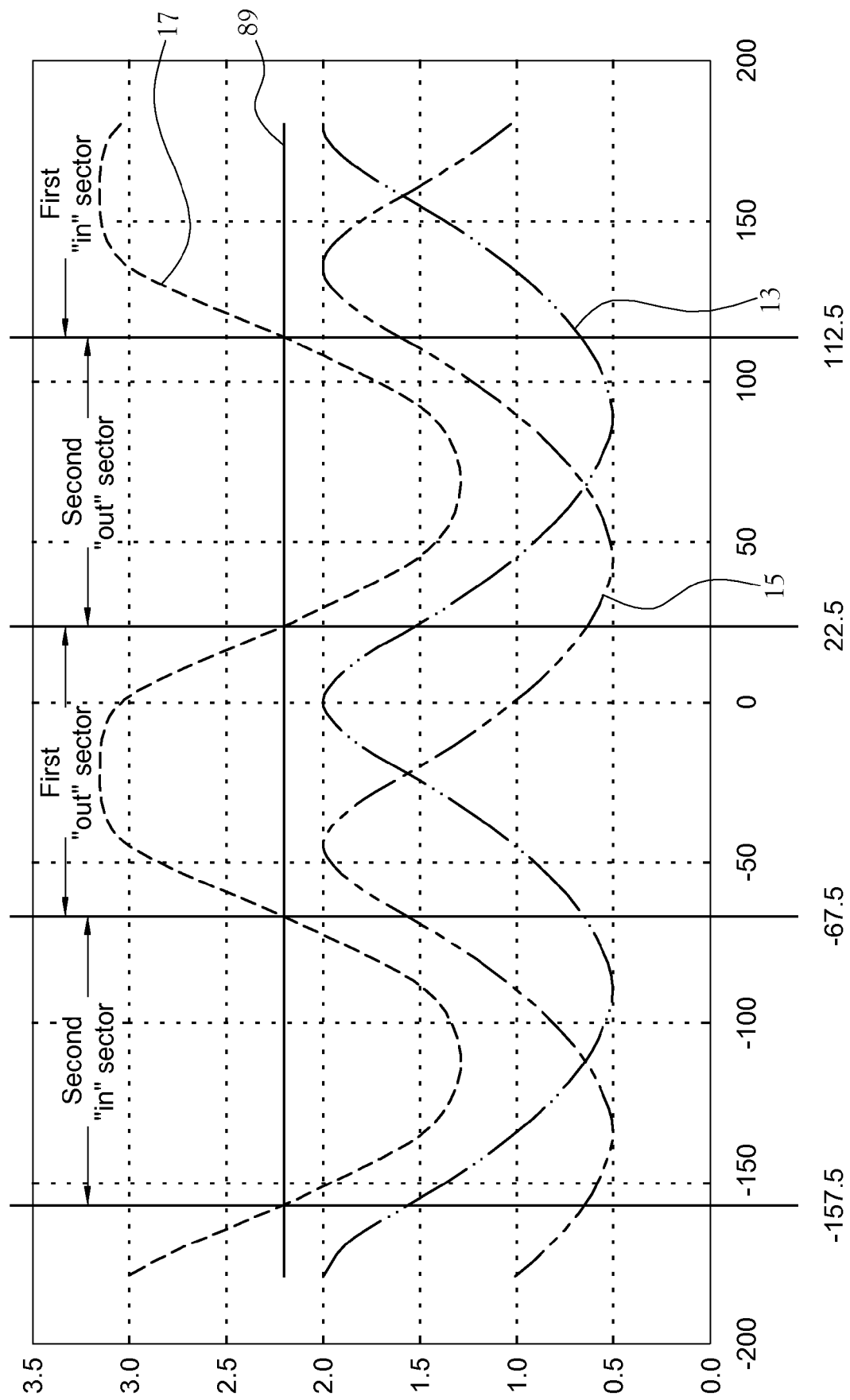
FIG. 16 is a graphical representation of the angle-dependent variables with respect to the four sectors illustrated in FIG. 15.

In one embodiment, as illustrated in FIG. 15, the plane of operation is divided into four sectors. More specifically, the plane of operation is divided along the 112.5°/292.5° line 130 and the 22.5°/202.5° line 128, creating a first "out" sector 82, a second "out" sector 84, a first "in" sector 86, and a second "in" sector 88. Generally, the "out" sector 78 and the "in" sector 80 of FIG. 14 are each divided into two equal sectors. The first "out" sector 82 ranges clockwise from 292.5° to 22.5°. The second "out" sector 84 ranges clockwise from 22.5° to 112.5°. The first "in" sector 86 ranges clockwise from 112.5° to 202.5°. And the second "in" sector 88 ranges clockwise from 202.5° to 292.5°. In one embodiment, the sector boundaries, namely the lines dividing the plane of operation, are located where the (a+b) variable has a value of 2.209, as illustrated at 89 in FIG. 16. Additionally, within the second "out" sector 84 and the second "in" sector 88, the (a+b) variable <2.209. Within the first "out" sector 82 and the first "in" sector 86, the (a+b) variable ≧2.209. The specific θ coordinates of the first "out" sector 82, the second "out" sector 84, the first "in" sector 86, and the second "in" sector 88 resolve the previously discussed sector variable issue associated with a laterally oriented rover unit 14 traversing a sector boundary. Generally, the magnetic field measurement processor 44 calculates whether the rover unit 14 is within the first "out" sector 82 or the second "out" sector 84 or whether the rover unit 14 is within the first "in" sector 86 or the second "in" sector 88 as it would calculate whether the rover unit 14 was within the "out" sector 78 or the "in" sector 80, respectively, as discussed in accordance with FIG. 14. Next, the magnetic field measurement processor 44 determines the sector variable that corresponds with the current location of the rover unit 14 in accordance with the following table.

| Sector Based on a Two Sector Division | (a + b) Variable Values | Sector Based on a Four Sector Division |
|---|---|---|
| "out" sector | (a + b) ≧ 2.209 | first "out" sector |
| "out" sector | (a + b) < 2.209 | second "out" sector |
| "in" sector | (a + b) ≧ 2.209 | first "in" sector |
| "in" sector | (a + b) < 2.209 | second "in" sector |

When the orientation of the rover unit 14 is lateral with respect to the base station unit 12, the magnetic field measurement processor 44 determines that the sector variable corresponding to the current location of the rover unit 14 remains unchanged until the rover unit 14 traverses a sector boundary. The magnetic field measurement processor 44 determines that the rover unit 14 traverses a sector boundary when the (a+b) variable changes from ≧2.209 to <2.209 or changes from >2.209 to ≧2.209. Consequently, the following table assumes that the orientation of the rover unit 14 is lateral with respect to the base station unit 12 and that the previous measurement and the current measurement indicate that the rover unit 14 traversed a sector boundary between the measurements. The magnetic field measurement processor 44 defines the sector variable in accordance with the following table.

| Previous Sector Variable | Previous (a + b) variable | Sector Variable |
|---|---|---|
| first "out" sector | (a − b) variable ≧ 0 | second "out" sector |
| first "out" sector | (a − b) variable < 0 | second "in" sector |
| first "in" sector | (a − b) variable < 0 | second "out" sector |
| first "in" sector | (a − b) variable ≧ 0 | second "in" sector |
| second "out" sector | (a − b) variable ≧ 0 | first "out" sector |
| second "out" sector | (a − b) variable < 0 | first "in" sector |
| second "in" sector | (a − b) variable < 0 | first "out" sector |
| second "in" sector | (a − b) variable ≧ 0 | first "in" sector |

Consequently, even when the orientation of the rover unit 14 is lateral with respect to the base station unit 12, the magnetic field measurement processor 44 reliably calculates the sector variable.

Figure 17:
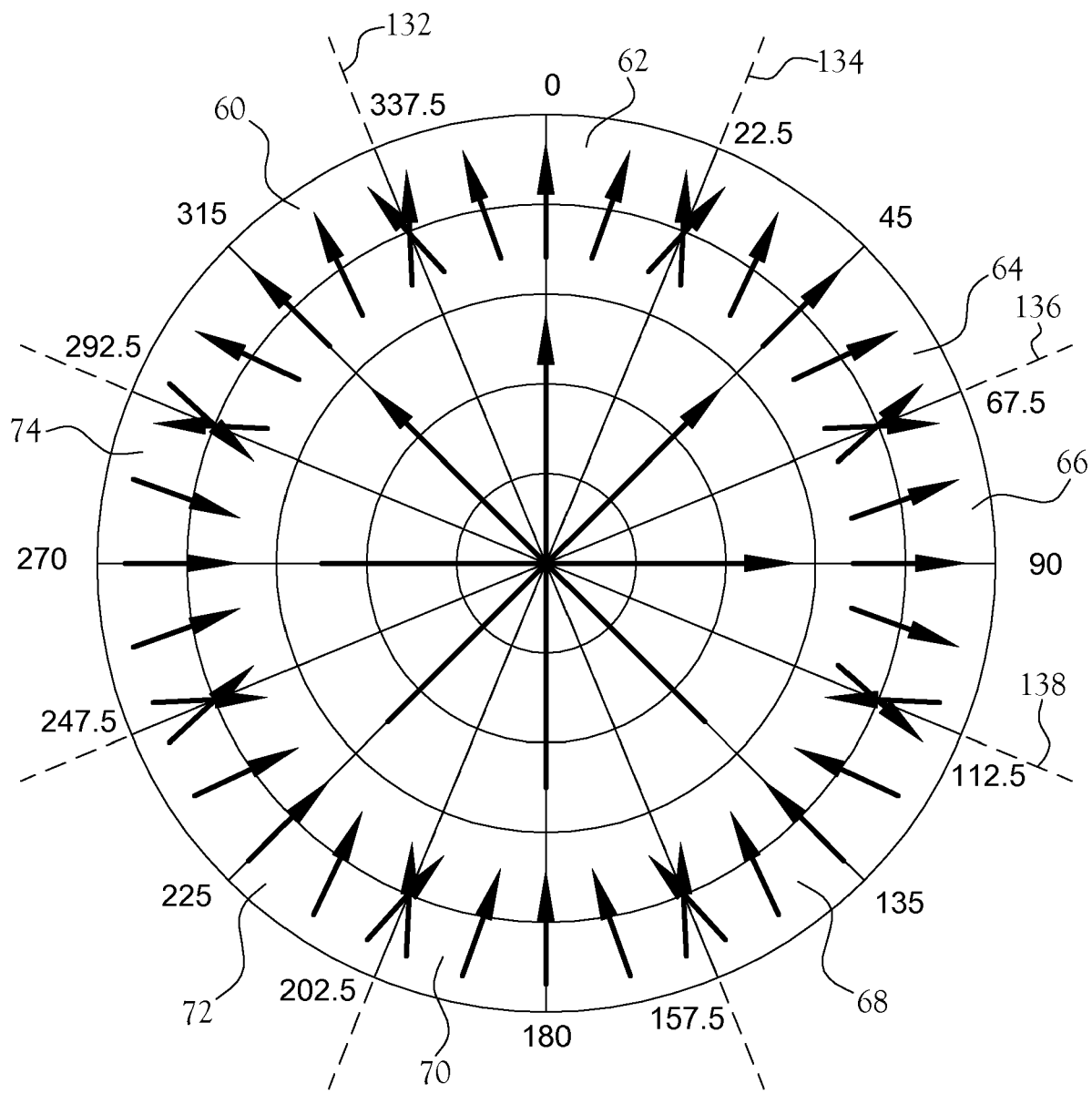
FIG. 17 illustrates the plane of operation divided into eight sectors for resolving the mirror image ambiguity.
Figure 18:
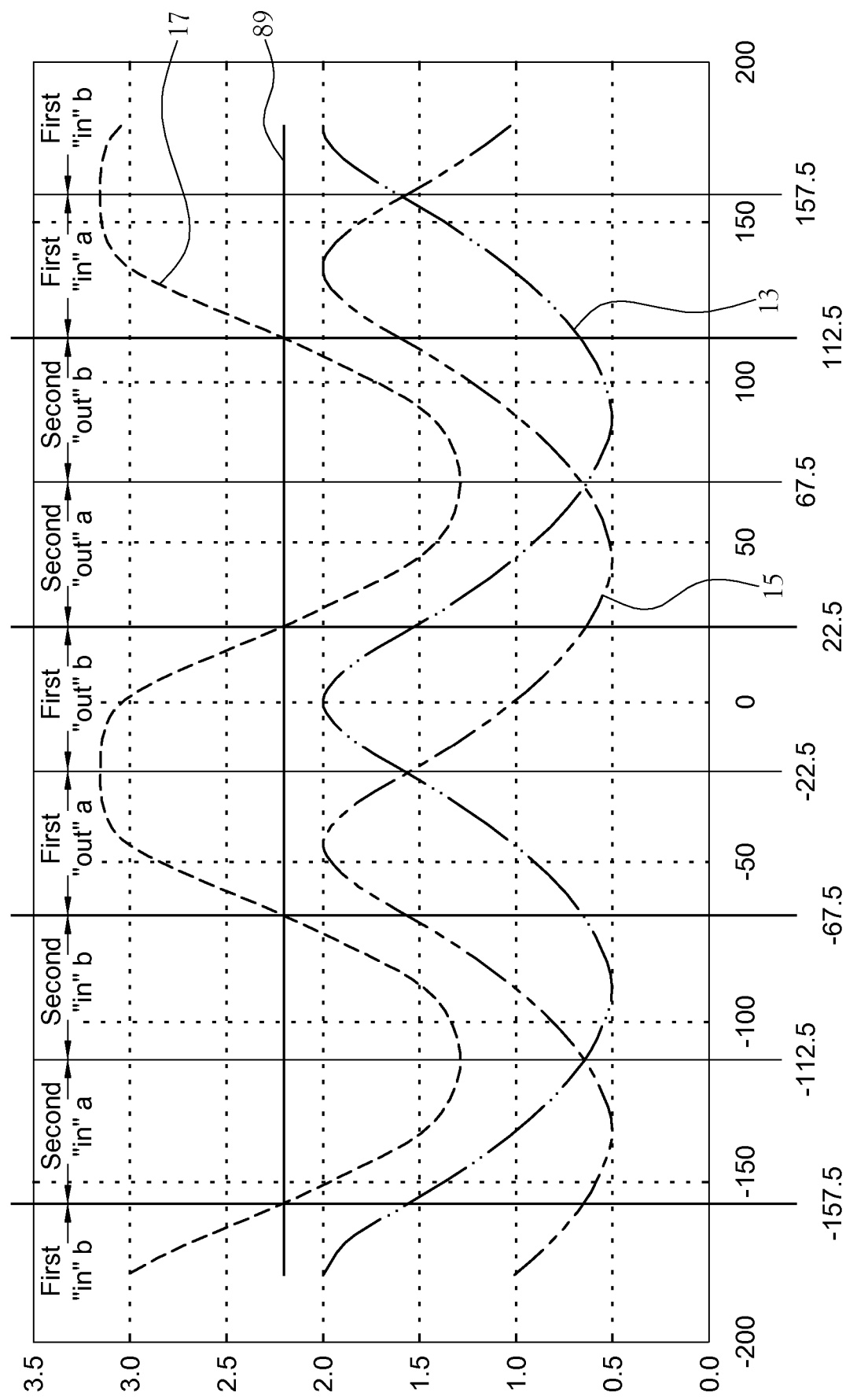
FIG. 18 is a graphical representation of the angle-dependent variables with respect to the eight sectors illustrated in FIG. 17.

In another embodiment of the boundary proximity determining system 10, the plane of operation is divided into eight sectors, as illustrated in FIG. 17. More specifically, the plane of operation is divided along the 202.5°/22.5° line 134, the 247.5°/67.5° line 136, the 292.5°/112.5° line 138, and the 337.5°/157.5° line 132. The sectors of this embodiment include a first "out" a sector 60, ranging clockwise from 292.5° to 337.5°; a first "out" b sector 62, ranging clockwise from 337.5° to 22.5°; a second "out" a sector 64, ranging clockwise from 22.5° to 67.5°; a second "out" b sector 66, ranging clockwise from 67.5° to 112.5°; a first "in" a sector 68, ranging clockwise from 112.5° to 157.5°; a first "in" b sector 70, ranging clockwise from 157.5° to 202.5°; a second "in" a sector 72, ranging clockwise from 202.5° to 247.5°; and a second "in" b sector 74, ranging from 247.5° to 292.5°. As illustrated in FIG. 18, either variable a or variable b has a single value within each sector. Consequently, this embodiment of the boundary proximity determining system 10 is more accurate at determining the θ coordinate of the current location of the rover unit 14 than the embodiment that divides the plane of operation into four sectors.

Generally, the magnetic field measurement processor 44 calculates whether the rover unit 14 is within the first "out" a sector 60 or the first "out" b sector 62, or whether the rover unit 14 is within the second "out" a sector 64 or the second "out" b sector 66, or whether the rover unit 14 is within the first "in" a sector 68 or the first "in" b sector 70, or whether the rover unit 14 is within the second "in" a sector 72 or the second "in" b sector 74 as it would calculate whether the rover unit 14 was within the first "out" sector 82, the second "out" sector 84, the first "in" sector 86, or the second "in" sector 88, respectively, as discussed in accordance with FIG. 15. The magnetic field measurement processor 44 determines the sector variable that corresponds with the current location of the rover unit 14 in accordance with the following chart.

| Sector Based on a Four Sector Division | (a + b) and (a − b) Variable Values | Sector Based on an Eight Sector Division |
|---|---|---|
| first "out" sector | (a + b) ≧ 2.209, (a − b) < 0 | first "out" a sector |
| first "out" sector | (a + b) ≧ 2.209, (a − b) ≧ 0 | first "out" b sector |
| second "out" sector | (a + b) < 2.209, (a − b) ≧ 0 | second "out" a sector |
| second "out" sector | (a + b) < 2.209, (a − b) < 0 | second "out" b sector |
| first "in" sector | (a + b) ≧ 2.209, (a − b) < 0 | first "in" a sector |
| first "in" sector | (a + b) ≧ 2.209, (a − b) ≧ 0 | first "in" b sector |
| second "in" sector | (a + b) < 2.209, (a − b) ≧ 0 | second "in" a sector |
| second "in" sector | (a + b) < 2.209, (a − b) < 0 | second "in" b sector |

As previously discussed, to calculate the sector variable, the angle-dependent variables, and the range-dependent variable for a particular location, the magnetic field sensor 42 must measure the intensities and the polarities of the first magnetic field 34, the second magnetic field 36, the third magnetic field 38, and the fourth magnetic field 40 at the particular location. More specifically, components of the intensities and the polarities as measured by the respective sensors of the magnetic field sensor 42 are utilized to calculate the sector variable, the angle-dependent variables, and the range-dependent variable. Accordingly, the intensities and the polarities of the magnetic fields as measured by the respective sensors of the magnetic field sensor 42 are referred to as magnetic field properties.

In accordance with the above discussion, the boundary proximity determining system 10 provides a wireless boundary having a definable shape. More specifically, the rover unit 14 includes at least two modes of operation, namely a boundary capture mode and a boundary proximity detection mode. When operating in the boundary capture mode, the boundary proximity determining system 10 defines the boundary. When operating in the boundary proximity detection mode, the boundary proximity determining system 10 determines the current location of the rover unit 14 with respect to the boundary and indicates the occurrence of the rover unit 14 traversing the boundary. To facilitate the described modes of operation, the rover unit 14 includes a boundary proximity processor 90, a memory module 92, an auxiliary communications module 94, and a first interfacing module 96, as illustrated in FIG. 1. The memory module 92 is in electrical communication with the first interfacing module 96 and the boundary proximity processor 90. The boundary proximity processor 90 is in electrical communication with the magnetic field measurement processor 44 and the auxiliary communications module 94. Additionally, the boundary proximity determining system 10 includes a user interface device 98, as illustrated in FIG. 1. The user interface device 98 includes a second interfacing module 100, a user interface 102, a boundary capture processor 104, and a boundary storage module 106.

The user interface 102 is in electrical communication with the second interfacing module 100 and the boundary capture processor 104. The boundary capture processor 104 is in electrical communication with the second interfacing module 100 and the boundary storage module 106. The boundary storage module 106 is also in electrical communication with the second interfacing module 100. The second interfacing module 100 is in communication with the first interfacing module 96, which is in electrical communication with the magnetic field measurement processor 44. In one embodiment, the first interfacing module 96 and the second interfacing module 100 are in temporary electrical communication. More specifically, the user interface device 98 is mechanically coupled to the rover unit 14 such that the user interface device 98 is detachable from the rover unit 14. Accordingly, the first interfacing module 96 and the second interfacing module 100 are in electrical communication when the user interface device 98 is mechanically coupled to the rover unit 14. In another embodiment, the first interfacing module 96 and the second interfacing module 100 are in wireless communication.

It should be noted that the user interface device 98 can be mechanically coupled to the rover unit 14 such that the user interface device 98 is not detachable from the rover unit 14 without departing from the scope or spirit of the present invention. Additionally, the components of the user interface device 98 can be included in the rover unit 14 without departing from the scope or spirit of the present invention. However, the embodiment of the boundary proximity determining system 10 that includes the user interface device 98 that is detachable from or in wireless communication with the rover unit 14 reduces the complexity and size of the rover unit 14, minimizing the burden on the host carrying the rover unit 14 in accordance with the various features of the present invention.

The user adjusts various operating parameters of the rover unit 14 by way of the user interface 102 of the user interface device 98. For example, the user sets the mode of operation the rover unit 14 by setting the rover unit 14 to operate in the boundary capture mode or the boundary proximity detection mode by way of the user interface 102. Additionally, the user activates and deactivates the rover unit 14 by way of the user interface 102. The user also adjusts the intensity and type of a stimulus delivered to the host carrying the rover unit 14, such as an animal. In one embodiment, the user interface 102 includes an LCD display and a keypad for adjusting operating parameters of the rover unit 14. It should be noted that the user interface 102 can be used to adjust operating parameters other than the discussed parameters without departing from the scope or spirit of the present invention.

Figure 19:
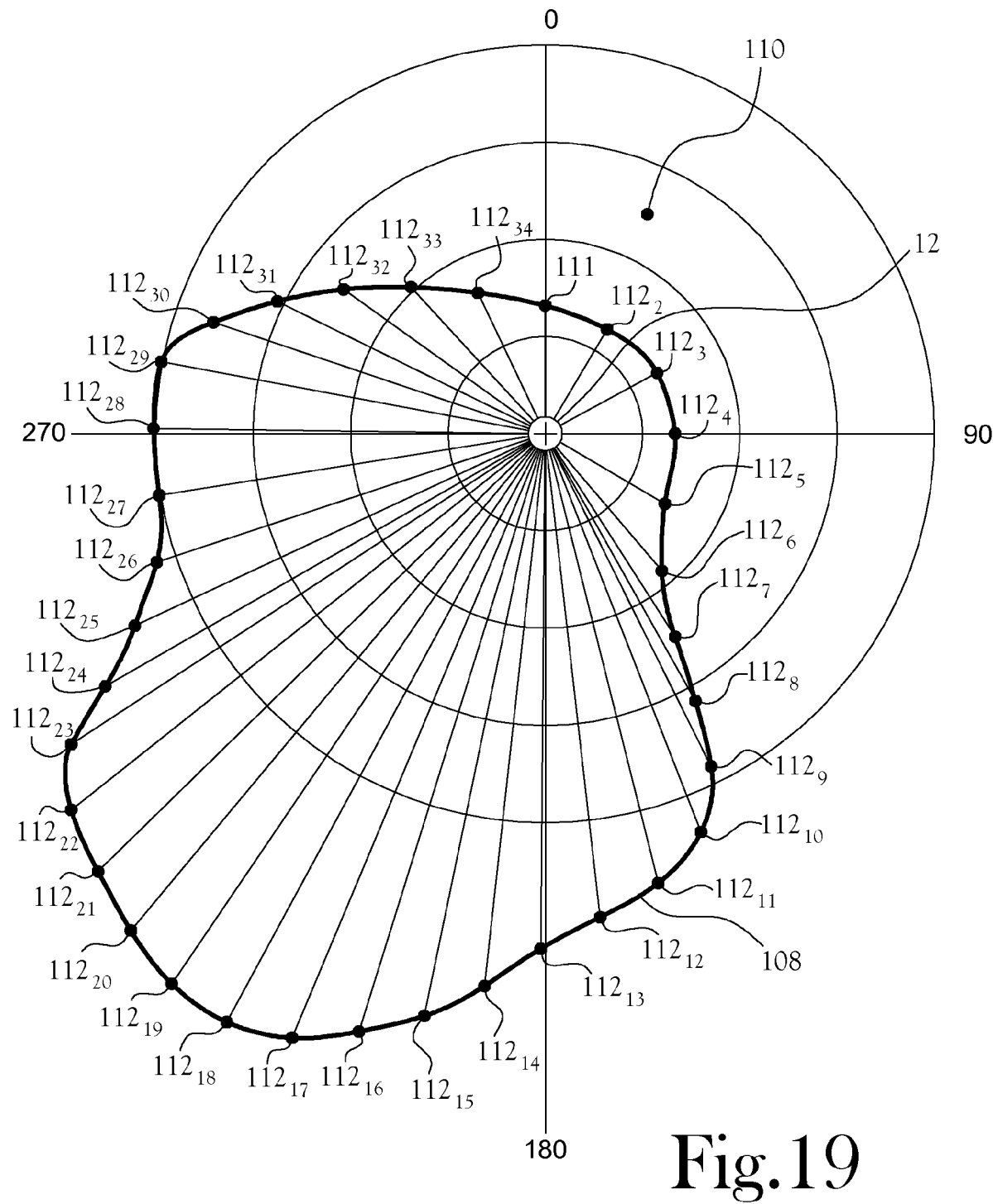
FIG. 19 illustrates a closed boundary in accordance with the various features of the present invention.

FIG. 19 illustrates one embodiment of a boundary 108 defined by the boundary proximity determining system 10 in accordance with the various features of the present invention. To define the boundary 108, the user sets the boundary proximity determining system 10 to operate in the boundary capture mode. After setting the boundary proximity determining system 10 to operate in the boundary capture mode, the user positions the rover unit 14 at an initial point along the proposed boundary referred to as a first sample location 111. Next, the user, by way of the user interface 102, induces the rover unit 14 to capture the first sample location 111 at the initial point along the proposed boundary. In one embodiment, the user induces the rover unit 14 to capture the first sample location 111 by pressing a "capture" button included by the user interface 102. The rover unit 14 captures the first sample location 111 by measuring the first magnetic field 34, the second magnetic field 36, the third magnetic field 38, and the fourth magnetic field 40 at the first sample location 111 in accordance with the above discussion. The measurements corresponding to the first sample location 111 are received by the magnetic field measurement processor 44, which is in electrical communication with the first interfacing module 96, such that the measurements are received by the boundary capture processor 104. The boundary capture processor 104 processes the measurements corresponding to the first sample location 111 into the previously discussed angle-dependent and range-dependent variables, such as the sector variable, variable a, variable b, and the range-dependent variable. When the sector variable, the angle-dependent variables and the range-dependent variable have been calculated for the first sample location 111, the sample location has been captured.

In the illustrated embodiment, the first sample location 111 has a $\theta$ coordinate of 0°. However, it should be noted that the first sample location 111 has a $\theta$ coordinate of 0° solely to facilitate the discussion of the present invention and that the first sample location 111 can have any $\theta$ coordinate as defined by the illustrative circular coordinate plane charting the plane of operation without departing from the scope or spirit of the present invention. After capturing the first sample location 111, the user traces the contour of the proposed boundary 108 with the rover unit 14, inducing the rover unit 14 to sequentially capture a plurality of sample locations 112 along the proposed boundary 108. In one embodiment, the user positions flags along the proposed boundary 108 to generate a visual image of the boundary 108. The visual image assists the user in achieving the desired shape of the boundary 108 and assists the host, such as an animal, in learning the perimeter of the boundary 108. In one embodiment, the rover unit 14 measures the first magnetic field 34, the second magnetic field 36, the third magnetic field 38, and the fourth magnetic field 40 at each sample location 112 in accordance with the above discussion. After all the measurements corresponding to each sample location 112 are taken, the measurements are received by the boundary capture processor 104. The boundary capture processor 104 processes the measurements corresponding to each sample location 112 into respective angle-dependent and range-dependent variables, such as the sector variable, variable a, variable b, and the range-dependent variable.

When using the rover unit 14 to capture the boundary 108, the user orients the C sensor 50 such that the respective polarities of the first magnetic field 34, the second magnetic field 36, the third magnetic field 38, and the fourth magnetic field 40 are robustly detected. In the illustrated embodiment, the rover unit 14 is oriented either consistently "in" or consistently "out" with respect to the base station unit 12 such that the C sensor 50 robustly detects the polarities of the magnet fields. In one embodiment, the user of the boundary proximity determining system 10 is instructed to orient the rover unit 14 either "in" or "out" with respect to the base station unit 12 when capturing the boundary such that the boundary capture processor 104 defines the sectors utilized in resolving the mirror image ambiguity. In another embodiment, the user indicates the orientation of the rover unit 14 to the boundary capture processor 104 by way of the user interface 102 such that the boundary capture processor 104 defines the sectors utilized in resolving the mirror image ambiguity.

As each proposed sample location 112 is captured, the boundary capture processor 104 considers the strength of the measured magnetic fields at the proposed sample location 112. If the measured magnetic fields at the proposed sample location 112 do not satisfy a predetermined satisfactory signal-to-noise ratio, the boundary capture processor 104 determines that the radial distance between the base station unit 12 and the proposed sample location 112 is too large to accurately calculate the necessary angle-dependent and range-dependent variables. When the signal-to-noise ratio is not satisfied, the boundary capture processor 104 does not capture the proposed sample location 112 and notifies the user of the unsatisfied signal-to-noise ratio. When the signal-to-noise ratio is satisfied, the boundary capture processor 104 captures the sample location 112 in accordance with the above discussion.

The number of sample locations 112 captured to define the boundary and the distance between each sample location 112 is determined at the discretion of the user. In one embodiment, it is suggested that a sample location 112 be captured every (r/20) ft, whereby r is the radial distance of the sample location 112 from the base station unit 12. In the illustrated embodiment, the boundary 108 is defined by 34 sample locations 112, namely the sample location $112_1$ through the sample location $112_{34}$, whereby the sample location $112_1$ is the first sample location 111. Additionally, it should be noted that the shape of the boundary 108 is definable and determined at the discretion of the user. For example, the boundary 108 can be defined to fit the contour of property lines or other defined areas and is not limited to a symmetrical shape with respect to the base station unit 12. It should also be noted that the boundary 108 is a radially-single-valued boundary. A radially-single-valued boundary is a boundary that has only a single r coordinate for any θ coordinate when the base station unit 12 is at the origin of a corresponding circular coordinate plane. Additionally, it should be noted that the boundary can enclose the base station unit 12 as is illustrated in FIG. 19 or not enclose the base station unit 12 as is illustrated in FIG. 20 and remain within the scope and spirit of the present invention.

Figure 20:
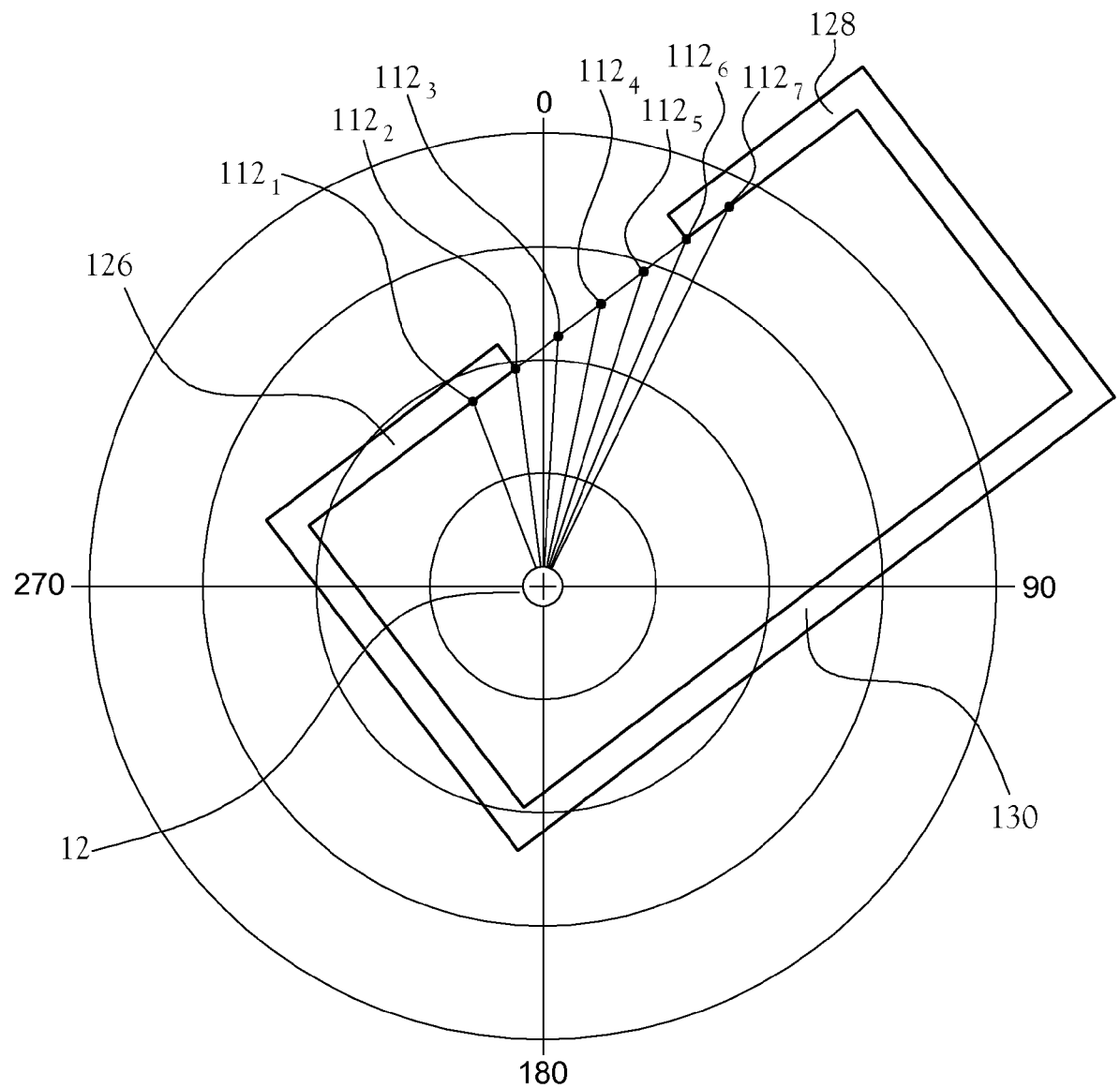
FIG. 20 illustrates an open boundary in accordance with the various features of the present invention.

FIG. 20 illustrates another embodiment of the boundary 108 defined by the boundary proximity determining system 10 in accordance with the various features of the present invention. The boundary 108 of this embodiment is defined in accordance with the above discussion by seven sample locations 112, namely the sample location $112_1$ through the sample location $112_7$. The boundary 108 is defined across a through-way defined by a first structural member 126 and a second structural member 128. The first structural member 126 and the second structural member 128 are part of a containment structure 130, which partially encloses the base station unit 12 such that the ingress and egress of the partial enclosure is limited to the through-way defined by the first structural member 126 and the second structural member 128.

To improve the precision of the boundary proximity determining system 10 as it operates in the boundary proximity detection mode, one embodiment of the boundary proximity determining system 10 utilizes a sample location 112 interpolation process. In this embodiment, the boundary capture processor 104 artificially generates one or more sample locations 112 between each actual sample location 112. For example, a midpoint interpolation generates an artificial sample location 112 at the midpoint between adjacent actual sample locations 112, effectively doubling the number of sample locations 112 defining the boundary. For a midpoint interpolation, the number of actual sample locations 112 is represented by N. Additionally, $V_i$ (i=1 to N) represents the angle-dependent variables and the range-dependent variables corresponding to the actual sample locations 112. $V_k$ (k=1 to 2N) represents the angle-dependent variables and the range-dependent variables corresponding to actual sample locations 112 and the interpolated sample locations 112, namely the effective sample locations 112. The values of $V_k$ are calculated from the values of $V_i$ as follows.

for k odd: $V_k = V_{(i=1/2*(k+1))}$ for k even (except when k=2N): $V_k = \frac{1}{2}[V_{(i=1/2*k)} + V_{(i=1/2*(k+4))}]$ for k=2N: $V_k = \frac{1}{2}*[V_{(i=N)} + V_{(i=1)}]$ As each sample location 112 is captured in accordance with the above discussion, the boundary capture processor 104 sequentially tags the sample location 112 and transfers the sample location 112 to the boundary storage module 106. When all the desired sample locations 112 are captured, the user communicates such to the boundary capture processor 104 by way of the user interface 102. Additionally, when all the sample locations 112 are captured, the boundary 108 is stored within the boundary storage module 106 in terms of the captured sample locations 112.

The boundary capture processor 104 moves the captured sample locations 112 that define the boundary 108 from the boundary storage module 106 to the memory module 92 of the rover unit 14 such that both the memory module 92 of the rover unit 14 and the boundary storage module 106 of the user interface device 98 store the boundary 108 in terms of the sample locations 112. After the sample locations 112 have been moved to the memory module 92, the user sets the boundary proximity determining system 10 to operate in the boundary proximity detection mode by way of the user interface 102. For the embodiment of the boundary proximity determining system 10 that includes the user interface device 98 that is detachably coupled to the rover unit 14, after the user sets the boundary proximity determining system 10 to operate in the boundary proximity detection mode, the user detaches the user interface device 98 from the rover unit 14 such that the user interface device 98 and the rover unit 14 are not mechanically coupled.

It should be noted that the user interface device 98 can include a magnetic field sensor 42 in electrical communication with the boundary capture processor 104 without departing from the scope or spirit of the present invention such that both the rover unit 14 and the user interface device 98 include a magnetic field sensor 42. In this particular embodiment, the user interface device 98 operates as the rover unit 14 when the rover unit 14 operates in the boundary capture mode. In other words, the user interface device 98 is used to define the boundary 108 and to store the boundary 108 at the boundary storage module 106 without being mechanically coupled or in electrical communication with the rover unit 14. After defining and storing the boundary 108, the user interface device 98 and the rover unit 14 establish electrical communication as discussed above. After communication is established, the boundary capture processor 104 moves the sample locations 112, which define the boundary 108, from the boundary storage module 106 to the memory module 92 of the rover unit 14 in accordance with the above discussion.

When the boundary proximity determining system 10 operates in the boundary proximity detection mode, the rover unit 14 is carried by the host, such as an animal. In one embodiment, the rover unit 14 is secured to a pet collar that is secured about the animal's neck. Periodically, the rover unit 14 measures the generated magnetic fields at the current location of the rover unit 14 in accordance with the above discussion. The rate at which the rover unit 14 periodically measures the generated magnetic fields at the current location of the rover unit 14 is a current location update rate. The measurements are processed by the magnetic field measurement processor 44 into the sector variable, the angle-dependent variables, and the range-dependent variable as discussed above. The sector variable, the angle-dependent variables, and the range-dependent variable corresponding to the current location of the rover unit 14 are received by the boundary proximity processor 90. The boundary proximity processor 90 considers the sector variable corresponding to the current location of the rover unit 14 and searches the memory module 92 for the sample locations 112 having a sector variable that matches the sector variable corresponding to the current location of the rover unit 14. Within the sample locations 112 having a sector variable matching the sector variable of the current location of the rover unit 14, the boundary proximity processor 90 searches for the sample location 112 having the angle-dependent variables that most closely match the angle-dependent variables corresponding to the current location of the rover unit 14.

In one embodiment, the boundary proximity processor 90 utilizes a weighted sum (WS) to locate the sample location 112 with the corresponding angle-dependent variables that most closely match the angle-dependent variables corresponding to the current location of the rover unit 14. More specifically, variable $a_{CL}$ and variable $b_{CL}$ represent the angle-dependent variables corresponding to the current location of the rover unit 14. Variable $a_{SL}$ and variable $b_{SL}$ represent the angle-dependent variables corresponding to a sample location 112 having a sector variable matching the sector variable corresponding to the current location of the rover unit 14. $W_a$ and $W_b$ are constants assigning particular weight to particular angle-dependent variables. The weighted sum (WS) is calculated as follows.

$$(WS) = W_a * |\text{variable } a_{CL} - \text{variable } a_{SL}| + W_b * |\text{variable } b_{CL} - \text{variable } b_{SL}|$$

For the alternate embodiment of the boundary proximity determining system 10 that utilizes the fifth magnetic field, the variables $\cos \theta_{25CL}$ and $\cos \theta_{35CL}$ represent additional angle-dependent variables corresponding to the current location of the rover unit 14. The variables $\cos \theta_{25SL}$ and $\cos \theta_{35SL}$ represent additional angle-dependent variables corresponding to a sample location 112 having a sector variable matching the sector variable corresponding to the current location of the rover unit 14. Additionally, $W_{\cos \theta 25}$ and $W_{\cos \theta 35}$ are constants assigning particular weight to particular angle-dependent variables. The weighted sum (WS) for this embodiment is calculated as follows.

$$(WS) = W_a * |\text{variable } a_{CL} - \text{variable } a_{SL}| + W_b * |\text{variable } b_{CL} - \text{variable } b_{SL}| + W_{\cos \theta 25} * |\cos \theta_{25CL} - \cos \theta_{25SL}| + W_{\cos \theta 35} * |\cos \theta_{35CL} - \cos \theta_{35SL}|$$

The weighted sum (WS) is calculated for each sample location 112 having a sector variable that matches the sector variable corresponding with the current location of the rover unit 14. The sample location 112 that renders the smallest value for the weighted sum (WS) is the sample location 112 with the corresponding angle-dependent variables that most closely match the angle-dependent variables corresponding to the current location of the rover unit 14.

After determining the sample location 112 having corresponding angle-dependent variables that most closely match the angle-dependent variables corresponding to the current location of the rover unit 14, the boundary proximity processor 90 compares the range-dependent variable corresponding to the sample location 112 with the range-dependent variable corresponding to the current location of the rover unit 14. When the range-dependent variable corresponding to the sample location 112 has a larger value than the range-dependent variable corresponding to the current location of the rover unit 14, the boundary proximity processor 90 determines that the rover unit 14 is within the boundary 108 and, in one embodiment, takes no action. Conversely, when the range-dependent variable corresponding to the sample location 112 has a smaller value than the range-dependent variable corresponding to the current location of the rover unit 14, the boundary proximity processor 90 determines that the rover unit 14 has traversed the boundary 108 such that the rover unit 14 is not within the boundary 108.

When the boundary 108 does not enclose the base station unit 12, as is illustrated in FIG. 20, the boundary proximity processor 90 determines the location of the rover unit 14 with respect to the boundary 108 as discussed above except when the sample location 112 having corresponding angle-dependent variables that most closely match the angle-dependent variables corresponding to the current location of the rover unit 14 is an endpoint of the boundary 108. In the illustrated embodiment, the endpoints of the boundary 108 are the sample location $112_1$ and the sample location $112_7$. When the sample location 112 having corresponding angle-dependent variables that most closely match the angle-dependent variables corresponding to the current location of the rover unit 14 is an endpoint, the boundary proximity processor 90 determines that the rover unit 14 is within the boundary 108, namely that the boundary 108 is not between the rover unit 14 and the base station unit 12. Consequently, when the boundary 108 is used to complement a physical containment structure, as in FIG. 20, the endpoints are defined at a location where the physical containment structure contains the rover unit 14.

In one embodiment of the boundary proximity determining system 10 that defines the boundary 108 to not enclose the base station unit 12, sectors that do not include any sample locations 112 are defined as empty sectors. More specifically, when no sample locations 112 have a sector variable corresponding to a particular sector, that particular sector is defined as an empty sector. When the sector variable corresponding to the current location of the rover unit 14 corresponds to an empty sector, the boundary proximity processor 90 automatically determines that the rover unit 14 is within the boundary 108.

The distance between the rover unit 14 and the boundary 108 is determined by considering the range-dependent variable corresponding to the rover unit 14 and the range-dependent variable corresponding to the sample location 112 having angle-dependent variables that most closely match the angle-dependent variables corresponding to the rover unit 14. More specifically, the distance between the rover unit 14 and the boundary 108 is determined by considering the difference between the range-dependent variable corresponding to the rover unit 14 and the range-dependent variable corresponding to the sample location 112 having angle-dependent variables that most closely match the angle-dependent variables corresponding to the rover unit 14.

Because the host, such as an animal, carries the rover unit 14, when the rover unit 14 traverses the boundary 108, the animal traverses the boundary 108. When the boundary proximity processor 90 determines that the rover unit 14 has traversed the boundary 108, it induces the auxiliary communications module 94 to transmit an indicator signal. In one embodiment, the indicator signal is an audible signal, such as a beep, that indicates to a local user that the animal has traversed the boundary 108. In another embodiment, the indicator signal is a radio signal that is received by a device that indicates to a remote user that the animal has traversed the boundary 108. In another embodiment, the indicator signal activates a stimulus delivery device such that when the animal traverses the boundary 108, the stimulus delivery device delivers a stimulus to the animal, discouraging the host, such as an animal, from traversing the boundary 10. It should be noted that the indicator signal transmitted by the auxiliary communications module 94 can be a signal other than the signals discussed above without departing from the scope or spirit of the present invention. It should also be noted that the stimulus delivered in response to one embodiment of the indicator signal includes any sensory stimulus, such as an electrostatic stimulus, an audible stimulus, a visual stimulus, or a spray stimulus.

Considering the above discussion, the embodiment of the boundary 108 illustrated in FIG. 20 provides a wireless gate. More specifically, as previously discussed, the user activates and deactivates the rover unit 14 by way of the user interface device 98. When the rover unit 14 is activated, the gate is activated such that when the rover unit 14 exits the containment structure 130 by way of the through-way defined by the first structural member 126 and the second structural member 128, the rover unit 14 traverses the boundary 108, inducing the auxiliary communications module 94 to transmit the indicator signal. Conversely, when the rover unit 14 is deactivated, the wireless gate is not activated such that the rover unit 14 can exit the containment structure 130 by way of the through-way without inducing the auxiliary communications module 94 to transmit the indicator signal.

As previously discussed, when operating in the boundary proximity detection mode, the rover unit 14 periodically measures the generated magnetic fields at the current location of the rover unit 14 and processes the measurements into the sector variable, the angle-dependent variables, and the range-dependent variable corresponding to the current location. Also, as previously discussed, the rover unit 14 periodically measures the magnetic fields at the current location update rate. The current location update rate is such that when the rover unit 14 traverses the boundary, the occurrence is detected promptly. In one embodiment of the boundary proximity determining system 10, the rover unit 14 includes a rover unit rest feature. The rover unit rest feature decreases the current location update rate in accordance with particular circumstances such that the life of the power source of the rover unit 14 is extended. The circumstances under which the rover unit rest feature is activated are defined by factors such as the speed at which the rover unit 14 is traveling and the distance between the rover unit 14 and the boundary. More specifically, when the rover unit 14 is traveling at a substantially low speed, the rover unit 14 is able to decrease the current location update rate without the likelihood that the rover unit 14 will traverse the boundary without a prompt detection. For example, when the host carrying the rover unit 14, such as an animal, is resting, the rover unit 14 is traveling at a low speed and it is not likely that the rover unit 14 will cover a substantial distance before the next current location of the rover unit 14 is calculated. Consequently, the current location update rate is decreased to preserve the power source. The rover unit 14 determines the speed at which it is traveling by first determining the distance between its current location and its most recent previously calculated location. More specifically, the rover unit 14 compares the variables corresponding to the current location of the rover unit 14 and the variables corresponding to the most recent previously calculated location of the rover unit 14. Because the respective variables corresponding to the compared locations are measured in accordance with the current location update rate, the rover unit 14 is able to determine the speed at which it is traveling, namely distance traveled/time. When the rover unit 14 is traveling at a substantially low speed, the rover unit 14 activates the rover unit rest feature, that is, decreases the current location update rate.

Another factor considered when activating the rover unit rest feature is the distance between the rover unit 14 and the boundary. Even when the speed at which the rover unit 14 is traveling is substantially low, when the rover unit 14 is substantially near the boundary, it could traverse the boundary without prompt detection if the current location update rate is decreased. Consequently, one embodiment requires a substantial distance between the rover unit 14 and the boundary for the rover unit rest feature to be activated. The rover unit 14 determines the distance between it and the boundary in accordance with the above discussion. It should be noted that the speed at which the rover unit 14 is traveling, the distance between the rover unit 14 and the boundary, or a combination of the two factors can be used in determining whether to activate the rover unit rest feature without departing from the scope or spirit of the present invention. Additionally, it should be noted that the rover unit 14 can provide a rover unit rest feature including various degrees of rest without departing from the scope or spirit of the present invention. For example, when the rover unit 14 has a speed of zero and the distance between the rover unit 14 and the boundary is equal to the distance between the rover unit 14 and the base station unit 12, the rover unit 14 decreases the current location update rate by 25%. When the rover unit 14 has a speed of zero and the distance between the rover unit 14 and boundary is larger than the distance between the rover unit 14 and the base station unit 12, the rover unit 14 decreases the current location update rate by 75%.

As previously discussed, in one embodiment of the boundary proximity determining system 10, the user interface device 98 is detachably coupled to or in wireless communication with the rover unit 14. Additionally, as previously discussed, the user interface device 98 stores the boundary in terms of the sample locations 112 at the boundary storage module 106. As a result, when the boundary is stored at the boundary storage module 106, the user interface device 98 is capable of moving the sample locations 112 that define the boundary to the memory module 92 of a rover unit 14 such that the rover unit 14 operates as a component of the boundary proximity determining system 10 without being engaged in the extensive boundary capture procedure discussed above. Consequently, the user interface device 98 is capable of programming additional rover units 14 to operate as components of the boundary proximity determining system 10 such that multiple rover units 14 operate simultaneously with the base station unit 12 in accordance with the various features of the present invention. Additionally, when the rover unit 14 is damaged and must be reprogrammed or replaced by an additional rover unit 14, the user interface device 98 is capable of reprogramming the damaged rover unit 14 or programming the replacement rover unit 14 such that the user is not required to redefine the boundary. However, when an additional or replacement rover unit 14 is programmed to operate with the boundary proximity determining system 10 such that the additional or replacement rover unit 14 is not engaged in the boundary capture procedure, the magnetic field sensitivity of the additional or replacement rover unit 14 must be calibrated. Calibration is required to eliminate variances in tolerances among various rover units 14 inherent to the manufacture process. The first step in calibrating an additional or replacement rover unit 14 is to establish communication between the user interface device 98 and the additional or replacement rover unit 14. For example, in one embodiment, the first step is to mechanically couple the user interface device 98 with the additional or replacement rover unit 14. Next, the additional or replacement rover unit 14 is positioned at a reference location 110, as illustrated at FIG. 19. The reference location 110 is defined by the user when user defines the boundary using the original rover unit 14. More specifically, the user positions the original rover unit 14 at the reference location 110 and induces the original rover unit 14 to measure the magnetic fields at the reference location 110 in accordance with the above discussion. From the measurements, the magnetic field measurement processor 44 generates the range-dependent variable corresponding to the reference location 110, which is referred to as $M14S_{REF}$ or $M23S_{REF}$. The reference location 110 is independent of any sample location 112 and is a location to which the user can readily return. For example, the reference location 110 is designated by a particular landmark, such as a particular tree or a fountain.

As previously discussed, the additional or replacement rover unit 14 is positioned at the reference location 110 and the rover unit 14 is induced to measure the magnetic fields at the reference location 110 in accordance with above discussion. The measurements are transferred from the magnetic field measurement processor 44 to the boundary capture processor 104. The boundary capture processor 104 calculates the range-dependent variable corresponding to the reference location 110, which is referred to as $M14S_{CAL}$ or $M23S_{CAL}$. $M23S_{REF}$ and $M23S_{CAL}$ are utilized in the calibration of the additional or replacement rover unit 14 in the following calculations. A rover unit 14 calibration constant ($K_{CAL}$) is calculated as follows.

$$K_{CAL} = \left[\frac{M23S_{REF}}{M23S_{CAL}}\right]^{1/2}$$

Calibration coefficients ($Q_1$-$Q_4$) are calculated as follows.

$Q_1 = K_{CAL} * \cos(45)$ $Q_2 = K_{CAL} * \sin(45)$ $Q_3 = K_{CAL} * \cos(0)$ $Q_4 = K_{CAL}$ The embodiment of the boundary proximity determining system 10 that utilizes the fifth magnetic field includes a calibration coefficient $Q_5$, which is calculated as follows.

$Q_5 = K_{CAL}$

In the embodiment of the boundary proximity determining system 10 that virtually rotates the base station unit 12 to reduce the undesired impact of localized magnetic field distortion, the calibration coefficients are calculated as follows.

$Q_1 = K_{CAL} * \cos(\theta_{ROT} + 45)$ $Q_2 = K_{CAL} * \sin(\theta_{ROT} + 45)$ $Q_3 = K_{CAL} * \cos(\theta_{ROT})$ $Q_4 = K_{CAL} * \sin(\theta_{ROT})$ $Q_5 = K_{CAL}$ To calibrate the magnetic field sensitivities of an additional or replacement rover unit 14, the calibration coefficients ($Q_1$-$Q_4$) are applied to the measurements by the additional or replacement rover unit 14. For example, the calibrated measurements by an additional or replacement rover unit 14 of the first magnetic field 34, the second magnetic field 36, the third magnetic field 38, and the fourth magnetic field 40 are noted below in accordance with the notation of the above discussion.

calibrated first magnetic field 34: $Q_1 * (A_1, B_1, C_1)$
calibrated second magnetic field 36: $Q_2 * (A_2, B_2, C_2)$
calibrated third magnetic field 38: $Q_3 * (A_3, B_3, C_3)$
calibrated fourth magnetic field 40: $Q_4 * (A_4, B_4, C_4)$ It should be noted that an additional or replacement rover unit 14 can be calibrated by ways other than by using the user interface device 98 without departing from the scope or spirit of the present invention. For example, each rover unit 14 can subjected to a gain trimming process at the time of manufacture such that all rover units 14 have identical magnetic field sensitivities.

Figure 21:
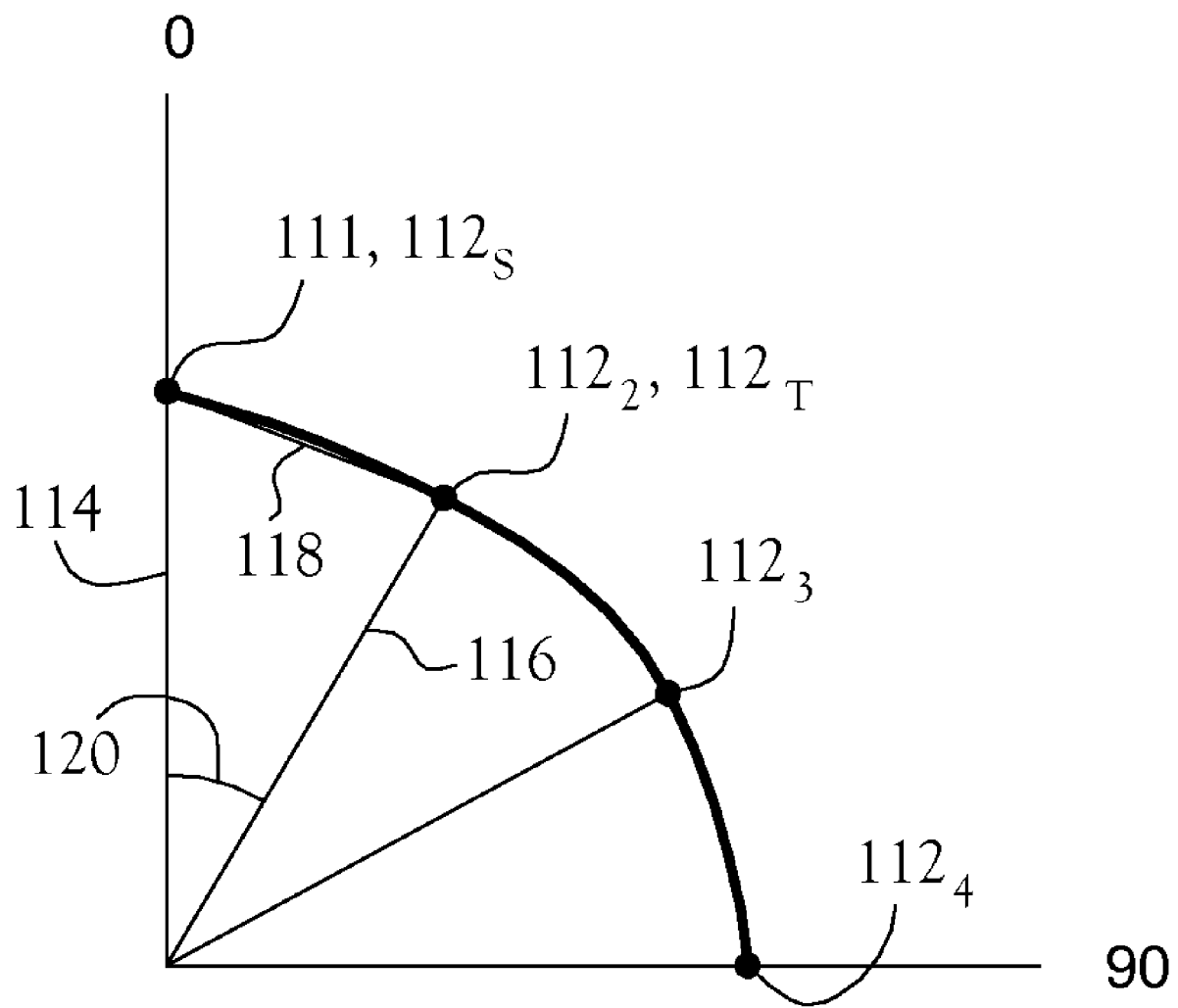
FIG. 21 illustrates a portion of the boundary as it is considered when the boundary proximity determining system plots the boundary.

In one embodiment of the boundary proximity determining system 10, the user interface device 98 generates a two-dimensional plot of the boundary 108. To generate the plot of the boundary 108, the user interface device 98 must calculate the r coordinate and θ coordinate for each sample location 112 within the plane of operation. In this embodiment, adjacent sample locations 112 are equally distanced from one another. FIG. 21 illustrates a section of the boundary 108 in accordance with the various features of this embodiment of the boundary proximity determining system 10. Generally, a first distance 114 is the distance between the base station unit 12 and the first sample location 112 of a pair of adjacent sample locations 112. A second distance 116 is the distance between the base station unit 12 and the second sample location 112 of the pair of adjacent sample locations 112. The first sample location 112 of the pair of adjacent sample locations 112 is noted as sample location $112_S$ and is the first sample location 112 encountered when traveling clockwise about the plane of operation, starting at θ=0°. The second sample location 112 of the pair of adjacent sample locations 112 is noted as sample location $112_T$. In the illustrated embodiment, the first distance 114 is the distance between the base station unit 12 and the first sample location 111, indicated by the range-dependent variable corresponding to the first sample location 111. Additionally, the second distance 116 is the distance between the base station unit 12 and the sample location $112_2$, indicated by the range-dependent variable corresponding to the sample location $112_2$. A third distance 118 is the distance between any two adjacent sample locations 112, namely sample location $112_S$ and sample location $112_T$, and, in the illustrated embodiment, is the distance between the first sample location 111 and the sample location $112_2$. Additionally, the third distance 118 is constant, meaning the distance between each pair of adjacent sample locations 112 is equal. Accordingly, Φ 120 is the angle between any two adjacent sample locations 112. More specifically, Φ (sample location $112_S$, sample location $112_T$) is the angle between the sample location $112_S$ and the sample location $112_T$. In the illustrated embodiment, Φ 120 is the angle between the first sample location 111 and the sample location $112_2$.

Φ 120 is calculated utilizing the law of cosines. More specifically, Φ 120 is calculated as follows.

Φ(sample location $112_S$,sample location $112_T$)=$\cos^{-1}$
[K(sample location $112_S$,sample location $112_T$)],
whereby $$K(\text{sample location } 112_S, \text{sample location } 112_T) = \frac{x^2 + y^2 - z^2}{2*x*y},$$

whereby
x=the first distance 114
y=the second distance 116
z=the third distance 118

To calculate the θ coordinate for each sample location 112 of the boundary 108, Φ 120 must be calculated for each pair of adjacent sample locations 112. Consequently, the value of K, as defined above, must be calculated for each pair of adjacent sample locations 112. As previously discussed, the number of sample locations 112 defining the boundary 108 is represented by N. Consequently, the calculations for the values of K are as follows.

for i=1 to (N−1):

Φ(sample location $112_i$,sample location $112_{i+1}$)=$\cos^{-1}$
[K(sample location $112_i$,sample location $112_{i+1}$)], whereby $$K(\text{sample location } 112_i, \text{sample location } 112_{i+1}) = \frac{x^2 + y^2 - z^2}{2*x*y},$$

whereby
x=radial distance of sample location $112_i$
y=radial distance of sample location $112_{i+1}$
z=the third distance 118
for i=N:

Φ(sample location $112_i$,sample location $112_1$)=$\cos^{-1}$
[K(sample location $112_i$,sample location $112_1$)],
whereby $$K(\text{sample location } 112_i, \text{sample location } 112_1) = \frac{x^2 + y^2 - z^2}{2*x*y},$$

whereby
x=radial distance of sample location $112_i$
y=radial distance of sample location $112_1$
z=the third distance 118
In theory, each value of K will be less than $$\frac{180°}{2\pi} (1 \text{ radian}).$$

However, in practice, due to shallow angle differences or signal distortion, the value of K occasionally has a value that is equal to or greater than 1 radian. Because a value of K that is equal to or greater than 1 radian is not physically possible, when the value of a particular K is calculated to be equal to or greater than 1 radian, the calculated value is replaced with the value of 0.999998 radians. Additionally, in theory, the sum of all the values of Φ calculated from (i=1) to (i=N) is 360° because the boundary encloses the base station unit 12. However, in practice, due to environmental effects such as localized magnetic field distortion, the sum of the values of Φ may be greater or less than 360°. Consequently, the user interface device 98 must calculate an adjustment factor (AF). The adjustment factor (AF) is premised on the difference between the sum of the values of Φ and 360° and is calculated as follows.

$$AF = \frac{\Phi \text{sum}}{360}$$

To calculate the corrected values of Φ, namely Φ', the adjustment factor (AF) is applied to values of Φ as follows.

Φ'(sample location $112_i$,sample location $112_{i+1}$)=Φ
(sample location $112_i$,sample location $112_{i+1}$)/AF It should be noted that the sum of all the values of Φ' is 360°.

The following calculations are used to calculate the θ coordinate for each sample location 112, namely from the reference location 110 (i=1) to the sample location $112_N$ (i=N).

for i=1: θ(sample location $112_1$)=0 for i=2 to i=N: θ(sample location $112_i$)=θ(sample location $112_{i-1}$)+Φ'(sample location $112_{i-1}$, sample location $112_i$)

When the r coordinate and the θ coordinate for each sample location 112 has been calculated, the user interface 98 generates a two-dimensional plot of the boundary 108. In one embodiment, the two-dimensional plot of the boundary 108 is displayed at the user interface 102. The boundary 108 can be plotted on a circular coordinate plane using the calculated r coordinates and θ coordinates. Alternatively, the boundary 108 can be plotted on a Cartesian plane, the respective x coordinates and y coordinates of one embodiment being calculated as follows.

$x$(sample location $112_i$)=range-dependent variable (sample location $112_i$)*sin [θ(sample location $112_i$)]

$y$(sample location $112_i$)=range-dependent variable (sample location $112_i$)*cos [θ(sample location $112_i$)]

Considering the above calculations for the x coordinates and y coordinates, the x coordinate is a function of sin [θ] and the y coordinate is a function of cos [θ]. Conversely, in standard polar to rectangular coordinate conversion, the x coordinate is a function of cos [θ] and the y coordinate is a function of sin [θ] as follows.

$x=r*\cos [θ]$ $y=r*\sin [θ]$

However, in a standard circular coordinate plane, values having θ=0° are directly to the right of the coordinate plane's axis. Additionally, the values of θ increase in a counter-clockwise direction. To generate a plot that parallels the plane of operation as charted in the above discussion, values having θ=0° must be directly above the coordinate plane's axis and the values of θ must increase in a clockwise direction. Accordingly, the θ value for each point is negated such that the values of θ increase in a clockwise direction and the θ value is shifted 90° such that values having θ=0° are directly above the coordinate plane's axis. The resulting conversion equations are as previously discussed. As a result, a plot of the boundary parallels the boundary as manifested on the plane of operation.

In one embodiment of the boundary proximity determining system 10, the user adjusts various user-configurable parameters by way of the user interface 102, and the user-configurable parameters are stored in the memory module 92 of the rover unit 14. For example, one user-configurable parameter is the operating frequency of the boundary proximity determining system 10. More specifically, when another wireless system is operating proximately to the boundary proximity determining system 10, the other wireless system potentially interferes with the operation of the boundary proximity determining system 10. However, in this embodiment, the user adjusts the operating frequency of the boundary proximity determining system 10 such that the boundary proximity determining system 10 operates at a frequency that is not affected by the operation of the other wireless system. Another user-configurable parameter is the type of indicator signal transmitted by the auxiliary communications module 94. As previously discussed, the indicator signal includes signals such as an audible signal, a radio signal, and a stimulus delivery signal. In this embodiment, the user selects which signal is transmitted by the auxiliary communications module 94. Additionally, when the user selects the stimulus delivery signal to be the signal transmitted by the auxiliary communications module 94, the user selects the type and/or the intensity of the delivered stimulus.

While one specific embodiment of the rover unit 14 is described and illustrated above, it should be noted that the number, types, and sequence of operation of the utilized processing devices and memory devices can vary without departing from the scope or spirit of the present invention. Additionally, while one specific embodiment of the user interface device 98 is described and illustrated above, it should be noted that the number, types, and sequence of operation of the utilized processing devices, memory devices, and interfaces can vary without departing from the scope or spirit of the present invention.

The above-described boundary proximity determining system 10 includes various applications. For example, as previously discussed, the rover unit 14 is carried by the animal, whereby the animal is located within the boundary 108. When the animal traverses the boundary, or in other words, leaves the containment area, the user is notified of the occurrence and/or the animal receives a stimulus. Another application includes the animal carrying the rover unit 14, whereby the animal is located outside the containment area defined by the boundary 108, such as a garden. When the animal traverses the boundary, or in other words, enters the garden, the user is notified of the occurrence and/or the animal receives a stimulus. Yet another application includes a human carrying the rover unit 14. The human includes individuals such as a child, a prisoner, or a nursing home patient. When the child carries the rover unit 14, the boundary defines an area such as the yard of the child's home. When the child traverses the boundary, or in other words, leaves the yard, the user, such as a parent, is notified of the occurrence. When the prisoner carries the rover unit 14, the boundary defines an area such as the confines of the prison. When the prisoner traverses the boundary, or in other words, breaks out of prison, the user, such as a guard, is notified of the occurrence. Finally, when the nursing home patient carries the rover unit 14, the boundary defines an area such as the property of the nursing home. When the nursing home patient traverses the boundary, or in other words, leaves the premises of the nursing home, the user, such as a nursing home attendant, is notified of the occurrence.

From the foregoing description, those skilled in the art will recognize that a containment system for wirelessly defining a boundary having a programmable shape offering advantages over the prior art has been provided. The system provides a base station unit for generating multiple separately identifiable magnetic fields with directionally diverse principal axes. Further, the system provides a rover unit that measures the magnetic fields generated by the base station unit. The rover unit captures sample locations along a proposed boundary that are used to define the boundary. After the boundary is defined, the rover unit is carried by an animal that is located either within or outside the area defined by the boundary. When the animal traverses the boundary with the rover unit, the user of the system is notified and/or the animal receives a stimulus.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A boundary proximity determining system for wirelessly defining a boundary having a programmable shape and for indicating a current location of a rover unit with respect to the boundary, said boundary proximity determining system comprising:

a base station unit, said base station unit generates at least one pair of magnetic fields, each magnetic field being separately identifiable and having a principal axis, the principal axes being mutually directionally diverse and lying substantially within a common two-dimensional plane of operation; and said rover unit being mobile and including an auxiliary communications module, said rover unit measures magnetic field properties of each respective magnetic field at the current location of said rover unit, the magnetic field properties measured at the current location of said rover unit indicating the current location of said rover unit with respect to said base station unit, said rover unit operates in a first mode of operation and a second mode of operation, when said rover unit operates in the first mode of operation, said rover unit defines the boundary by measuring the magnetic field properties of each respective magnetic field at a multiplicity of sample locations along the boundary and by storing the magnetic field properties measured at the sample locations, the magnetic field properties measured at each sample location indicating the location of the respective sample location with respect to said base station unit, when said rover unit operates in the second mode of operation, said rover unit determines the current location of said rover unit with respect to the boundary by comparing the magnetic field properties measured at the current location of said rover unit to the magnetic field properties measured at the sample locations, the auxiliary communications module transmitting an indicator signal indicating the location of said rover unit with respect to the boundary.

2. The boundary proximity determining system of claim 1 wherein said rover unit measures the magnetic field properties by way of at least one magnetic field sensor, the magnetic field properties including the intensity and the polarity of each respective magnetic field as measured by each respective magnetic field sensor.

3. The boundary proximity determining system of claim 2 wherein said rover unit calculates variables indicative of the current location of said rover unit based on the magnetic field properties measured at the current location of said rover unit, said rover unit calculates variables indicative of the respective location of each sample location of the multiplicity of sample locations based on the magnetic field properties measured at each respective sample location.

4. The boundary proximity determining system of claim 3 wherein said rover unit determines the current location of said rover unit with respect to the boundary by comparing the variables indicative of the current location of said rover unit to the variables indicative of the location of each sample location of the multiplicity of sample locations.

5. The boundary proximity determining system of claim 4 wherein the at least one pair of magnetic fields includes at least one pair of orthogonal magnetic fields.

6. The boundary proximity determining system of claim 5 wherein said rover unit virtually rotates said base station unit about an axis at the center of said base station unit and perpendicular to the plane of operation by calculating the magnetic field properties of the at least one pair of orthogonal magnetic fields at a particular location as they would be measured at the particular location if said base station unit were actually rotated, said rover unit's calculations being based on the magnetic field properties of the least one pair of orthogonal magnetic fields measured at the particular location.

7. The boundary proximity determining system of claim 6 wherein said rover unit virtually rotates said base station unit to an angle of rotation that minimizes the impact of localized magnetic field distortion on the measurements of the magnetic field properties.

8. The boundary proximity determining system of claim 5 wherein said base station unit generates at least two pairs of orthogonal magnetic fields.

9. The boundary proximity determining system of claim 8 wherein the variables indicative of the current location of said rover unit and the variables indicative of the location of each sample location of the multiplicity of sample locations include a sector variable, at least one angle-dependent variable, and a range-dependent variable.

10. The boundary proximity determining system of claim 9 wherein the value of the at least one angle-dependent variable and the value of the range-dependent variable are mutually independent.

11. The boundary proximity determining system of claim 9 wherein the at least one angle-dependent variable includes a variable a, a variable b, and a (a+b) variable.

12. The boundary proximity determining system of claim 9 wherein the plane of operation is divided into two sectors, each sector encompassing a separate and identifiable portion of the plane of operation, whereby the sector variable indicates the sector within which said rover unit is located when said rover unit measures the magnetic field properties of the at least two pairs of orthogonal magnetic fields.

13. The boundary proximity determining system of claim 9 wherein the plane of operation is divided into four sectors, each sector encompassing a separate and identifiable portion of the plane of operation, whereby the sector variable indicates the sector within which said rover unit is located when said rover unit measures the magnetic field properties of the at least two pairs of orthogonal magnetic fields.

14. The boundary proximity determining system of claim 9 wherein the plane of operation is divided into eight sectors, each sector encompassing a separate and identifiable portion of the plane of operation, whereby the sector variable indicates the sector within which said rover unit is located when said rover unit measures the magnetic field properties of the at least two pairs of orthogonal magnetic fields.

15. The boundary proximity determining system of claim 9 wherein the at least one angle-dependent variable includes a (variable a)$^2$, a (variable b)$^2$, and a $(a^2+b^2)$ variable.

16. The boundary proximity determining system of claim 9 wherein the range-dependent variable corresponding to the current location of said rover unit indicates a distance between the current location of said rover unit and the boundary.

17. The boundary proximity determining system of claim 9 wherein the range-dependent variable corresponding to the current location of said rover unit indicates the distance between the current location of said rover unit and the location of said base station unit.

18. The boundary proximity determining system of claim 17 wherein the distance between the current location of said rover unit and said base station unit is calculated from the range-dependent variable corresponding to the current location of said rover unit.

19. The boundary proximity determining system of claim 18 wherein the value of the range-dependent variable corresponding to the current location of said rover unit is the distance between the current location of said rover unit and said base station unit.

20. The boundary proximity determining system of claim 5 wherein said rover unit calculates the magnetic field properties of at least one pair of calculated magnetic fields at the current location of said rover unit based on the measured magnetic field properties of the at least one pair of magnetic fields generated by said base station unit, the magnetic field properties measured and calculated at the current location of said rover unit indicating the current location of said rover unit with respect to said base station unit.

21. The boundary proximity determining system of claim 5 wherein said base station unit generates a first pair of orthogonal magnetic fields and a second pair of orthogonal magnetic fields.

22. The boundary proximity determining system of claim 21 wherein the principal axes of the first pair of orthogonal magnetic fields are situated 45 degrees (45°) from the principal axes of the second pair of orthogonal magnetic fields.

23. The boundary proximity determining system of claim 1 wherein the boundary does not enclose said base station unit.

24. The boundary proximity determining system of claim 23 wherein two sample locations of the multiplicity of sample locations are endpoints such that when particular magnetic field properties of the magnetic field properties indicating the current location of said rover unit most closely match particular magnetic field properties of the magnetic field properties indicating the location of one of the endpoints, the rover unit determines that said rover unit is within the boundary.

25. The boundary proximity determining system of claim 23 wherein said rover unit defines a sector of the plane of operation that does not include a sample location as an empty sector.

26. The boundary proximity determining system of claim 25 wherein said rover unit determines that said rover unit is within the boundary when the magnetic field properties indicating the current location of said rover unit indicate that said rover unit is within the empty sector.

27. The boundary proximity determining system of claim 23 wherein the boundary is a wireless gate.

28. The boundary proximity determining system of claim 23 wherein the boundary complements a physical containment structure such that the boundary together with the physical containment structure enclose said base station unit.

29. The boundary proximity determining system of claim 1 wherein the boundary encloses said base station unit.

30. The boundary proximity determining system of claim 1 wherein said base station unit generates a perpendicular magnetic field, the perpendicular magnetic field being orthogonal to the plane of operation.

31. The boundary proximity determining system of claim 30 wherein said rover unit calculates a variable indicative of the angle between the perpendicular magnetic field and a magnetic field of the at least one pair of magnetic fields to detect localized magnetic field distortion.

32. The boundary proximity determining system of claim 30 wherein the perpendicular magnetic field provides a reference signal utilized in measuring the magnetic field properties of the at least one pair of magnetic fields.

33. The boundary proximity determining system of claim 1 wherein said rover unit increases the precision of the boundary by increasing an effective number of sample locations of the multiplicity of sample locations defining the boundary by way of interpolation.

34. The boundary proximity determining system of claim 33 wherein said rover unit increases the precision of the boundary by doubling the effective number of sample locations of the multiplicity of sample locations defining the boundary by way of mid-point interpolation.

35. The boundary proximity determining system of claim 1 further comprising a user interface device in communication with said rover unit, said user interface device facilitating communication between a user of said boundary proximity determining system and said rover unit.

36. The boundary proximity determining system of claim 35 wherein said user interface device is in wired communication with said rover unit.

37. The boundary proximity determining system of claim 35 wherein said user interface device is in wireless communication with said rover unit.

38. The boundary proximity determining system of claim 35 wherein a user of said boundary proximity determining system induces said rover unit to measure the magnetic field properties of the at least one pair of magnetic fields at each sample location of the multiplicity of sample locations by way of the user interface device.

39. The boundary proximity determining system of claim 38 wherein the user notifies said rover unit when the magnetic field properties of the at least one pair of magnetic fields at each sample location of the multiplicity of sample locations have been measured.

40. The boundary proximity determining system of claim 35 wherein operating parameters of said boundary proximity determining system are adjusted by way of said user interface device.

41. The boundary proximity determining system of claim 40 wherein the operating parameters include the mode of operation of said rover unit.

42. The boundary proximity determining system of claim 40 wherein the operating parameters include the intensity of a stimulus delivered by said rover unit.

43. The boundary proximity determining system of claim 40 wherein the operating parameters include the type of a stimulus delivered by said rover unit.

44. The boundary proximity determining system of claim 1 wherein the auxiliary communications module of said rover unit transmits the indicator signal when said rover unit determines that the current location of said rover unit is within the boundary.

45. The boundary proximity determining system of claim 44 wherein said rover unit is within the boundary when said rover unit is on the same side of the boundary as said base station unit.

46. The boundary proximity determining system of claim 1 wherein the auxiliary communications module of said rover unit transmits the indicator signal when said rover unit determines that the current location of said rover unit is outside the boundary.

47. The boundary proximity determining system of claim 46 wherein said rover unit is outside the boundary when the boundary lies between said rover unit and said base station unit.

48. The boundary proximity determining system of claim 1 wherein said rover unit is carried by an animal.

49. The boundary proximity determining system of claim 48 wherein said rover unit includes a stimulus delivery device in electrical communication with the auxiliary communications module such that when the indicator signal is transmitted, the stimulus delivery device delivers a stimulus to the animal.

50. The boundary proximity determining system of claim 48 wherein said rover unit determines the animal's direction of motion by comparing the magnetic field properties of the at least one pair of magnetic fields at the current location of said rover unit to previously measured magnetic field properties of the at least one pair of magnetic fields at a previous location of said rover unit.

51. The boundary proximity determining system of claim 1 wherein said rover unit periodically measures the magnetic field properties of each respective magnetic field at the current location of said rover unit at a current location update rate.

52. The boundary proximity determining system of claim 51 wherein said rover unit includes a rover unit rest feature.

53. The boundary proximity determining system of claim 52 wherein said rover unit decreases the current location update rate when the speed at which said rover unit is traveling is substantially low.

54. The boundary proximity determining system of claim 52 wherein said rover unit decreases the current location update rate when a distance between said rover unit and the boundary is substantial.

55. The boundary proximity determining system of claim 1 wherein said rover unit is in communication with a remote processing device.

56. The boundary proximity determining system of claim 55 wherein the remote processing device is said base station unit.

57. The boundary proximity determining system of claim 55 wherein the remote processing device is a computer.

58. The boundary proximity determining system of claim 57 wherein said rover unit communicates with the computer by way of a network.

59. The boundary proximity determining system of claim 57 wherein said rover unit communicates with the computer utilizing a modem.

60. The boundary proximity determining system of claim 1 wherein said rover unit is carried by a human.

61. A boundary proximity determining system for wirelessly defining a boundary having a programmable shape and for indicating a current location of a rover unit with respect to the boundary, said boundary proximity determining system comprising:
a base station unit, said base station unit generates at least one pair of orthogonal magnetic fields, each magnetic field being separately identifiable and having a principal axis, the principal axes being mutually directionally diverse and lying substantially within a common two-dimensional plane of operation; and
said rover unit being mobile and including an auxiliary communications module, said rover unit measures magnetic field properties of each respective magnetic field generated by said base station unit at the current location of said rover unit, said rover unit calculates the magnetic field properties of at least one pair of calculated magnetic fields at the current location of said rover unit based on the measured magnetic field properties of the magnetic fields generated by said base station unit, the magnetic field properties measured and calculated at the current location of said rover unit indicating the current location of said rover unit with respect to said base station unit, said rover unit operates in a first mode of operation and a second mode of operation, when said rover unit operates in the first mode of operation, said rover unit defines the boundary by measuring and calculating the magnetic field properties of each respective magnetic field at a multiplicity of sample locations along the boundary and by storing the magnetic field properties measured and calculated at the sample locations, the magnetic field properties measured and calculated at each sample location indicating the location of the respective sample location with respect to said base station unit, when said rover unit operates in the second mode of operation, said rover unit determines the current location of said rover unit with respect to the boundary by comparing the magnetic field properties measured and calculated at the current location of said rover unit to the magnetic field properties measured and calculated at the sample locations, the auxiliary communications module transmitting an indicator signal indicating the location of said rover unit with respect to the boundary.

62. The boundary proximity determining system of claim 61 wherein said rover unit measures the magnetic field properties by way of at least one magnetic field sensor, the magnetic field properties including the intensity and the polarity of each respective magnetic field as measured by each respective magnetic field sensor.

63. The boundary proximity determining system of claim 62 wherein said rover unit calculates variables indicative of the current location of said rover unit based on the magnetic field properties measured and calculated at the current location of said rover unit, said rover unit calculates variables indicative of the respective location of each sample location of the multiplicity of sample locations based on the magnetic field properties measured and calculated at each respective sample location.

64. The boundary proximity determining system of claim 63 wherein said rover unit determines the current location of said rover unit with respect to the boundary by comparing the variables indicative of the current location of said rover unit to the variables indicative of the location of each sample location of the multiplicity of sample locations.

65. The boundary proximity determining system of claim 64 wherein said base station unit generates at least two pairs of orthogonal magnetic fields.

66. The boundary proximity determining system of claim 63 wherein the variables indicative of the current location of said rover unit and the variables indicative of the location of each sample location of the multiplicity of sample locations include a sector variable, at least one angle-dependent variable, and a range-dependent variable.

67. The boundary proximity determining system of claim 61 wherein said rover unit virtually rotates said base station unit by calculating the magnetic field properties of the at least one pair of orthogonal magnetic fields and the at least one pair of calculated magnetic fields at a particular location as the magnetic field properties would be at the particular location if said base station unit were actually rotated, said rover unit's virtual rotation calculations being based on the magnetic field properties of the least one pair of orthogonal magnetic fields measured at the particular location and the magnetic field properties of the at least one pair of calculated magnetic fields calculated at the particular location.

68. A boundary proximity determining system for wirelessly defining a boundary having a programmable shape and for indicating a current location of a rover unit with respect to the boundary, said boundary proximity determining system comprising:
a base station unit including at least one pair of solenoidal coils and a coil driver, the coil driver being in electrical communication with the solenoidal coils, the coil driver drives the solenoidal coils such that the solenoidal coils generate at least one pair of magnetic fields, each magnetic field being separately identifiable and having a directionally diverse principal axis lying substantially within a common two-dimensional plane of operation;
said rover unit including a first processor in electrical communication with a magnetic field sensor and a memory module, the magnetic field sensor including at least one coil sensor, said rover unit being mobile within the plane of operation, said rover unit operates in a boundary capture mode and a boundary proximity detection mode; and a user interface device in communication with said rover unit, said user interface device including a user interface in electrical communication with a second processor, the second processor being in communication with the magnetic field sensor and the memory module of said rover unit, a user of said boundary proximity determining system governs whether said rover unit operates in the boundary capture mode or the boundary proximity detection mode by way of the user interface, when said rover unit operates in the boundary capture mode, the magnetic field sensor of said rover unit detects magnetic field properties of each respective magnetic field at a plurality of sample locations along the boundary, the magnetic field properties include the intensity and the polarity of each respective magnetic field as measured by each respective coil sensor of the at least one coil sensor of the magnetic field sensor, the second processor receives and processes the magnetic field properties detected at the plurality of sample locations to generate variables indicative of the respective location of each of the plurality of sample locations, whereby the plurality of sample locations define the boundary, the memory module of said rover unit receives and stores the variables generated by the second processor;

whereby, when said rover unit operates in the boundary proximity detection mode, the magnetic field sensor detects the magnetic field properties of each respective magnetic field at the current location of said rover unit, the first processor receives and processes the magnetic field properties detected at the current location of said rover unit to generate variables indicative of the current location of said rover unit, the first processor compares the variables indicative of the current location of said rover unit and the variables indicative of the respective location of each of the plurality of sample locations and determines the current location of said rover unit with respect to the boundary.

69. The boundary proximity determining system of claim 68 wherein said base station unit includes a first solenoidal coil and a second solenoidal coil, whereby the first solenoidal coil is orthogonal to the second solenoidal coil.

70. The boundary proximity determining system of claim 68 wherein the at least one pair of solenoidal coils of said base station unit generates at least one pair of orthogonal magnetic fields.

71. The boundary proximity determining system of claim 70 wherein the first processor virtually rotates said base station unit by calculating the magnetic field properties of the at least one pair of orthogonal magnetic fields at a particular location as they would be measured at the particular location if said base station unit were actually rotated, the first processor's calculations being based on the magnetic field properties of the at least one pair of orthogonal magnetic fields measured at the particular location.

72. The boundary proximity determining system of claim 71 wherein the first processor virtually rotates said base station unit to an angle of rotation that minimizes the impact of localized magnetic field distortion on the measurements of the magnetic field properties.

73. The boundary proximity determining system of claim 70 wherein the at least one pair of solenoidal coils of said base station unit generates a first pair of orthogonal magnetic fields and a second pair of orthogonal magnetic fields.

74. The boundary proximity determining system of claim 73 wherein the principal axes of the first pair of orthogonal magnetic fields are situated 45 degrees (45°) from the principal axes of the second pair of orthogonal magnetic fields.

75. The boundary proximity determining system of claim 73 wherein the at least one pair of solenoidal coils of said base station unit generates at least two pairs of orthogonal magnetic fields.

76. The boundary proximity determining system of claim 75 wherein the variables indicative of the current location of said rover unit and the variables indicative of the respective location of each of the plurality of sample locations include a sector variable, at least one angle-dependent variable, and a range-dependent variable.

77. The boundary proximity determining system of claim 76 wherein the value of the at least one angle-dependent variable and the value of the range-dependent variable are mutually independent.

78. The boundary proximity determining system of claim 76 wherein the at least one angle-dependent variable includes a variable a, a variable b, and a (a+b) variable.

79. The boundary proximity determining system of claim 68 wherein said base station unit includes a first solenoidal coil, a second solenoidal coil, a third solenoidal coil, and a fourth solenoidal coil, each solenoidal coil having a principal axis that runs longitudinally therethrough, whereby the principal axes of the solenoidal coils lie substantially within the plane of operation, the first solenoidal coil and the fourth solenoidal coil being a first pair of solenoidal coils, the second solenoidal coil and the third solenoidal coil being a second pair of solenoidal coils, the first solenoidal coil being orthogonal to the fourth solenoidal coil, the second solenoidal coil being orthogonal to the third solenoidal coil, the first pair of solenoidal coils being shifted 45 degrees (45°) from the second pair of solenoidal coils.

80. The boundary proximity determining system of claim 79 wherein the first solenoidal coil, the second solenoidal coil, the third solenoidal coil, and the fourth solenoidal coil generate a first pair of orthogonal magnetic fields and a second pair of orthogonal magnetic fields.

81. The boundary proximity determining system of claim 80 wherein the principal axes of the first pair of orthogonal magnetic fields are situated 45 degrees (45°) from principal axes of the second pair of orthogonal magnetic fields.

82. The boundary proximity determining system of claim 68 wherein said base station unit includes a perpendicular solenoidal coil having a principal axis perpendicular to the plane of operation, the perpendicular solenoidal coil being in electrical communication with the coil driver, which drives the perpendicular solenoidal coil such that the perpendicular solenoidal coil generates a perpendicular magnetic field that is perpendicular to the at least one pair of magnetic fields generated by the at least one pair of solenoidal coils of said base station unit.

83. The boundary proximity determining system of claim 82 wherein the first processor calculates a variable indicative of an angle between the perpendicular magnetic field and a magnetic field of the at least one pair of magnetic fields to detect localized magnetic distortion.

84. The boundary proximity determining system of claim 82 wherein the perpendicular magnetic field provides a reference signal utilized in measuring the magnetic field properties of the at least one pair of magnetic fields.

85. The boundary proximity determining system of claim 68 wherein the magnetic field sensor of said rover unit includes three mutually orthogonal sensor coils.

86. The boundary proximity determining system of claim 68 wherein the boundary does not enclose said base station unit.

87. The boundary proximity determining system of claim 86 wherein two sample locations of the plurality of sample locations are endpoints such that when particular variables of the variables indicative of the current location of said rover unit most closely match particular variables of the variables indicative of the location of an endpoint, the first processor determines that said rover unit is within the boundary.

88. The boundary proximity determining system of claim 86 wherein the first processor defines a sector of the plane of operation that does not include a sample location of the plurality of sample locations as an empty sector.

89. The boundary proximity determining system of claim 88 wherein the first processor determines that said rover unit is within the boundary when the variables indicative of the current location of said rover unit indicate that said rover unit is within the empty sector.

90. The boundary proximity determining system of claim 68 wherein the boundary encloses said base station unit.

91. The boundary proximity determining system of claim 68 wherein the first processor increases the preciseness of the boundary by effectively interpolating a sample location between each adjacent sample location of the plurality of sample locations, increasing an effective number of sample locations defining the boundary.

92. The boundary proximity determining system of claim 68 wherein said rover unit includes an auxiliary communications module in electrical communication with the first processor, the auxiliary communications module transmits an indicator signal.

93. The boundary proximity determining system of claim 92 wherein said rover unit is carried by an animal.

94. The boundary proximity determining system of claim 93 wherein the first processor determines the animal's direction of motion by comparing the variables indicative of the current location of said rover unit to variables previously processed by the first processor indicating a previous location of said rover unit.

95. The boundary proximity determining system of claim 93 wherein said rover unit includes a rover unit rest feature.

96. The boundary proximity determining system of claim 95 wherein the magnetic field sensor periodically detects the magnetic field properties of each respective magnetic field at the current location of said rover unit at a current location update rate.

97. The boundary proximity determining system of claim 96 wherein the first processor decreases the current location update rate when said rover unit is traveling at a substantially low speed.

98. The boundary proximity determining system of claim 97 wherein the first processor decreases the current location update rate when said rover unit is not substantially close to the boundary.

99. The boundary proximity determining system of claim 93 wherein the auxiliary communications module is in electrical communication with a stimulus delivery device such that when the indicator signal is transmitted, the stimulus delivery device delivers a stimulus to the animal.

100. The boundary proximity determining system of claim 92 wherein the auxiliary communications module of said rover unit transmits the indicator signal when the first processor determines that the current location of said rover unit is not within the boundary.

101. The boundary proximity determining system of claim 92 wherein the auxiliary communications module of said rover unit transmits the indicator signal when the first processor determines that the current location of said rover unit is within the boundary.

102. The boundary proximity determining system of claim 92 wherein the auxiliary communications module of said rover unit transmits the indicator signal when the first processor determines that said rover unit traversed the boundary.

103. The boundary proximity determining system of claim 68 wherein said user interface device is mechanically coupled to said rover unit such that said user interface device is detachable from said rover unit, said user interface device being in electrical communication with said rover unit when said user interface device is mechanically coupled to said rover unit.

104. The boundary proximity determining system of claim 68 wherein said user interface device is in wired communication with said rover unit.

105. The boundary proximity determining system of claim 68 wherein said user interface device is in wireless communication with said rover unit.

106. The boundary proximity determining system of claim 68 wherein said user interface device includes a boundary storage module in electrical communication with the second processor, the boundary storage module receives and stores the variables indicative of the respective location of each of the plurality of sample locations generated by the second processor.

107. The boundary proximity determining system of claim 106 wherein the memory module of an additional rover unit receives from the boundary storage module of said user interface device the variables indicative of the respective location of each of the plurality of sample locations generated by the second processor, the additional rover unit being distinguishable from said rover unit.

108. The boundary proximity determining system of claim 107 wherein the additional rover unit is calibrated by said user interface device.

109. The boundary proximity determining system of claim 106 wherein the memory module of said rover unit receives from the boundary storage module of said user interface device the variables indicative of the respective location of each of the plurality of sample locations generated by the second processor.

110. The boundary proximity determining system of claim 109 wherein said rover unit is calibrated by said user interface device.

111. The boundary proximity determining system of claim 68 wherein the user induces the magnetic field sensor of said rover unit to detect the magnetic field properties of the at least one pair of magnetic fields at each sample location of the plurality of sample locations by way of the user interface of said user interface device.

112. The boundary proximity determining system of claim 111 wherein the user notifies the second processor of said user interface device when the magnetic field properties of the at least one pair of magnetic fields at each sample location of the plurality of sample locations have been detected.

113. The boundary proximity determining system of claim 68 wherein said user interface device indicates a distance between said user interface device and the boundary.

114. The boundary proximity determining system of claim 68 wherein said user interface device generates a plot of the boundary based on the plurality of sample locations.

115. The boundary proximity determining system of claim 68 wherein the first processor of said rover unit determines whether a detection taken by the magnetic field sensor includes acceptable information.

116. The boundary proximity determining system of claim 115 wherein the first processor of said rover unit determines whether a detection taken by the magnetic field sensor satisfies a designated signal-to-noise ratio.

117. The boundary proximity determining system of claim 68 wherein the second processor of said user interface device determines whether a detection taken by the magnetic field sensor of said rover unit includes acceptable information.

118. The boundary proximity determining system of claim 117 wherein the second processor of said user interface device determines whether the distance between adjacent sample locations of the plurality of sample locations exceeds a designated distance.

119. The boundary proximity determining system of claim 68 wherein the second processor of said user interface device determines whether a detection taken by the magnetic field sensor satisfies a designated signal-to-noise ratio.

120. The boundary proximity determining system of claim 68 wherein said rover unit is carried by a human.

121. A boundary proximity determining method for wirelessly defining a boundary having a programmable shape and for indicating a current location of a rover unit with respect to the boundary, said method comprising the steps of:
  generating at least one pair of magnetic fields by way of a base station unit, each magnetic field being separately identifiable and having a principal axis lying substantially within a common two-dimensional plane of operation, the principal axes being mutually directionally diverse;
  defining the respective locations of a plurality of sample locations along the contour of the boundary in terms of a plurality of variables, the plurality of variables corresponding to the respective locations of the plurality of sample locations being based on magnetic field properties of the at least one pair of magnetic fields at each respective sample location of the plurality of sample locations, the plurality of sample locations defining the boundary, the boundary being of a programmable shape;
  storing the plurality of sample locations in terms of the plurality of variables at said rover unit;
  defining the current location of the rover unit in terms of the plurality of variables, the plurality of variables corresponding to the current location of the rover unit being based on the magnetic field properties of the at least one pair of magnetic fields at the current location of the rover unit;
  determining the location of the rover unit with respect to the boundary by comparing the plurality of variables defining the current location of the rover unit and the plurality of variables defining the respective locations of the plurality of sample locations; and
  activating an auxiliary communications module to indicate the location of the rover unit with respect to the boundary.

122. The method of claim 121 wherein the magnetic field properties include particular components of the intensities and polarities of the at least one pair of magnetic fields.

123. The method of claim 121 wherein said step of generating at least one pair of magnetic fields includes generating at least one pair of orthogonal magnetic fields.

124. The method of claim 123 further comprising the step of calculating the magnetic field properties of a pair of orthogonal magnetic fields, the calculations being based on the magnetic fields generated at said step of generating at least one pair of orthogonal magnetic fields.

125. The method of claim 123 further comprising the step of virtually rotating the base station unit to an angle of rotation by calculating the plurality of variables corresponding to a particular location as they would be at the particular location if the base station unit were actually rotated to the angle of rotation.

126. The method of claim 125 wherein said step of virtually rotating the base station unit to an angle of rotation includes virtually rotating the base station unit to an optimal angle of rotation, rotating the base station unit to the optimal angle of rotation minimizing coupling between the at least one pair of orthogonal magnetic fields and a parasitic current.

127. The method of claim 126 wherein said step of virtually rotating the base station unit includes virtually rotating the base station unit to various angles of rotation at increments across a range.

128. The method of claim 127 wherein said step of virtually rotating the base station unit includes virtually rotating the base station unit to various angles of rotation at one degree (1°) increments across a range of one hundred and eighty degrees (180°).

129. The method of claim 127 wherein said step of virtually rotating the base station unit includes identifying the angles of rotation where at least one of the calculated plurality of variables corresponding to the particular location has a particular value exactly four (4) times.

130. The method of claim 129 wherein said step of virtually rotating the base station unit includes calculating a goodness measurement based on the calculated plurality of variables corresponding to the particular location at angles of rotation where at least one of the calculated plurality of variables has a particular value exactly four (4) times.

131. The method of claim 130 wherein said step of virtually rotating the base station unit includes identifying the calculated plurality of variables rendering the most desirable goodness measurement as corresponding to an optimal angle of rotation.

132. The method of claim 123 wherein said step of generating at least one pair of magnetic fields includes generating at least two pairs of orthogonal magnetic fields.

133. The method of claim 132 wherein the plurality of variables includes a sector variable, at least one angle-dependent variable, and a range-dependent variable.

134. The method of claim 133 wherein said step of determining the location of the rover unit with respect to the boundary includes comparing the at least one angle-dependent variable defining the respective locations of the sample locations of the plurality of sample locations having the sector variable that matches the sector variable defining the current location of the rover unit and the at least one angle-dependent variable defining the current location of the rover unit.

135. The method of claim 134 wherein said step of determining the location of the rover unit with respect to the boundary includes comparing the range-dependent variable defining the location of the sample location of the plurality of sample locations having the at least one angle-dependent variable that most closely matches the at least one angle-dependent variable defining the current location of the rover unit and the range-dependent variable defining the location of the rover unit.

136. The method of claim 133 further comprising the step of dividing the plane of operation into a multiplicity of sectors, each sector of the multiplicity of sectors encompassing a separate and identifiable portion of the plane of operation, whereby the sector variable corresponding to a particular location indicates the sector of the multiplicity of sectors within which the particular location is located.

137. The method of claim 136 further comprising the step of determining the direction of radial components of each magnetic field of the at least one pair of magnetic fields with respect to the base station unit.

138. The method of claim 137 further comprising the step of determining an orientation of the rover unit with respect to the base station unit.

139. The method of claim 138 wherein the orientation of the rover unit is determined by orienting the rover unit on an animal such that the determination of the orientation of the rover unit is based on the direction of motion of the animal and by determining the animal's direction of motion by comparing the plurality of variables corresponding to the current location of the rover unit to the plurality of variables corresponding to a previous location of the rover unit.

140. The method of claim 138 wherein said step of defining the respective locations of a plurality of sample locations includes defining the sector variable corresponding to a sample location of the plurality of sample locations by identifying the magnetic field of the at least one pair of magnetic fields that has radial components that most dominate its tangential components at the sample location and by determining the direction of the radial components with respect to the orientation of the rover unit.

141. The method of claim 138 wherein said step of defining the current location of the rover unit includes defining the sector variable corresponding to the current location of the rover unit by identifying the magnetic field of the at least one pair of magnetic fields that has radial components that most dominate its tangential components at the current location of the rover unit and by determining the direction of the radial components with respect to the orientation of the rover unit.

142. The method of claim 121 further comprising the step of generating a perpendicular magnetic field orthogonal to the plane of operation.

143. The method of claim 142 wherein said step of defining the location of the rover unit includes calculating a localized magnetic field distortion detecting variable indicative of an angle between the perpendicular magnetic field and a magnetic field of the at least one pair of magnetic fields, the localized magnetic field distortion detecting variable indicating the presence of localized magnetic field distortion.

144. The method of claim 121 wherein said step of defining the respective locations of a plurality of sample locations includes measuring the magnetic field properties of the at least one pair of magnetic fields at each sample location of the plurality of sample locations.

145. The method of claim 144 wherein said step of defining the respective locations of a plurality of sample locations includes sequentially measuring the magnetic field properties of the at least one pair of magnetic fields at the plurality of sample locations along the contour of the boundary.

146. The method of claim 121 wherein said step of defining the current location of the rover unit includes measuring the magnetic field properties of the at least one pair of magnetic fields at the current location of the rover unit.

147. The method of claim 121 wherein said step of storing includes storing the variables as an indexed series of entries.

148. The method of claim 121 further comprising the step of calibrating an additional rover unit, the additional rover unit being distinguishable from the rover unit.

149. The method of claim 148 wherein said step of calibrating an additional rover unit includes defining a reference location in terms of a range-dependent variable of the plurality of variables utilizing the rover unit, the range-dependent variable being based on one or more of the magnetic field properties of the at least one pair of magnetic fields at the reference location, the reference location as defined by the rover unit being stored at a user interface device in communication with the rover unit.

150. The method of claim 149 wherein said step of calibrating an additional rover unit includes establishing communication between the user interface device and the additional rover unit, defining the reference location in terms of the range-dependent variable of the plurality of variables utilizing the additional rover unit, calculating a calibration coefficient based on the range-dependent variable corresponding to the reference location as defined by the rover unit and the range-dependent variable corresponding to the reference location as defined by the additional rover unit, and applying the calibration coefficient to the plurality of variables defining the current location of the additional rover unit.

151. The method of claim 121 further comprising the step of calibrating the rover unit.

152. The method of claim 151 wherein said step of calibrating the rover unit includes defining a reference location in terms of a range-dependent variable of the plurality of variables utilizing the rover unit, the range-dependent variable being based on one or more of the magnetic field properties of the at least one pair of magnetic fields at the reference location, the reference location being stored at a user interface device in communication with the rover unit.

153. The method of claim 152 wherein said step of calibrating the rover unit includes establishing communication between the user interface device and the rover unit, defining the reference location a second time in terms of the range-dependent variable of the plurality of variables utilizing the rover unit, calculating a calibration coefficient based on the range-dependent variable corresponding to the reference location as defined by the rover unit and the range-dependent variable corresponding to the reference location as defined by the rover unit the second time, and applying the calibration coefficient to the plurality of variables defining the current location of the rover unit.

154. The method of claim 121 further comprising the step of decreasing a current location update rate when the rover unit is a substantial distance from the boundary and is traveling at a substantially low speed.

155. The method of claim 121 wherein the boundary encloses the base station unit.

156. The method of claim 121 wherein the boundary does not enclose the base station unit.

157. The method of claim 121 wherein said step of activating an auxiliary communications module includes activating the auxiliary communications module when the rover unit is within the boundary.

158. The method of claim 121 wherein said step of activating an auxiliary communications module includes activating the auxiliary communications module when the rover unit is not within the boundary.

159. The method of claim 121 wherein said step of activating an auxiliary communications module includes activating the auxiliary communications module when the rover unit traverses the boundary.

160. The method of claim 121 wherein said step of activating an auxiliary communications module includes inducing the auxiliary communications module to transmit an indicator signal.

161. The method of claim 160 wherein transmitting the indicator signal includes delivering a stimulus to an animal carrying the rover unit.

162. A boundary proximity determining system for wirelessly defining a boundary having a programmable shape and for indicating a current location of a rover unit with respect to the boundary, said boundary proximity determining system comprising:

a base station unit, said base station unit generates at least one pair of magnetic fields, each magnetic field being separately identifiable and having a principal axis, the principal axes being mutually directionally diverse and lying substantially within a common two-dimensional plane of operation;

a user interface device, said user interface device measures magnetic field properties of each respective magnetic field at the current location of said user interface device, the magnetic field properties measured at the current location of said user interface device indicating the current location of said user interface device with respect to said base station unit, said user interface device defines the boundary by measuring the magnetic field properties at sample locations along the boundary and by storing the magnetic field properties measured at the sample locations; and said rover unit including an auxiliary communications module and in temporary communication with said user interface device, said rover unit receives the magnetic field properties measured at the sample locations and stored by said user interface device, said rover unit measures the magnetic field properties of each respective magnetic field at the current location of said rover unit, the magnetic field properties measured at the current location of said rover unit indicating the current location of said rover unit with respect to said base station unit, said rover unit determines the current location of said rover unit with respect to the boundary by comparing the magnetic field properties measured at the current location of said rover unit to the magnetic field properties measured at the sample locations, the auxiliary communications module transmitting an indicator signal indicating the location of said rover unit with respect to the boundary.

163. The boundary proximity determining system of claim 162 wherein said rover unit is in temporary wireless communication with said user interface device.

164. The boundary proximity determining system of claim 162 wherein said rover unit is detachably and mechanically engaged with said user interface device, whereby said rover unit is in electrical communication with said user interface device when said rover is engaged with said user interface device.

* * * * *

UNITED STATES PATENT AND TRADEMARK OFFICE
CERTIFICATE OF CORRECTION

PATENT NO. : 7,656,291 B2  
APPLICATION NO. : 11/670278  
DATED : February 2, 2010  
INVENTOR(S) : James M. Rochelle et al.

Page 1 of 1

It is certified that error appears in the above-identified patent and that said Letters Patent is hereby corrected as shown below:

On the title page at item (73), add --XYZ Microsystems, LLC, Knoxville, TN (US)-- as an Assignee.

Signed and Sealed this
Nineteenth Day of April, 2011

David J. Kappos
*Director of the United States Patent and Trademark Office*